US 7,052,400 B2

(12) United States Patent
Kura et al.

(10) Patent No.: US 7,052,400 B2
(45) Date of Patent: May 30, 2006

(54) CONSTANT VELOCITY UNIVERSAL JOINT

(75) Inventors: Hisaaki Kura, Shizuoka-ken (JP);
Kenji Terada, Shizuoka-ken (JP);
Tatsuhiro Goto, Shizuoka-ken (JP);
Akio Sakaguchi, Shizuoka-ken (JP);
Shigeyoshi Ishiguro, Shizuoka-ken (JP); Kazuhiko Yoshida, Shizuoka-ken (JP); Tatsuro Sugiyama, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/765,472

(22) Filed: Jan. 28, 2004

(65) Prior Publication Data

US 2004/0209693 A1    Oct. 21, 2004

Related U.S. Application Data

(62) Division of application No. 10/198,172, filed on Jul. 19, 2002, now Pat. No. 6,719,635, which is a division of application No. 09/698,243, filed on Oct. 30, 2000, now Pat. No. 6,478,682.

(30) Foreign Application Priority Data

| Nov. 5, 1999 | (JP) | ................................. 11-315928 |
| Jan. 12, 2000 | (JP) | ................................. 2000-3987 |
| Jan. 13, 2000 | (JP) | ................................. 2000-4801 |
| Jan. 21, 2000 | (JP) | ................................. 2000-13368 |
| Jan. 27, 2000 | (JP) | ................................. 2000-19038 |
| Feb. 22, 2000 | (JP) | ................................. 2000-44720 |

(51) Int. Cl.
*F16D 3/26* (2006.01)

(52) U.S. Cl. ...................... 464/111; 464/905

(58) Field of Classification Search ................ 464/111, 464/128, 902, 905; 148/210–212, 218, 219
See application file for complete search history.

(56) References Cited

U.S. PATENT DOCUMENTS

| 4,693,698 A | 9/1987 | Olson, II |
| 4,786,270 A | 11/1988 | Iwasaki ........................ 464/111 |
| 4,854,738 A | 8/1989 | Linnemeier |
| 4,886,479 A | 12/1989 | Richtmeyer et al. ......... 464/111 |
| 5,019,016 A | 5/1991 | Uchman |
| 5,167,583 A | 12/1992 | Bensinger et al. ........... 464/111 |
| 5,171,185 A | 12/1992 | Schneider .................... 464/111 |
| 5,199,925 A | 4/1993 | Welschof ..................... 464/111 |

(Continued)

FOREIGN PATENT DOCUMENTS

EP        0 718 513 A1    6/1996

(Continued)

*Primary Examiner*—Greg Binda
(74) *Attorney, Agent, or Firm*—Arent Fox PLLC

(57) ABSTRACT

An annular support ring 32 is fitted onto the outer periphery of each trunnion 22. This support ring 32 and the roller 34 are unitized via a plurality of needle rollers 36 to constitute a roller assembly capable of relative rotations therebetween. In longitudinal section, each trunnion 22 has an outer periphery of straight shape, parallel to the axis of the trunnion 22. In cross section, the trunnion 22 has a generally ellipse shape with the major axis orthogonal to the axis of the joint. The inner periphery of each support ring 32 is arcuate and convex in section. This combines with the general elliptic cross sections of the trunnions 22 and the provision of predetermined clearances between the trunnions 22 and the support rings 32, to allow the support rings 32 to move along the axial directions of the trunnions 22 as well as make tilting movements with respect to the trunnions 22.

11 Claims, 31 Drawing Sheets

U.S. PATENT DOCUMENTS

| | | | | |
|---|---|---|---|---|
| 5,213,546 A | 5/1993 | Schneider | ............ | 464/111 |
| 5,518,685 A | 5/1996 | Sakamoto et al. | | |
| 5,538,473 A | 7/1996 | Busch et al. | ............ | 464/111 |
| 5,658,199 A | 8/1997 | Ricks et al. | | |
| 5,695,405 A | 12/1997 | Kono | ............ | 464/128 |
| 5,707,293 A | 1/1998 | Itoh et al. | ............ | 464/111 |
| 5,854,183 A | 12/1998 | Hasegawa et al. | | |
| 6,319,337 B1 | 11/2001 | Yoshida et al. | | |
| 6,350,201 B1 | 2/2002 | Sedlmeier et al. | ............ | 464/134 |
| 6,390,924 B1 | 5/2002 | Yoshida et al. | ............ | 464/111 |
| 6,478,682 B1 | 11/2002 | Kura et al. | ............ | 464/111 |
| 2002/0072421 A1 | 6/2002 | Ouchi | ............ | 464/178 |

FOREIGN PATENT DOCUMENTS

| | | |
|---|---|---|
| EP | 0 836 023 A1 | 4/1998 |
| FR | 2 723 771 | 2/1996 |
| FR | 2 788 821 | 7/2000 |
| FR | 2 791 745 | 10/2000 |
| JP | 63-186036 | 1/1988 |
| JP | 1-96332 | 4/1989 |
| JP | 03-172619 | 7/1991 |
| JP | 4-254553 | 9/1992 |
| JP | 07-054857 | 2/1995 |
| JP | 09-014280 | 1/1997 |
| JP | 09-196081 | 7/1997 |
| JP | 11-013779 | 1/1999 |

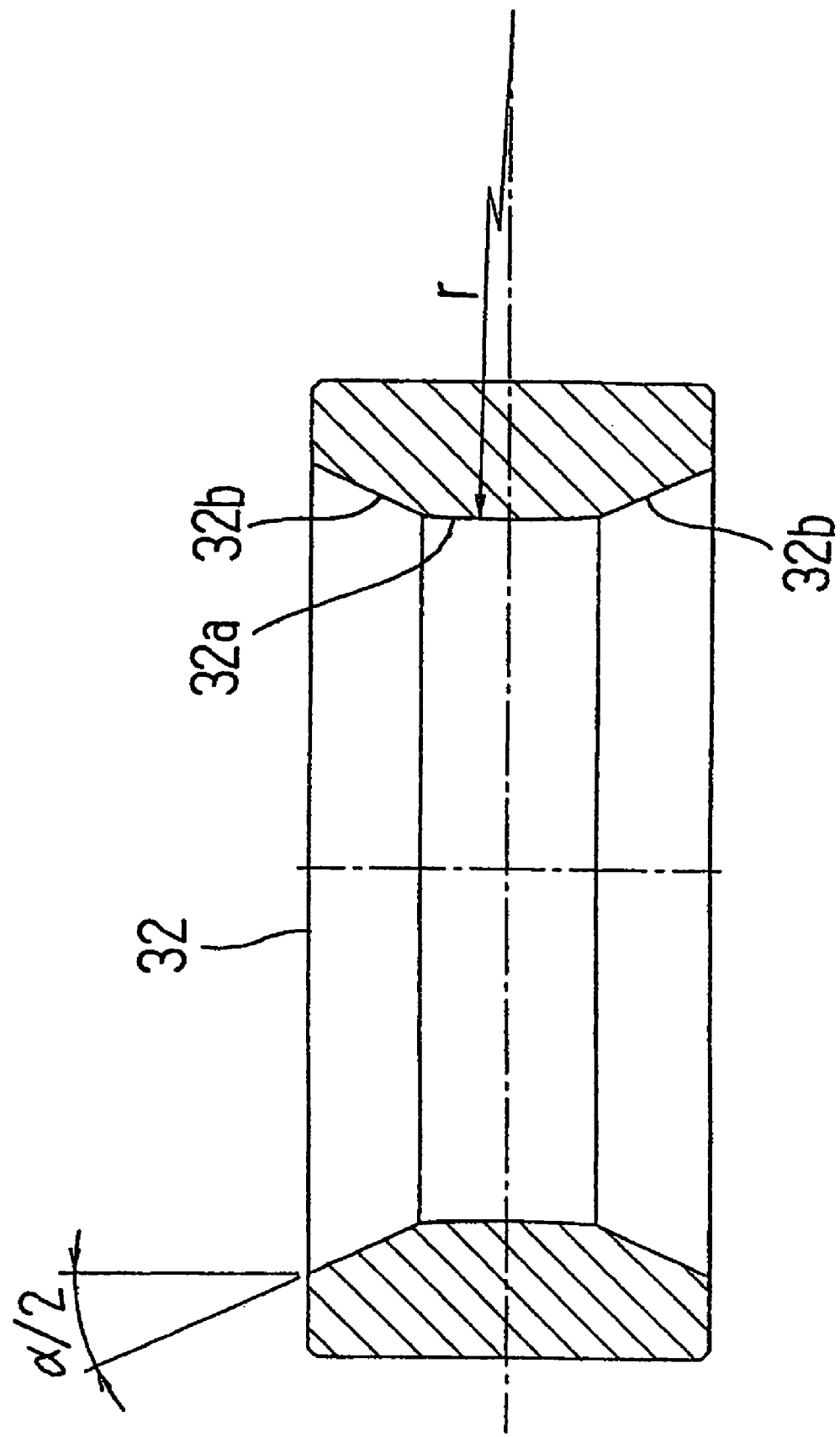

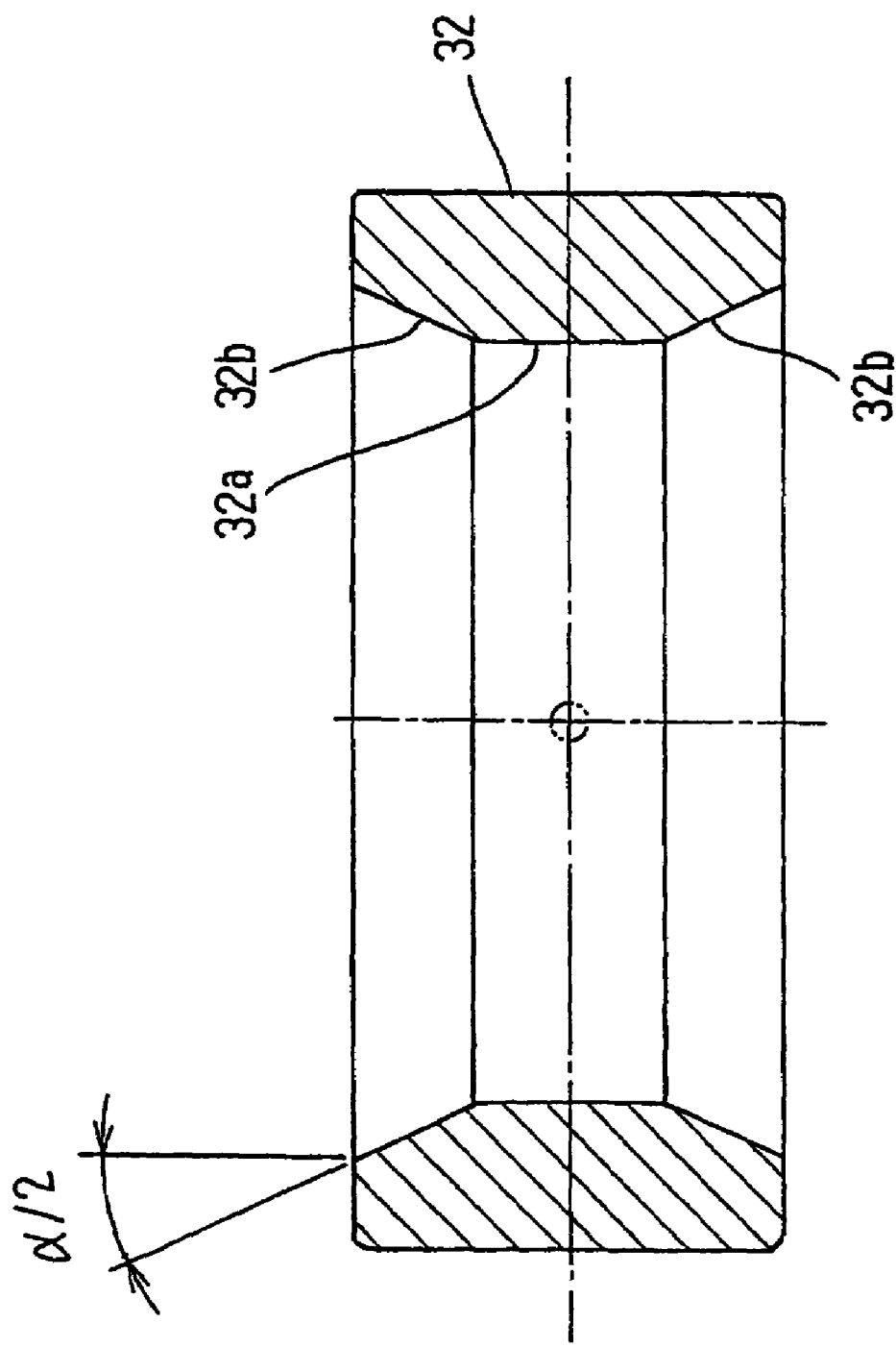

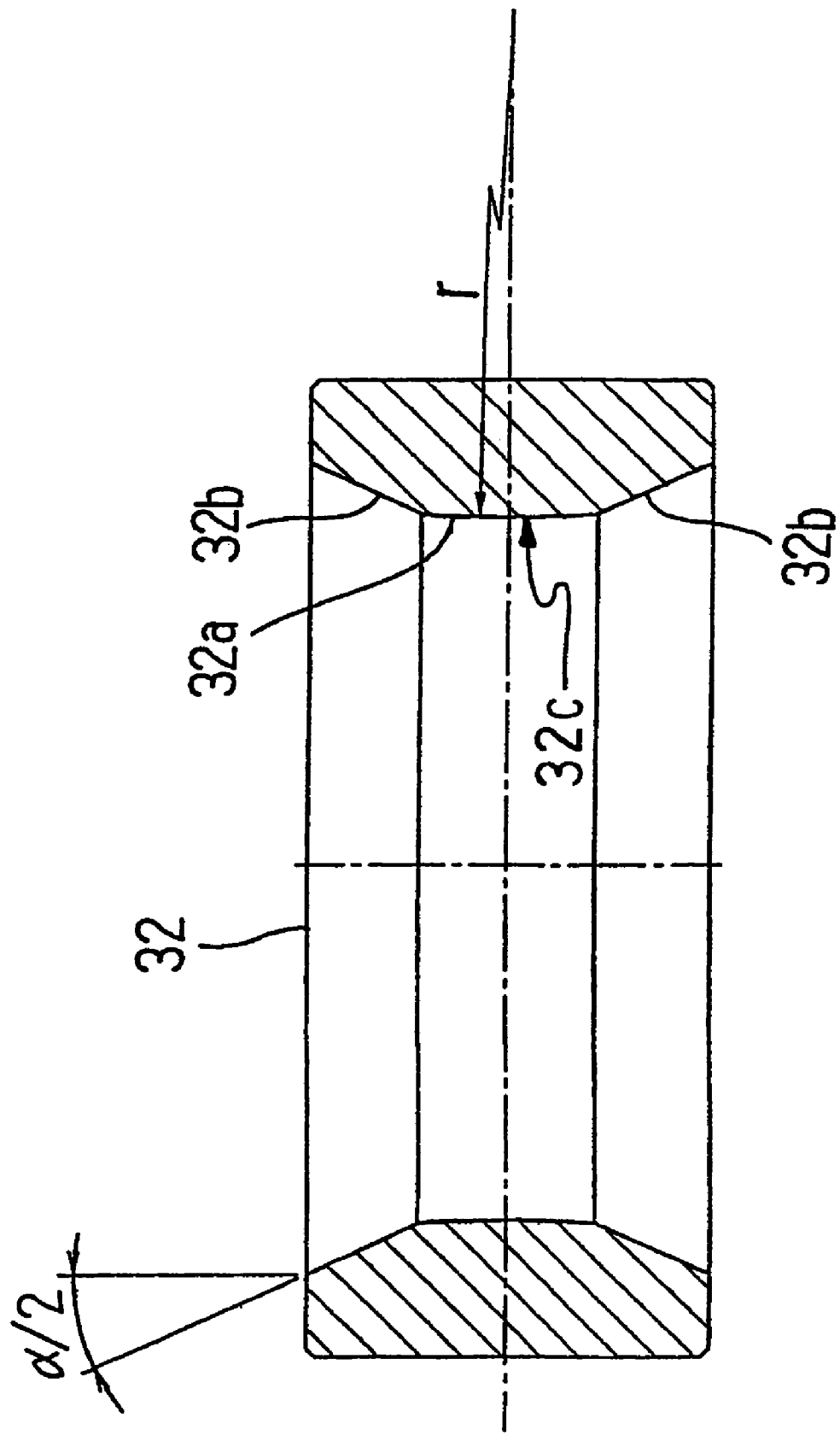

CONSTANT VELOCITY UNIVERSAL JOINT

This is a Division of application Ser. No. 10/198,172 filed Jul. 19, 2002, now U.S. Pat. No. 6,719,635, issued Apr. 13, 2004, which in turn is a Divisional Application of Parent application Ser. No. 09/698,243 filed Oct. 30, 2000, now U.S. Pat. No. 6,478,682, issued Nov. 12, 2002. The disclosures of the prior applications are hereby incorporated by reference herein in their entirety.

BACKGROUND OF THE INVENTION

1. Field of the Invention

The invention relates to a constant velocity universal joint for use in power transmission devices in motor vehicles and various industrial machines. In particular, the invention relates to a tripod type constant velocity universal joint.

2. Description of the Related Art

Tripod type constant velocity universal joints are used, for example, as an element in a power transmission device for transmitting rotational power from a car engine to wheels.

In general, a tripod type constant velocity universal joint is chiefly composed of an outer joint member and a tripod member. The outer joint member has an inner periphery provided with three axially-extending track grooves. Each of the track grooves has axial roller guideways on both sides. The tripod member is provided with three radially-projecting trunnions. A roller is rotatably arranged on each of the trunnions. The trunnions of the tripod member and the roller guideways of the outer joint member engage with each other in the direction of rotation via the rollers so that rotational torque is transmitted from a drive side to a driven side at constant velocity. The individual rollers rotate about the trunnions and roll on the roller guideways as well, absorbing relative axial displacements and angular displacements between the outer joint member and the tripod member. In the meantime, also absorbed are axial displacements of the individual trunnions to the roller guideways, the axial displacements resulting from phase changes in the direction of rotation when the outer joint member and the tripod member transmit rotational torque with some operating angle therebetween.

Some tripod type constant velocity universal joints have the rollers mounted on cylindrical outer peripheries of their trunnions via a plurality of needle rollers. When an outer joint member and a tripod member transmit rotational torque with an operating angle, however, the trunnions tilt to make the rollers and the respective roller guideways oblique to each other. This produces a slide therebetween, giving rise to a problem that resistance here hampers the smooth rolling of the rollers and thereby increases induced thrust. Moreover, there is another problem that the resistance between the rollers and the respective roller guideways increases the slide resistance to axial relative displacements between the outer joint member and the tripod member. Such induced thrust and slide resistance contribute to the production of vibrations and noises from a car body, affecting the Noise Vibration Harshness (hereinafter referred to as "NVH") performances of the motor vehicle. Typical automotive NVH phenomena associated with such induced thrust and slide resistance include the rolling of a moving car body and the vibrations of a car idling with its automatic transmission in the drive or D range, respectively. The essence of solution to the automotive NVH problems consists in reducing the induced thrust and slide resistance in the joint. In general, induced thrusts and slide resistances in a joint tend to depend on operating angle of the joint. This tendency leads to a design limitation of prohibiting greater operating angles when, for example, a constant velocity universal joint is applied to an automotive drive shaft. Accordingly, reduction and stabilization of the induced thrust and slide resistance are also desired for the sake of enhanced design flexibility of portions around the car axles.

Conventionally, to eliminate the oblique states between the rollers and the roller guideways to lower the induced thrust and slide resistance, there have been proposed and put into practical use a variety of tripod type constant velocity universal joints that comprise mechanisms (roller assemblies) for allowing tilting movements of the rollers with respect to the trunnions. Among the known tripod type constant velocity universal joints of this kind is a constitution comprising outer rollers to be guided by the roller guideways and inner rollers rotatably supported by the outer peripheries of the trunnions via a plurality of needle rollers. This constitution is then broadly divided into the following modes a) to d).

a) The outer rollers are provided with outer peripheries of convex spherical shape (including both a "perfect spherical surface," having its center of curvature on the trunnion axis, and a so-called "torus surface," having its center of curvature off the trunnion axis toward the outer-diameter side) and inner peripheries of cylindrical shape, and the inner rollers are provided with outer peripheries of convex spherical shape, so that slides between the cylindrical inner peripheries of the outer rollers and the convex-spherical outer peripheries of the inner rollers permit the tilting movements of the outer rollers.

b) The outer rollers are provided with outer peripheries of convex spherical shape (including both a perfect spherical surface and a torus surface) and inner peripheries shaped so as to make line contact with outer peripheries of the inner rollers, and the inner rollers are provided with the outer peripheries of convex spherical shape, so that slides between the inner peripheries of the outer rollers and the convex-spherical outer peripheries of the inner rollers permit the tilting movements of the outer rollers. Besides, the inner peripheries of the outer rollers are shaped so that load components toward the trunnion extremities are created at the contact positions with the outer peripheries of the inner rollers.

c) The roller guideways are provided with flat surfaces, the outer rollers are with outer peripheries of cylindrical shape and inner peripheries of concave spherical shape, and the inner rollers are with outer peripheries of convex spherical shape, so that slides between the concave-spherical inner peripheries of the outer rollers and the convex-spherical outer peripheries of the inner rollers permit the tilting movements of the outer rollers.

d) In addition to the constitution c) above, the roller guideways and the axes of the trunnions are configured not to be parallel to each other at an operating angle of 0°.

Also known as a tripod type constant velocity universal joint of this kind is the constitution e) in which: the outer peripheries of the trunnions are shaped into a convex spherical surface (a perfect spherical surface having the center of curvature on the trunnion axis); the rollers are mounted onto support rings via a plurality of needle rollers to constitute roller assemblies; and cylindrical inner peripheries of the support rings are fitted to the convex-spherical outer peripheries of the trunnions. The plurality of needle rollers are arranged without any retainers, or in a so-called full complement state. According to this constitution, slides between the cylindrical inner peripheries of the support rings and the convex-spherical outer peripheries of the trunnions allow the tilting movements of the roller assemblies including the rollers.

In constant velocity universal joints comprising roller assemblies of this type, axial relative movements of the rollers and the support rings are restricted from both sides by engaging means so that the roller assemblies are secured in their unity as assembled articles. On the other hand, when a constant velocity universal joint of this kind transmits rotational torque at an operating angle, tilting movements and axial movements of the roller assemblies with respect to the trunnions produce slides between the inner peripheries of the support rings and the outer peripheries of the trunnions. Then, the sliding frictional forces therein cause axial repetitive loads (hereinafter, simply referred to as "axial loads") onto the engaging means, along the axial directions of the rollers and the support rings. Hence, the engaging means require such strengths as to stand the axial loads (strengths against bending fatigue, cracking fatigue, and the like). Besides, the engaging means make sliding contact with the end faces of the rollers and/or the support rings and, in the cases where the rollers are rotatably supported by the support rings via needle rollers, even with the end faces of the needle rollers. This brings about another problem of the fatigue life of those contact surfaces.

SUMMARY OF THE INVENTION

In view of the foregoing, it is an object of the present invention to make further reduction and stabilization of the induced thrust and slide resistance in this kind of tripod type constant velocity universal joint.

Another object of the present invention is to make improvements on this kind of tripod type constant velocity universal joint in the rolling fatigue life of the individual component parts and their strengths against torsional fatigue, crack, and the like, so as to provide a tripod type constant velocity universal joint of superior durability and strengths while maintaining current dimensions, and provide a tripod type constant velocity universal joint of more compact configuration while securing durability and strengths equivalent to or higher than those of existing products.

Still another object of the present invention is to make improvements on a tripod type constant velocity universal joint comprising roller assemblies as described above in the fatigue strength of the engaging means, especially of the engaging rings to be attached to the rollers/support rings, against axial loads and in the fatigue life of their contact surfaces, so as to provide a tripod type constant velocity universal joint of superior durability and strengths while maintaining its current dimensions, and provide a tripod type constant velocity universal joint of more compact configuration while securing durability and strengths equivalent to or higher than those of existing products.

To achieve the foregoing objects, the present invention provides a constant velocity universal joint comprising: an outer joint member having three track grooves each having circumferentially-opposed roller guideways; a tripod member having three radially-projecting trunnions; a roller inserted in each of the track grooves; and a support ring mounted on each of the trunnions to support the roller rotatably, the roller being movable in axial directions of the outer joint member along the roller guideway, wherein the outer periphery of the roller is a partial spherical surface having the center of curvature on the trunnion axis, and the roller guideways form partial cylindrical surfaces parallel to the axis of the outer joint member, so that the roller is capable of tilting in the track groove.

In the constitution described above, the inner periphery of the support ring is shaped arcuate and convex in section. The outer periphery of each of the trunnions is shaped straight in longitudinal section, and formed in cross section so as to make contact with the inner periphery of the support ring in a direction perpendicular to the axis of the joint and create a clearance with the inner periphery of the support ring in an axial direction of the joint. The cross-sectional configuration of a trunnion such as makes contact with the inner periphery of the support ring in a direction perpendicular to the axis of the joint and creates a clearance with the inner periphery of the support ring in an axial direction of the joint translates into that the faces opposed to each other in the axial direction of the tripod member retreat toward each other, i.e., to smaller diameters than the diameter of an imaginary cylindrical surface. Concrete examples thereof include an ellipse. For the sake of absorbing the tilt of the trunnions ascribable to nutations peculiar to tripod type constant velocity universal joints, the radius of curvature to the convex arcs of the support rings preferably has a value that allows the trunnions to make a tilt of the order of 2–3°.

The trunnions may be formed to have a cross section of generally elliptic shape with the major axis perpendicular to the axis of the joint. The generally elliptic shape is not limited to literal ellipses, and is intended to include those generally referred to as ovals and the like. More specifically, the configurations can be adopted for the cross sections of the trunnions and the inner peripheries of the support rings so that the contact pressures against the support rings are relaxed and the trunnions are prevented from a strength drop. Besides, as long as the operating angle falls within a predetermined angle range, the trunnions can tilt without inclining the support rings. This prevents the rollers from inclination and allows the rollers to roll smoothly on the roller guideways. There is provided no ribs which have sometimes been arranged on the track grooves in the outer joint member with an aim to restrain the inclination of the rollers. The omission of the ribs not only reduces the outer joint member in weight and simplifies the machining thereto, but eliminates slide resistance resulting from the slide contacts between the rollers and the ribs. This consequently achieves further reductions in slide resistance and induced thrust.

The outer periphery of each of the trunnions and the inner periphery of the support ring may create a clearance of 0.001a or greater in a circumferential direction of the joint, where a is the semimajor axis of the generally elliptic cross section of the trunnion. Such clearances can well absorb the tilt of the trunnions resulting from the nutations of the tripod member which are peculiar to tripod type constant velocity universal joints. This absorption then removes the factors responsible for the inclinations of the roller assemblies in the joint's cross section.

The support rings may have a cylindrical inner periphery. Since the support rings having the cylindrical inner peripheries are mounted to the trunnions' outer peripheries having a generally elliptic cross section, they make line contacts along the axial direction of the trunnions with an advantageous reduction in surface pressure. In this case, the trunnions are limited in possible tilt angle to the support rings. Here, the rollers are configured to be tiltable inside the track grooves as described above, and hence the rollers tilt at greater operating angles while moving along the track grooves.

The trunnions may have a cylindrical outer periphery, and the generatrix of the inner peripheries of the support rings may comprise a convex arc at the center. Since the spherical support rings are mounted on the trunnions' cylindrical outer peripheries, they make line contact along the circumferential directions of the trunnions with an advantageous reduction in surface pressure. Again, the trunnions are limited in possible tilt angle to the support rings. The rollers are configured to be tiltable inside the track grooves as described above, and hence the rollers tilt at greater operating angles while moving along the track grooves.

In the constitutions described above, a plurality of rolling elements may be interposed between the support rings and the rollers to allow relative rotations of the support rings and the rollers. The rolling elements may be needle rollers.

According to the present invention, when the joint transmits torque with an operating angle, the tilt of the trunnions can be absorbed into the tilt of the rollers. This contributes to a reduction in slide resistance and, finally, to a reduction in induced thrust. The constant velocity universal joints of the present invention are particularly applicable to a motor vehicle's drive shaft. This application can contribute to improvements in automotive NVH performances that depend on slide resistance and induced thrust, thereby increasing design flexibility of portions around the car axles.

To achieve the foregoing objects, the present invention also provides a constant velocity universal joint comprising: an outer joint member having three track grooves each having circumferentially-opposed roller guideways; a tripod member having three radially-projecting trunnions; a roller inserted in each of the track grooves; and a support ring mounted on each of the trunnions to support the roller rotatably, the roller being movable in axial directions of the outer joint member along the roller guideways, wherein: the support ring has a cylindrical inner periphery; and the outer periphery of each of the trunnions is curved in longitudinal section, and formed in cross section so as to make contact with the inner periphery of the support ring in a direction perpendicular to the axis of the joint and create a clearance with the inner periphery of the support ring in an axial direction of the joint.

The cross-sectional configuration of a trunnion such as makes contact with the inner periphery of the support ring in a direction perpendicular to the axis of the joint and creates a clearance with the inner periphery of the support ring in an axial direction of the joint translates into that the faces opposed to each other in the axial direction of the tripod member retreat toward each other, i.e., to smaller diameters than the diameter of an imaginary cylindrical surface. Concrete examples thereof include an ellipse.

Due to the changes in cross section from the conventional circular shape to the configuration described above, the trunnions can tilt with respect to the outer joint member without changing the orientations of the roller assemblies when the joint operates with an operating angle. Besides, the contacting ellipses of the support rings with the outer peripheries of the trunnions approach from oblong ellipses to points in shape. This reduces the friction moments which act to tilt the roller assemblies. As a result, the roller assemblies are always stabilized in orientation, whereby the rollers are maintained parallel to the roller guideways for smooth rolling. This smooth rolling contributes to a reduction in slide resistance and, finally, to a reduction in induced thrust. Moreover, there is an advantage that the trunnions improve in flexural strength due to increased section moduli at the bottom portions of the trunnions. In this connection, the inner peripheries of the support rings need not be cylindrical over the entire lengths thereof. They may be formed cylindrical only at their centers for making contact with the trunnions, and provided with relief portions on both sides so as to avoid interference when the trunnions tilt.

The roller assemblies are interposed between the trunnions and the outer joint member for the sake of torque transmission. In constant velocity universal joints of this kind, the transmission direction of torque is always perpendicular to the axis of the joint. Therefore, as long as they contact in the transmission direction of torque, the trunnions and the support rings can perform torque transmission without trouble even when they have clearances therebetween in the axial directions of the joint.

In the above-described constitution, the trunnions may be formed to have a cross section of elliptic shape with the major axis perpendicular to the axis of the joint. The generally elliptic shape here is not limited to literal ellipses, and is intended to include those generally referred to as ovals and the like.

More specifically, the trunnions can adopt such cross-sectional configurations so that the contact pressures against the support rings are relaxed and the trunnions are prevented from a strength drop. Besides, the trunnions can tilt without inclining the support rings. This prevents the rollers from inclination and allows the rollers to roll smoothly on the roller guideways. As a result, it becomes possible to omit ribs which are sometimes arranged on the track grooves in the outer joint member with an aim to restrain the inclination of the rollers. The omission of the ribs not only reduces the outer joint member in weight and simplifies the machining thereto, but eliminates slide resistance resulting from the slide contacts between the rollers and the ribs. As a result, further reductions in slide resistance and induced thrust are achieved.

The curve to the longitudinal sections of the trunnions may have a radius of curvature in the range of 1.1a and 8.7a. This makes it possible to absorb the tilt of the trunnions resulting from the nutations of the tripod member which are peculiar to tripod type constant velocity universal joints. This absorption removes the factors responsible for the inclinations of the roller assemblies in the joint's cross section, and thereby contributes to improved NVH performances of motor vehicles.

The outer periphery of each of the trunnions may be ground only at a predetermined region including an area for making contact with the support ring. In contemplation of machining errors and the like, the predetermined region is preferably determined to be somewhat wider than the contact area. The remaining portions other than the predetermined region may be left forge-finished without any grinding. This allows a reduction in machining time and a cut in costs.

The outer periphery of the roller and the roller guideways in the outer joint member may make angular contact with each other. The angular contact between the roller and the roller guideways makes the roller less prone to vibrate, further stabilizing the orientation of the roller. As a result, the roller can roll on the roller guideways with smaller resistance when moving along the axial direction of the outer joint member. The specific constitutions to establish such angular contact include a convex arcuate generatrix to the outer periphery of the roller, combined with roller guideways having a tapered or Gothic arc cross section.

In the above-described constitutions, a plurality of rolling elements can be interposed between the support rings and the rollers to allow relative rotation of the support rings and the rollers, so that the rollers can make smooth rotation around the trunnions for reduced slide resistance. The rolling elements may be needle rollers or balls.

According to the present invention, the trunnions can tilt with respect to the outer joint member without changing the orientations of the roller assemblies when the joint operates with an operating angle. Besides, the contacting ellipses of the support rings with the outer peripheries of the trunnions approach from oblong ellipses to points in shape. This reduces the friction moments which act to tilt the roller assemblies. As a result, the roller assemblies are always stabilized in orientation, whereby the rollers are maintained parallel to the roller guideways for smooth rolling. This smooth rolling contributes to a reduction in slide resistance and, finally, to a reduction in induced thrust. Moreover, there is an advantage that the trunnions improve in flexural strength because of increased section moduli at the bottom portions of the trunnions.

The constant velocity universal joints of the present invention are particularly applicable to a motor vehicle's drive shaft. This application can contribute to improvements in automotive NVH performances that depend on slide resistance and induced thrust, thereby increasing design flexibility of portions around the car axles.

To achieve the foregoing objects, the present invention also provides a constant velocity universal joint comprising: an outer joint member having an inner periphery provided with three axial track grooves, axial roller guideways being arranged on both sides of each of the track grooves; a tripod member having three radially-projecting trunnions; and a roller assembly mounted on each of the trunnions of the tripod member, the roller assembly being capable of tilting movement with respect to the trunnion and having a roller to be guided along the roller guideways in directions parallel to the axis of the outer joint member, wherein at least one component part of the joint is limited to a predetermined range in softening resistance characteristic value (R).

The present applicant has found from a number of experiments that the durability of the component parts of the above-described constant velocity universal joint, and particularly the durability of the tripod member and the outer joint member, can be controlled accurately by using the softening resistance characteristic value R mentioned above.

Take the tripod member as an example. The factors affecting the durability of the same include rolling fatigue on the outer peripheries of the trunnions, torsional fatigue at the trunnion bottoms, and torsional fatigue in a serration portion (or spline portion). The outer peripheries of the trunnions make rolling contact with the outer peripheries of the needle rollers, or make rolling and sliding contact with the inner peripheries of the support rings in the roller assemblies, and thus have the problem of rolling fatigue. The trunnion bottoms and the serration portion undergo concentrated torsional stresses in torque transmission. This combines with the fact that these portions are usually left unground, to give rise to the problem of torsional stresses. Now, taking the outer joint member as an example, the factors affecting the durability thereof include rolling fatigue on the roller guideways in the track grooves. The roller guideways make rolling and sliding contact with the outer peripheries of the rollers, and thus have the problem of rolling fatigue. Besides, the outer joint member receives joint loads through the rollers, and hence has a problem in crack strength. Moreover, other component parts comprising the roller assemblies also have the problem of rolling fatigue at portions to make rolling contact and/or sliding contact with their mating members.

In general, it is well known that the fatigue strengths of steel material have a correlation to surface hardness. Steel materials are therefore subjected to heat treatment and the like to form hardened surface layers, so that the hardened surface layers are controlled in surface hardness for required fatigue strength. The results of the experiments made by the present applicant, however, have shown that the fatigue strengths have a closer correlation with softening resistance characteristics of a region ranging from the surface to a predetermined depth (anti-softening property of the material at some higher temperatures) than with surface hardness. Then, it has been found that the softening resistance characteristics can be properly evaluated in terms of the maximum hardness of the region within 0.5 mm in depth from a predetermined surface (softening resistance characteristic value R), and this softening resistance characteristic value R can be used as the evaluation index to the fatigue strengths. The "softening resistance characteristic value R" herein will be expressed as the maximum Vickers hardness Hv in the region within 0.5 mm in depth from the surface, of a component part that is hardened and then tempered at 200° C.×2 h. This softening resistance characteristic value R can be limited to a predetermined range to improve the rolling fatigue life of the component part and enhance its strengths against torsional fatigue and the like.

When component parts are made of steel having a carbon content of 0.15–0.40% by weight and are provided with a surface layer formed by carburizing and tempering beneath a predetermined surface, the softening resistance characteristic value R thereof can be limited to the range of $705<R\leq820$, and preferably $710\leq R\leq815$, for desirable results.

When component parts are made of steel having a carbon content of 0.15–0.40% by weight and are provided with a surface layer formed by carbonitriding and tempering beneath a predetermined surface, the softening resistance characteristic value R thereof can also be limited to the range of $705<R\leq820$, and preferably $710\leq R\leq815$, for desirable results.

When component parts are made of steel having a carbon content of 0.45–0.60% by weight and are provided with a surface layer formed by induction hardening and tempering beneath a predetermined surface, the softening resistance characteristic value R thereof can be limited to the range of $630<R\leq820$, and preferably $640\leq R\leq810$, for desirable results.

According to the present invention, the materials of the component parts, notably of the tripod member and the outer joint member, and the properties of the surfaces and sub-surfaces thereof are optimized for improvements in rolling fatigue life and in the strengths against torsional fatigue and the like. This makes it possible to provide a tripod type constant velocity universal joint of superior durability and strengths while maintaining its current dimensions, as well as to provide a tripod type constant velocity universal joint of more compact configuration while securing durability and strengths equivalent to or higher than those of existing products.

Moreover, to achieve the foregoing objects, the present invention provides a constant velocity universal joint comprising: an outer joint member having an inner periphery provided with three axial track grooves, axial roller guideways being arranged on both sides of each of the track grooves; a tripod member having three radially-projecting trunnions; and a roller assembly mounted on each of the trunnions of the tripod member, the roller assembly being capable of tilting movement with respect to the trunnion and having a roller to be guided along the roller guideways in directions parallel to the axis of the outer joint member, wherein at least one component part of the joint has a surface portion having a residual austenite content γR (vol %) in the range of $20 \leq \gamma R \leq 40$.

Generally, among typical fatigues on rolling contact surfaces is flaking (fatigue exfoliation). More specifically, it is known that contact surfaces subjected to repeated loads from rolling movements generate cracks in their rolling portions, and these cracks develop to flaking so that the rolling fatigue life is reached. Here, a number of experiments and experiences have shown that the cracks that originate flaking often occur at portions somewhat inside the contact surfaces. It has been also found that, under such condition that metal wear chips and other foreign matters easily get into the lubricant, the contact surfaces develop damage similar to the original flaking and reach their rolling fatigue life because of exfoliation originating from foreign-matter-biting indentations, peeling and smearing due to insufficient lubricating oil films, and cracks originating therefrom (surface-origin type damage). In the latter case, the rolling fatigue life of the contact surfaces becomes shorter than under lubrication conditions with clean lubricants.

Meanwhile, in constant velocity universal joints of this kind, the component parts have contact surfaces of greater surface roughness as compared with those of ordinary rolling bearings. In addition, when the rollers make tilting movements with respect to the trunnions, a slide occurs in the contact portions between the support rings of the roller assemblies and the trunnions, or in the contact portions between the inner and outer rollers of the roller assemblies. The contact portions consequently produce wear chips, which get into the lubricant and are bitten between the contact surfaces, contributing to the generation of indentations and the hindered formation of lubricating oil films with easier occurrence of the surface-origin type damage mentioned above.

According to the present invention, at least one of the component parts is provided with a surface layer having a residual austenite content γR (vol %) limited to the range of $20 \leq \gamma R \leq 40$. Therefore, the surface layer improves in crack sensitivity so that the surface-origin type damage described above become harder to occur. Here are the reasons for this. That is, residual austenite is relatively low in hardness (e.g. Hv 300 or so, though depending on the carbon content of the material). Therefore, even if indentations are formed in the contact surface due to the biting of foreign matters, austenite particles distributed in the surface portion facilitate elastic deformation around the indentations, and thereby relax the stress concentration on the surface layer and delay the propagation of crack. Besides, because of the deformation energy, the residual austenite undergoes a martensite transformation for hardening. Therefore, providing the surface layer with an appropriate amount of residual austenite can improve the surface layer in crack sensitivity so that the production of the surface-origin type damage described above is suppressed for enhanced rolling fatigue life. Residual austenite contents γR of a surface layer below 20% by volume cannot make a sufficient improvement to the crack sensitivity of the surface layer. On the other hand, residual austenite contents γR of a surface layer above 40% by volume promise no further improvement to the crack sensitivity but cause a drop in surface hardness, thereby decreasing the rolling fatigue life contrarily. Accordingly, the surface portion is preferably set within the range of $20 \leq \gamma R \leq 40$ in residual austenite content γR (vol %). Incidentally, the surface layer in the present invention need only be formed at least beneath the contact surface of the component part. This includes the constitution that a surface layer is formed only beneath the contact surface, the constitution that surface layers are formed beneath the contact surface and surfaces adjacent thereto, and the constitution that surface layers are formed beneath the entire surfaces of the component part.

For example, at least one of the outer joint member, the tripod member, and the component parts of the roller assemblies may be formed of steel having a carbon content of 0.15–0.40% by weight, and provided with a carburized-and-tempered surface portion (carburized layer) or a carbonitrided-and-tempered surface portion (carbonitrided layer). Here, the residual austenite content γR (vol %) of the surface portion is limited to the range of $20 \leq \gamma R \leq 40$. According to this constitution, the surface portion of that particular component part improves in crack sensitivity to have a structure of superior durability against rolling fatigue, while the core portion thereof forms a structure having toughness. As a result, the component part combines long rolling fatigue life with crack strength and the like. This effect is particularly significant in the constitutions having carbonitrided-and-tempered surface portions (carbonitrided layers). More specifically, when nitrogen is combined into a surface layer under appropriate conditions, the residual austenite and the martensite matrix become stable toward heat due to the intrusion of nitrogen. This means a structure less prone to thermal changes, with higher resistance against rolling fatigue and higher strengths against cracks and the like. The trunnion bottoms and the serration portion of the tripod member undergo concentrated torsional stresses in torque transmission, and these portions are usually left unground. As a result, there occurs the problem of torsional stresses. Nevertheless, the formation of carbonitrided layers improves hardenability, whereby these portions are increased in surface hardness and improved in torsional fatigue strength as well.

For example, at least one of the parts constituting the roller assemblies may be made of steel having a carbon content of 0.95–1.10% by weight, and provided with a surface layer of nitride layer (layer having more solid solution of nitrogen) formed by nitriding and tempering beneath its contact surface. Here, the residual austenite content γR (vol %) of the surface layer is limited to the range of $20 \leq \gamma R \leq 40$. As in the constitutions described above, the surface layer of this component part improves in crack sensitivity to have a structure of superior rolling fatigue strength. At the same time, the hardening uniformly extends to the inside, advantageously decreasing deformation under high load. As a result, this component part combines longer rolling fatigue life with higher load deformation resistance and the like.

In the constitutions described above, the softening resistance characteristic value R of at least either of the outer joint member and the tripod member is desirably limited to the range of $705 < R \leq 820$, and preferably $710 \leq R \leq 815$, for the reasons stated previously.

According to the present invention, the materials of the component parts and the properties of the surface layers are optimized for improvements of rolling fatigue life, notably of the resistance against surface-origin type damage resulting from the biting of wear chips and other foreign matters. This makes it possible to provide a tripod type constant velocity universal joint of superior durability and strengths while maintaining its current dimensions, as well as to provide a tripod type constant velocity universal joint of more compact configuration while securing durability and strengths equivalent to or higher than those of existing products.

Furthermore, to achieve the foregoing objects, the present invention provides a constant velocity universal joint comprising: an outer joint member having an inner periphery provided with three axial track grooves, axial roller guideways being arranged on both sides of each of the track grooves; a tripod member having three radially-projecting trunnions; and a roller assembly mounted on each of the trunnions of the tripod member, the roller assembly being capable of tilting movement with respect to the trunnion and having a roller to be guided along the roller guideways in directions parallel to the axis of the outer joint member, wherein at least one component part of the jopint has a surface portion containing a structure in which carbide is distributed into a martensite matrix. This constitution includes those in which only the surface layer has the above-described structure and those in which the structure extends from the surface to the inside.

Generally, among typical fatigues on rolling contact surfaces is flaking (fatigue exfoliation). More specifically, it is known that contact surfaces subjected to repeated loads from rolling movements generate cracks in their rolling portions, and these cracks develop to flaking so that the rolling fatigue life is reached. Here, a number of experiments and experiences have shown that the cracks that originate flaking often occur at portions somewhat inside the contact surfaces. It has been also found that, under such condition that metal wear chips and other foreign matters easily get into the lubricant, the contact surfaces develop damage similar to the original flaking and reach their rolling fatigue life because of exfoliation originating from foreign-matter-biting indentations, peeling and smearing due to insufficient lubricating oil films, and cracks originating therefrom (surface-origin type damage). In the latter case, the rolling fatigue life of the contact surfaces becomes shorter than under lubrication conditions with clean lubricants.

Meanwhile, in constant velocity universal joints of this kind, the component parts have contact surfaces of greater surface roughness as compared with those of ordinary rolling bearings. In addition, when the rollers make tilting movements with respect to the trunnions, a slide occurs in the contact portions between the support rings of the roller assemblies and the trunnions, or in the contact portions between the inner and outer rollers of the roller assemblies. The contact portions consequently produce wear chips, which get into the lubricant and are bitten between the contact surfaces, contributing to the generation of indentations and the hindered formation of lubricating oil films with easier occurrence of the surface-origin type damage mentioned above.

According to the present invention, at least the surface portion of the component part is provided with a structure in which carbide is distributed in a martensite matrix. Therefore, the surface hardness increases so that contact surfaces improve in wear resistance to suppress flaking. At the same time, foreign-matter-biting indentations become hard to occur, whereby the aforementioned surface-origin type damage are suppressed as well. This means improved rolling fatigue life of the contact surfaces.

The above-mentioned structure may be formed by making the component part in steel material having a carbon content of 0.80% by weight or higher, e.g., in high carbon chrome steel, and subjecting the same to dip quenching and tempering. According to this constitution, the contact surfaces show higher resistance against flaking and surface-origin type damage. Besides, the hardening uniformly extends to the inside, thereby reducing deformation under high load. As a result, that particular component part combines longer rolling fatigue life with load deformation resistance and the like. The high carbon chrome steel may use bearing steels such as SUJ1, SUJ2, SUJ3, SUJ4, and SUJ5.

The above-mentioned structure may also be formed by making the component part in steel material having a carbon content of 0.15–0.40% by weight, e.g., in steel for carburization, and subjecting the same to heavy carburizing and tempering. The heavy carburizing here is a process for increasing the content of the C solid solution in the matrix of the surface portion to, for example, 1.5–4.0% by weight. The carbon content of the base material, on which the core hardness depends, is preferably set within the range of 0.15–0.40% by weight for the sake of fatigue strengths. When the base metal has a carbon content below 0.15% by weight, the carburizing requires longer time and the core portion falls short of hardness as well. On the other hand, carbon contents above 0.4% by weight increase the core hardness, which significantly lowers toughness as well as increases distortion. According to this constitution, the contact surfaces show higher resistance against flaking and surface-origin type damage, while the core portion forms a structure having toughness. As a result, that particular component part combines longer rolling fatigue life with crack strength and the like. The steel for carburization may use SCr415, SCr420, SCr430, SCr435, SCr440, SCM415, SCM420, SCM430, SCM435, SCM440, SNCM220, SNCM415, SNCM420, SNCM815, and the like. The carburizing may adopt gas carburizing or plasma carburizing. In the case of gas carburizing, the carbon potential of the carburizing gas is increased to 1.5–4.0% by weight or higher for heavy carburizing. The plasma carburizing is a process in which plasma discharge of direct-current high voltage is generated between both electrodes in a vacuum through the medium of C in the carburizing gas, with the furnace body as the positive electrode and the article to be processed as the negative electrode, so that C is ionized (C+) and intruded into the matrix in the surface portion of the article. The plasma carburizing, as a carburization under non-equilibrium, can obtain a surface portion of higher C concentration in a shorter time as compared with the gas carburizing. Besides, the plasma carburizing can provide a uniform concentration distribution, and thus has an advantage that an appropriate amount of carbide can be uniformly deposited in the surface portion. In this connection, when the plasma carburizing is adopted, it is preferable that the Mo and Cr contents of the steel for carburization be made higher than usual.

The deposition of carbide in the martensite matrix as described above allows the contact surfaces to have a surface hardness of HRC 60–68, or preferably HRC 63–68. The term "HRC" herein represents C scale in Rockwell hardness. Surface hardnesses of the contact surfaces below HRC 60 will not lead to an improvement in rolling fatigue life, whereas those equal to or lower than HRC 68 are preferable in consideration of toughness.

According to the present invention, the materials of the component parts, or at least the structures of the surface portions are optimized for improvements in rolling fatigue life, crack strength, the like. This makes it possible to provide a tripod type constant velocity universal joint of superior durability and strengths while maintaining its current dimensions, as well as to provide a tripod type constant velocity universal joint of more compact configuration while securing durability and strengths equivalent to or higher than those of existing products.

The constant velocity universal joints according to the inventions discussed above may use roller assemblies each including the roller to be guided by the roller guideways and a support ring mounted to the outer periphery of the trunnion so as to support the roller rotatably, wherein: the inner periphery of the support ring is shaped arcuate and convex in section; and the outer periphery of the trunnion is shaped straight in longitudinal section, and formed in cross section so as to make contact with the inner periphery of the support ring in a direction perpendicular to the axis of the joint and create a clearance with the inner periphery of the support ring in an axial direction of the joint. In this constitution, it is the roller assemblies including the roller and the support ring unitarily that make tilting movements with respect to the trunnions. Here, the tilting movements refer to the tilts the axes of the support rings and rollers make with respect to the axes of the trunnions, within the planes containing the axes of the trunnions. The cross-sectional configuration of a trunnion such as makes contact with the inner periphery of the support ring in a direction perpendicular to the axis of the joint and creates a clearance with the inner periphery of the support ring in an axial direction of the joint translates into that the faces opposed to each other in the axial direction of the tripod member retreat toward each other, i.e., to smaller diameters than the diameter of an imaginary cylindrical surface. Concrete examples thereof include general elliptic shapes. The "general elliptic shapes" include those generally referred to as ovals and the like, aside from literal ellipses.

Due to the changes in cross section from the conventional circular shape to the configuration described above, the trunnions can tilt with respect to the outer joint member without changing the orientations of the roller assemblies when the joint operates with an operating angle. Besides, the contacting ellipses of the support rings with the outer peripheries of the trunnions approach from oblong ellipses to points in shape. This reduces the friction moments which act to tilt the roller assemblies. As a result, the roller assemblies are stabilized in orientation, whereby the rollers are maintained parallel to the roller guideways for smooth rolling. This smooth rolling contributes to a reduction in slide resistance and, finally, to a reduction in induced thrust.

The roller assemblies are interposed between the trunnions and the outer joint member for the sake of torque transmission. In constant velocity universal joints of this kind, the transmission direction of torque is always perpendicular to the axis of the joint. Therefore, as long as they contact in the transmission direction of torque, the trunnions and the support rings can perform torque transmission without trouble even when they have clearances therebetween in the axial directions of the joint.

In the constitutions described above, the generatrix to the inner peripheries of the support rings may comprise an arc portion at the center and relief portions on both sides. The arc portion preferably has such a radius of curvature as allows 2–3° inclination of the trunnions. Additionally, a plurality of rolling elements may be interposed between the support rings and the rollers so as to allow relative rotations between the support rings and the rollers. The rolling elements may be needle rollers. Furthermore, the outer peripheries of the rollers may be formed into a spherical shape (perfect spherical surfaces or torus surfaces) so that the spherical outer peripheries of the rollers and the roller guideways of the outer joint member make angular contacts with each other. The angular contacts between the rollers and the roller guideways make the rollers less prone to vibrate, thereby stabilizing the orientation of the rollers. As a result, the rollers can roll on the roller guideways with smaller resistance when moving along the axial direction of the outer joint member. The specific configurations to establish such angular contacts include tapered or Gothic-arc cross sections of the roller guideways.

Now, in the constant velocity universal joint of the above-described constitution, the contact surface pressures between the outer peripheries of the trunnions and the inner peripheries of the support rings are higher than in the other constitutions. Therefore, the outer peripheries of the trunnions tend to have a shorter rolling fatigue life. In addition, stresses are concentrated on the bottom portions of the trunnions more easily than in the other constitutions, and hence the bottom portions tend to have lower fatigue strengths. Accordingly, it is particularly effective in the constant velocity universal joint of this constitution to confine the softening resistance characteristic values R of the outer peripheries and bottom surfaces of the trunnions to a predetermined range so that the outer peripheries are enhanced in rolling fatigue life and the bottom portions are enhanced in torsional fatigue strength and other strengths as described above.

Moreover, the constant velocity universal joints according to the inventions described above may use roller assemblies each including the roller to be guided by the roller guideways and a support ring fitted on the outer periphery of the trunnion to support the roller rotatably, wherein: the trunnion has a convex-spherical outer periphery; and the support ring has a cylindrical or conic inner periphery. In this constitution, the roller assemblies including the roller and the support ring unitarily make tilting movements with respect to the trunnions.

Furthermore, the constant velocity universal joints according to the inventions described above may use roller assemblies each including an outer roller to be guided by the roller guideways, and an inner roller rotatably supported by the trunnion as well as fitted to the inner periphery of the outer roller, wherein: the inner roller has a convex-spherical outer periphery; and the outer roller has an inner periphery shaped so that a load component toward the trunnion extremity is created at a contact position with the outer periphery of the inner roller. In this constitution, the roller assemblies including the roller and the support ring make tilting movements with respect to the trunnions. Here, the tilting movements refer to the tilts the axes of the outer rollers make with respect to the axes of the trunnions, within the planes containing the axes of the trunnions.

To be more specific, the inner peripheries of the outer rollers may take a variety of configurations. Namely, the configurations the inner peripheries of the outer rollers may take include the following: the form of a cone gradually contacting in diameter toward the trunnion extremity; a concave spherical surface having a generatrix whose center falls off the center of generatrix of the trunnion's outer periphery toward the trunnion bottom; a convex spherical surface having a generatrix whose center falls off the center of generatrix of the trunnion's outer periphery toward the trunnion extremity; a composite surface of a conical tapered surface contracting in diameter toward the trunnion extremity and a convex spherical surface; and a composite surface of a cylindrical surface and a convex spherical surface. Nevertheless, in favor of simplified fabrication processes, the inner peripheries of the outer rollers preferably have the form of a cone gradually contracting in diameter toward the trunnion extremity. In that case, the inner peripheries of the outer rollers desirably have a tilt angle of 0.1–3°, and preferably 0.1–1°, for the sake of effective reduction and stabilization of the induced thrusts.

In the constitutions described above, many minute dimples may be formed randomly at least in the contact surfaces including the outer peripheries of the trunnions and the roller guideways. The minute dimples formed in the contact surfaces function as oil sumps to promote the formation of oil films on the contact surfaces, thereby improving the lubricity and enhancing the rolling fatigue life of the contact surfaces. For example, the minute dimples have a size of several tens of µm or so, and a depth of 1 µm or so. Grinding conditions to the contact surfaces can be changed to form minute dimples of arbitrary size, depth, and number. Incidentally, when it is difficult to form minute dimples selectively in the contact surfaces alone, minute dimples may also be formed in the vicinities of the contact surfaces of that component part, or over the entire surfaces.

A solid lubrication coating may be formed on the contact surfaces including the outer peripheries of the trunnions and the roller guideways, with a chemical conversion coating as an undercoating. Since the solid lubrication coating reduces the frictional resistance on the contact surfaces and improves the lubricity, the contact surfaces improve in rolling fatigue life. The chemical conversion coating to be the undercoating is formed with the objective of enhancing the solid lubrication coating in adhesion to the contact surfaces. Examples of the chemical conversion coating include a manganous phosphate coating, an iron phosphate coating, and a zinc phosphate coating. Examples of the solid lubrication film include a molybdenum disulfide coating and a PTFE coating. In this connection, the effect after the treatment depends on the pre-treatment surface roughness of the contact surfaces (base-material surfaces). It is therefore desirable that the contact surfaces be previously finished with a surface roughness of Ra 0.2–0.8, for the sake of appropriate oil-sump functions. In the cases where the selective application of coating to the contact surfaces alone is difficult, the coating may also be applied to the vicinities of the contact surfaces of those component parts, or over the entire surfaces.

Cold sulfurizing may be applied to the contact surfaces including the outer peripheries of the trunnions and the roller guideways. Sulfurizing is a surface treating method for infiltrating sulfur to the surface of steel to generate iron sulfide. The application of sulfurizing reduces the frictional resistance on the surface; therefore, the surface improves in initial conformability for enhanced rolling fatigue life and stabilized NVH performances as well. Since the cold sulfurizing is performed under such a condition as 30–40° C.×10–30 min., no hardness drop occurs in the surface hardened layers. The effect after the treatment depends on the pre-treatment surface roughness of the contact surfaces (base-material surfaces). Thus, it is desirable that the contact surfaces be previously finished with a surface roughness of Ra 0.2–0.8 for the sake of appropriate oil-sump functions.

Moreover, to achieve the foregoing objects, the present invention provides a constant velocity universal joint comprising: an outer joint member having an inner periphery provided with three axial track grooves, axial roller guideways being arranged on both sides of each of the track grooves; a tripod member having three radially-projecting trunnions; and a roller assembly mounted on each of the trunnions of the tripod member, the roller assembly including a roller to be guided along the roller guideways in directions parallel to the axis of the outer joint member, a support ring for supporting the roller rotatably, and engaging means for retaining the roller and the support ring from both sides so as to prevent axial relative movement of the roller and the support member, the roller assembly being capable of tilting movements and axial displacements with respect to the trunnion, wherein at least either one of the engaging means has a engaging ring attached to the roller or the support ring, the engaging ring having a width W in the range of 0.5 mm≦W≦1.2 mm and a surface hardness in the range of HRC 43 to HRC 52.

Here, the constitution that "at least either one of the engaging means has a engaging ring attached to the roller or the support ring" includes the constitutions in which one of the engaging means is a engaging ring and the other engaging means consists of a engaging collar integrally arranged on the roller or the support ring, and the constitutions in which both of the engaging means are engaging rings. It also covers such a constitution that at least one of the engaging means consists of the engaging ring and another engaging element, e.g., of the engaging ring and a engaging collar. Furthermore, the term "engaging ring" includes not only solid support rings having perfect support ring shapes but also split rings partially split by a slit.

The engaging rings are set within the range of 0.5 mm≦W≦1.2 mm in width W for the following reason. The engaging rings, as described previously, undergo repeated axial loads via the rollers (or the support rings) and the needle rollers. It is thus essential to provide the engaging rings with appropriate toughness for the sake of higher capacity for the axial loads and higher fatigue strengths. That is, the provision of appropriate toughness for the engaging rings disperses the axial loads imposed on the engaging rings, resulting in an improvement in the fatigue strengths of the engaging rings. Besides, in constant velocity universal joints of this kind, engaging rings are often attached to the rollers or the support rings as contracted/expanded in diameter. Therefore, the provision of appropriate toughness to the engaging rings is also desirable in terms of mountability. Furthermore, in favor of simplified fabrication processes, consideration is desirably given to the workability of the engaging rings. The setting of the engaging rings within the range of 0.5 mm≦W≦1.2 mm in width W can provide appropriate toughness for the engaging rings, so that they are improved in the fatigue strength against axial loads and enhanced in the mountability to the rollers or support rings at the same time. Here, the engaging rings also improve in workability.

Meanwhile, in favor of higher fatigue strength against the axial loads and enhanced fatigue life of the contact surfaces, it is desirable that the surfaces of the engaging rings be provided with appropriate hardness for excellent wear resistance. It is for this reason that the engaging rings are set within the range of HRC 43 to HRC 53 in surface hardness. The term "HRC" here represents C scale in Rockwell hardness. Surface hardnesses below HRC 43 cannot provide the contact surfaces with sufficient fatigue life. Surface hardnesses above HRC 53 cause a drop in toughness, which is unfavorable in views of fatigue strength against axial loads and in terms of mountability.

In the constitution described above, at least surface layers of the engaging rings may contain a structure in which spheroidized carbide is distributed into a martensite matrix. Here, the phrase "at least surface layers of the engaging rings contain a structure in which spheroidized carbide is distributed into a martensite matrix" covers such constitutions that only the surface layers contain the above-mentioned structure, and that the above-mentioned structure extends from the surfaces to the insides.

According to this constitution, at least the surface layers of the engaging rings are provided with the structure with martensite matrix containing spheroidized carbide. This yields a wear resistance higher than those of steels for general structure, thereby improving the contact surfaces in fatigue life.

The above-mentioned carbide consists mainly of $Fe_3C$. The structure having such carbide distributed into its martensite matrix can be formed by providing at least the surface layers with carbon C as much as or more than its eutectic point (0.8% by weight or higher), and subjecting the same to hardening and tempering.

To be more specific, the engaging rings may be made of carbon tool steel, and the martensite matrix be provided with a spheroidized carbide content of 0.3–0.6% by weight. According to this constitution, the martensite matrix contains an appropriate amount of fine-spheroidized carbide, and therefore achieves higher wear resistance. In the meantime, the core portion is prevented from an excessive increase in hardness, and thus forms a structure of appropriate toughness. As a result, the contact surfaces of the engaging rings improve in fatigue life, as well as in the fatigue strength against axial loads. Moreover, since the engaging rings secure an appropriate toughness, they are also enhanced in the mountability to the rollers or support rings. Here, the martensite matrix is preferably limited to the range of 0.3–0.6% by weight in spheroidized carbide content. Spheroidized carbide contents below 0.3% by weight cannot produce the effect of improving the wear resistance sufficiently. In contrast, spheroidized carbide contents above 0.6% by weight can make the matrix so low in toughness as to fall short of the fatigue strength against axial loads and the mountability. The carbon tool steel may use SK3, SK4, SK5, SK6, and the like.

Otherwise, the engaging rings may be made of spring steel. According to this constitution, higher elastic limits can be achieved while maintaining high surface hardness. Therefore, the contact surfaces of the engaging rings improve in fatigue life as well as in the fatigue strength against axial loads. Moreover, the achievement of higher elastic limits further improves the engaging rings in mountability, which is also effective in automating the mounting process and thereby reducing the fabrication costs. The spring steel can be selected and used irrespective of type; an optimum one may be selected from among hot-forming spring steels and cold-forming spring steels in accordance with use conditions, joint size, and the like. For example, hot-forming spring steel SUP4 and the like may be used.

The engaging rings may also be made from a hard steel wire rod. Although slightly inferior in wear resistance as compared with the constitutions described above, this constitution provides higher elastic limits, and thereby disperses the axial loads imposed on the engaging ring. As a result, higher fatigue strengths against axial loads are obtained. Besides, hard steel wire rods are relatively inexpensive as well as effective at improving mountability. For example, the hard steel wire rod may use SWRH or the like.

In the above-described constitutions, the engaging rings are preferably attached to the rollers or the support rings with no play. The phrase "with no play" here refers to a state in which the engaging rings are mounted to the rollers or the support rings at least with no radial play. Elimination of axial play as well as the radial play is preferable. According to this constitution, the no-play attachment of the engaging rings to the rollers or the support rings stabilizes the areas of action (the load points) of the axial loads the engaging rings receive from the rollers or the support rings. This results in enhanced fatigue strength against axial load. Besides, the suppression of the load-point fluctuations also improves the fatigue life of the contact surfaces between the engaging rings and the rollers or the support rings.

In addition, the other of the engaging means may be composed of a engaging collar formed integrally on a roller or a support rings so that assembling tolerance due to the attachment of a engaging ring to this portion is eliminated. As a result, the axial clearances from the engaging means on both sides to the roller or the support ring can be reduced by half. This can make the above-described effects more significant.

In the constitutions described above, many minute dimples may be formed randomly at least in the contact surfaces of the engaging means (engaging rings and/or engaging collars). The minute dimples formed in the contact surfaces function as oil sumps to promote the formation of oil films on the contact surfaces, improving the lubricity and enhancing the rolling fatigue life of the contact surfaces. For example, the minute dimples have a size of several tens of μm or so, and a depth of 1 μm or so. Grinding conditions to the contact surfaces can be changed to form minute dimples of arbitrary size, depth, and number. When it is difficult to form minute dimples selectively in the contact surfaces alone, minute dimples may also be formed in the vicinities of the contact surfaces or over the entire surfaces of the engaging rings and the rollers/support rings.

A solid lubrication coating may be formed at least on the contact surfaces of the engaging means (the engaging rings and/or the engaging collars), with a chemical conversion coating as an undercoating. Since the solid lubrication coating reduces the frictional resistance on the contact surfaces and improves the lubricity, the contact surfaces improve in fatigue life. The chemical conversion coating to be the undercoating is formed with the objective of increasing the solid lubrication coating in adhesion to the contact surfaces. Examples of the chemical conversion coating include a manganous phosphate coating, an iron phosphate coating, and a zinc phosphate coating. Examples of the solid lubrication coating include a molybdenum disulfide coating and a PTFE coating. In this connection, the effect after the treatment depends on the pre-treatment surface roughness of the contact surfaces (base-material surfaces). It is therefore desirable that the contact surfaces be previously finished with a surface roughness of Ra 0.2–0.8 for the sake of appropriate oil-sump functions. In the cases where the selective application of coating to the contact surfaces alone is difficult, the coating may also be applied to the vicinities of the contact surfaces, or over the entire surfaces of the engaging rings and the rollers/support rings.

Cold sulfurizing may be applied at least to the contact surfaces of the engaging means (the engaging rings and/or the engaging collars). Sulfurizing is a surface treating method for infiltrating sulfur to the surface of steel to generate iron sulfide. The application of sulfurizing reduces the frictional resistance on the surface; therefore, the surface improves in initial conformability for enhanced rolling fatigue life and stabilized NVH performances as well. Since the cold sulfurizing is performed under such a condition as 30–40° C.×10–30 min., no hardness drop occurs in the surface hardened layers. The effect after the treatment depends on the pre-treatment surface roughness of the contact surfaces (base-material surfaces). Thus, it is desirable that the contact surfaces be previously finished with a surface roughness of Ra 0.2–0.8 for the sake of appropriate oil-sump functions. In the cases where the selective application of sulfurizing to the contact surfaces alone is difficult, the sulfurizing may also be applied to the vicinities of the contact surfaces, or over the entire surfaces of the engaging rings and the rollers/support rings.

Shot peening may be applied at least to the contact surfaces of the engaging means (the engaging rings and/or the engaging collars). With the conditions including the size of the shot particles, the speed of shot, and the amount of shot adjusted appropriately, minute dimples can be formed in the contact surfaces so that the minute dimples have the oil sump functions for improved lubricity. The application of the shot peening produces finer surface structures as well as causes residual compressive stress on the surfaces. Therefore, the shot peening is effective at improving the fatigue strength against axial loads and the fatigue life of the contact surfaces. In the cases where the selective application of shot peening to the contact surfaces alone is difficult, the shot peening may also be applied to the vicinities of the contact surfaces, or over the entire surfaces of the engaging rings and the rollers/support rings.

The constant velocity universal joints according to the present invention may use roller assemblies each including a roller to be guided by the roller guideways and the support ring mounted on the outer periphery of the trunnion to support the roller rotatably, wherein: the inner periphery of the support ring is shaped arcuate and convex in section; and the outer periphery of the trunnion is shaped straight in longitudinal section, and formed in cross section so as to make contact with the inner periphery of the support ring in a direction perpendicular to the axis of the joint and create a clearance with the inner periphery of the support ring in an axial direction of the joint. Otherwise, the constant velocity universal joints according to the present invention may use roller assemblies each including a roller to be guided by the roller guideways and a support ring fitted on the outer periphery of the trunnion to support the roller rotatably, wherein: the trunnion has a convex-spherical outer periphery; and the support ring has a cylindrical or conical inner periphery. Since the details of these constitutions are identical to those described previously, description thereof will be omitted.

According to the present invention, the engaging means, especially the engaging rings to be attached to the rollers/support rings, improve in the fatigue strength against axial loads and in the fatigue life of their contact surfaces. This makes it possible to provide a tripod type constant velocity universal joint of superior durability and strengths while maintaining its current dimensions, as well as to provide a tripod type constant velocity universal joint of more compact configuration while securing durability and strengths equivalent to or higher than those of existing products.

The nature, principle, and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 3 is an enlarged sectional view of a support ring;

FIG. 10 is an enlarged sectional view of a support ring;

FIG. 21 is an enlarged sectional view of a support ring in FIGS. 20(A)–20(C);

FIGS. 22(A) and 22(B) show a tripod type constant velocity universal joint according to a sixth embodiment of the present invention, FIG. 22(A) being a partially-sectioned end view of the same, and FIG. 22(B) an enlarged cross-sectional view of the essential parts in FIG. 22(A);

DETAILED DESCRIPTION OF THE PREFERRED EMBODIMENTS

Hereinafter, description will be given of the embodiments of the present invention.

Figure 1A:
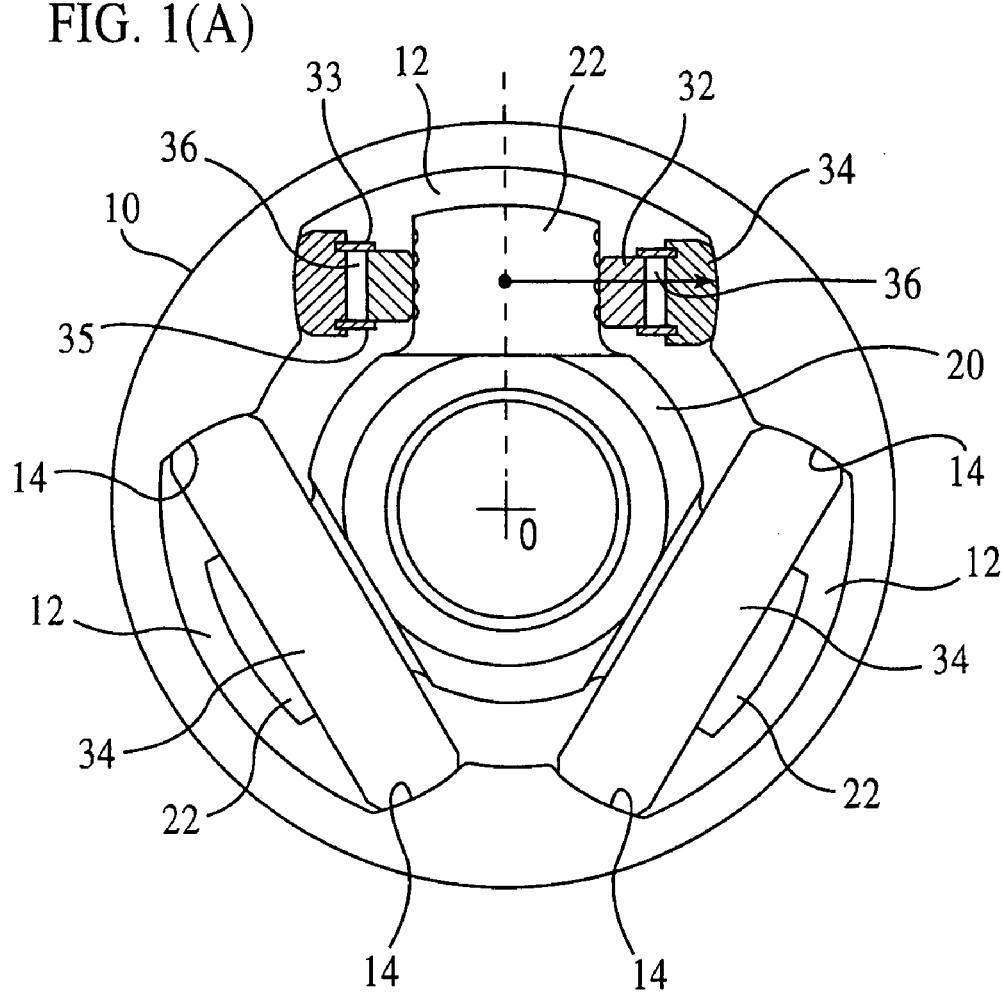
FIGS. 1(A)–1(C) show a tripod type constant velocity universal joint according to a first embodiment of the present invention, FIG. 1(A) being a partially-sectioned end view of the same, FIG. 1(B) a sectional view perpendicular to a trunnion, and FIG. 1(C) a sectional view of a support ring.

FIGS. 1(A) through 2(B) shows a tripod type constant velocity universal joint according to a first embodiment of the present invention. FIG. 1(A) shows an end face of the joint (partially sectioned), and FIG. 2(A) shows a longitudinal section of the joint at an operating angle of θ. The constant velocity universal joint is chiefly composed of an outer joint member 10 and a tripod member 20. The outer joint member 10 is connected to one of two shafts to be coupled, and the tripod member 20 is to the other.

Figure 1B:
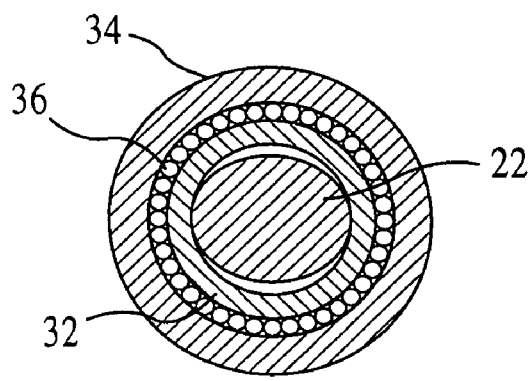

The outer joint member 10 has three track grooves 12 axially extending in its inner periphery. Each of the track grooves 12 has roller guideways 14 formed on its circumferentially-opposed side walls. The tripod member 20 has three trunnions 22 projecting radially. Each of the trunnions 22 carries a roller 34, and this roller 34 is accommodated in one of the track grooves 12 in the outer joint member 10. In each track groove 12, the roller guideways 14 opposed to each other in the circumferential direction of the joint form part of a cylindrical surface parallel to the axis of the outer joint member 10. The outer periphery of each roller 34 is a partial spherical surface with the center of curvature on the axis of the trunnion 22. Accordingly, the rollers 34 are tiltable in the track grooves 12. An annular support ring 32 is fitted onto the outer periphery of each trunnion 22. This support ring 32 and the roller 34 are unitized via a plurality of needle rollers 36 to constitute a roller assembly capable of relative rotations therebetween. More specifically, the needle rollers 36 are rotatably interposed between inner and outer raceway surfaces, with the cylindrical outer periphery of the support ring 32 and the cylindrical inner periphery of the roller 34 as the inner and outer raceway surfaces, respectively. As shown in FIG. 1(B), the needle rollers 36 are arranged in a so-called full complement state, where the rollers are loaded in as many as possible without any retainer. The reference numerals 33 and 35 designate a pair of washers which are fitted to annular grooves formed in the inner periphery of each roller 34, with an aim to stop the needle rollers 36 from coming off. Each of the washers 33, 35 has a cut across its circumferential direction (see FIG. 4(B)) so as to be fitted to the annular groove in the inner periphery of the roller 34 as elastically contracted in diameter.

In longitudinal section (FIGS. 1(A) and 2(A)), each trunnion 22 has an outer periphery of straight shape, parallel to the axis of the trunnion 22. In cross section (FIG. 1(B)), the trunnion 22 has a generally ellipse shape with the major axis orthogonal to the axis of the joint. The cross section of the trunnion 22 is generally elliptic in shape, with a shrinkage in the non-load direction, or in thickness as seen in the axial direction of the tripod member 20, when compared with the load direction. In other words, each trunnion 22 has such a cross-sectional configuration that the faces opposed to each other in the axial direction of the tripod member 20 retreat toward each other, i.e., to smaller diameters than the diameter of the imaginary cylindrical surface.

The inner periphery of each support ring 32 is arcuate and convex in section. That is, the generatrix to the inner periphery is a convex arc having a radius of r (FIG. 1(C)). This combines with the above-described general elliptic cross sections of the trunnions 22 and the provision of predetermined clearances between the trunnions 22 and the support rings 32, to allow the support rings 32 to move along the axial directions of the trunnions 22 as well as make tilting movements with respect to the trunnions 22. In addition, the support rings 32 and the rollers 34 are unitized via the needle rollers 36 so as to be capable of relative rotations as described above. Therefore, the support rings 32 and rollers 34 are capable of unitary tilting movements with respect to the trunnions 22. Here, the term "tilting movements" refers to the tilts the axes of the support rings 32 and rollers 34 make with respect to the axes of the trunnions 22, within the planes containing the axes of the trunnions 22 (see FIG. 2(A)).

In conventional joints, trunnions make contact with the inner peripheries of support rings at the full lengths of their outer peripheries. This produces circumferentially extended contacting ellipses. Therefore, when the trunnions tilt with respect to the outer joint member, there arise friction moments which function to tilt the support rings, and finally the rollers, with the movement of the trunnions. Meanwhile, in the embodiment shown in FIGS. 1(A)–1(C), the generally elliptic cross sections of the trunnions 22 and the inner peripheries of the support rings 32 whose generatrixs are convex arcs with radius r make the contacting ellipses closer to points as shown by the broken line in FIG. 1(C), with a reduction in area at the same time. As a result, the forces to tilt the roller assemblies (32, 34) decrease greatly as compared to the conventional ones, with a further improvement in the orientation stability of the rollers (34).

As shown in FIG. 3, each support ring 32 may comprise a combination of an arc portion at the center and relief portions 32b on both sides. The role of the relief portions 32b is to avoid the interference with the trunnion 22 at an operating angle of θ as shown in FIG. 2(A). Each relief portion 32b is formed by a straight or curved line that gradually spreads out in diameter from an edge of the arc portion 32a to an end of the support ring 32. The relief portions 32b illustrated here are formed as part of a conical surface having a vertex angle α=50°. The arc portion 32a has a large radius of curvature, for example, of the order of 30 mm so that the trunnion 22 can make a tilt of 2–3° or so with respect to the support ring 32.

In tripod type constant velocity universal joints, one rotation of the outer joint member 10 constitutionally produces three nutations of the tripod member 20 with respect to the center of the outer joint member 10. Here, the amount of eccentricity represented by the reference symbol e (in FIG. 2(A)) increases in proportion to the operating angle θ. While the three trunnions 22 are spaced by 120° from one another, the operating angle θ causes the trunnions 22 to tilt as shown in FIG. 2(B). More specifically, with reference to the vertical trunnion 22 shown to the upper in the diagram, the remaining two trunnions 22 are declined slightly from their zero-operation-angle axes shown by the dot-dash lines. For example, an operating angle θ of approximately 23° causes a decline of the order of 2–3°. This decline can be readily allowed by the curvature of the arc portions 32a on the inner peripheries of the support rings 32. Therefore, the surface pressures at the contact portions between the trunnions 22 and the support rings 32 can be prevented from increasing excessively. FIG. 2(B) is a schematic representation of the three trunnions 22 of the tripod member 20 as seen from the left side of FIG. 2(A), the full lines showing the individual trunnions. The major axis 2a of each trunnion 22 and the inner diameter of the corresponding support ring 32 create a clearance for absorbing the tilt of the trunnion 22 resulting from the nutation of the tripod member 20. Examples of specific figures to this clearance are listed in Table 1.

TABLE 1

| OPERATING ANGLE θ (°) | r: OPTIMUM VALUE (MINIMUM SURFACE PRESSURE) | MINIMUM CLEARANCE FOR NUTATION ABSORPTION |
|---|---|---|
| 15 | 2.898a | $1.131 \times 10^{-3}$a |
| 10 | 4.731a | $0.330 \times 10^{-3}$a |
| 5 | 10.392a | $0.041 \times 10^{-3}$a |

Figure 4B:
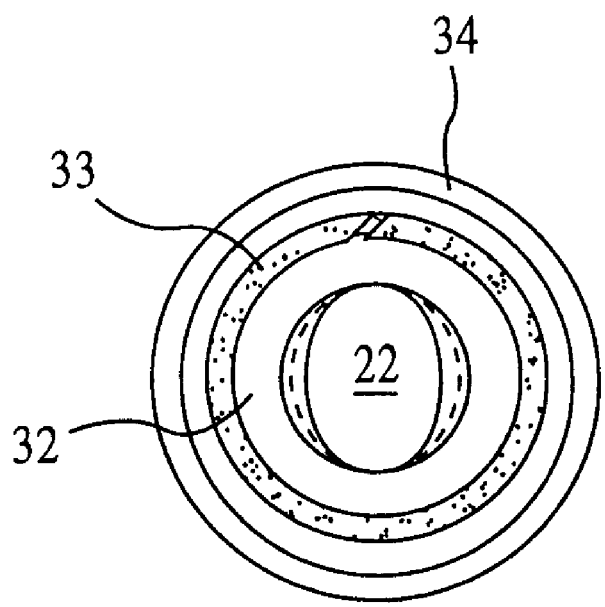
FIG. 4(B) is a plan view of the trunnion and the roller assembly.

In the constant velocity universal joint of the present embodiment, relaxation of surface pressures is required due to the fact that the trunnions 22 having the generally elliptic cross sections and the support rings 32 having the circular cross sections make contact with each other for torque transmission. Hereinafter, this point will be explained with reference to FIGS. 4(A) and 4(B). Incidentally, the vertical direction in FIG. 4(B) represents the load direction, and the horizontal the non-load direction.

Figure 4A:
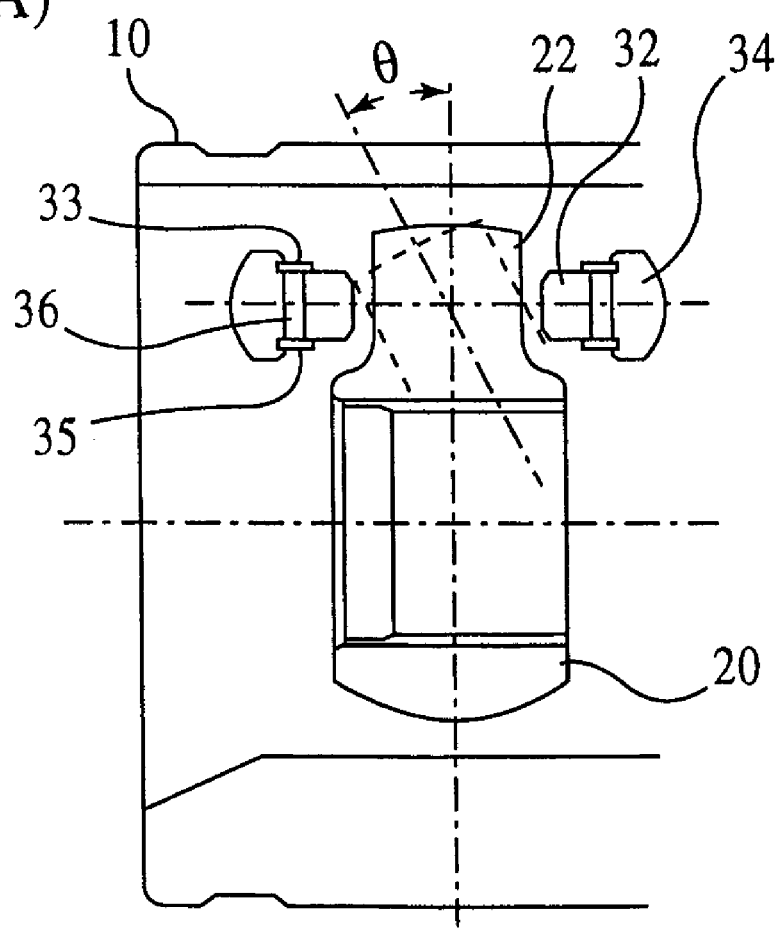
FIG. 4 (A) is a longitudinal sectional view of the constant velocity universal joint, showing the relationship between a trunnion and a roller assembly.

When the joint transmits torque at an operating angle of θ, each trunnion 22 makes reciprocating movements with respect to its support ring 32 within the bounds of the operating angle θ, as shown by the broken lines in FIG. 4(A). Here, in the non-load direction, the trunnion 22 and the support ring 32 have a relatively large clearance, which allows the trunnion 22 to swing without interfering with the support ring 32. In the load direction, however, the trunnion 22 increases in apparent curvature as shown by the broken line in FIG. 4(B) as the operating angle θ widens to increase the tilt of the trunnion 22. When the apparent curvature exceeds the curvature of the inner diameter of the support ring 32, the trunnion 22 comes into two-point contact with the support ring 32. Then, the trunnion 22 cannot tilt freely by itself, and starts to involve the support ring 32, and finally the roller assembly (32, 34), in its inclination. On this account, the cross-sectional constitution of the trunnions 22, especially the dimensions in the load direction, are determined so that the trunnions 22 can tilt within a predetermined angle range by themselves without interfering with the support rings 32.

Figure 1C:
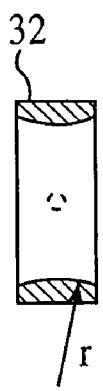
Figure 2:
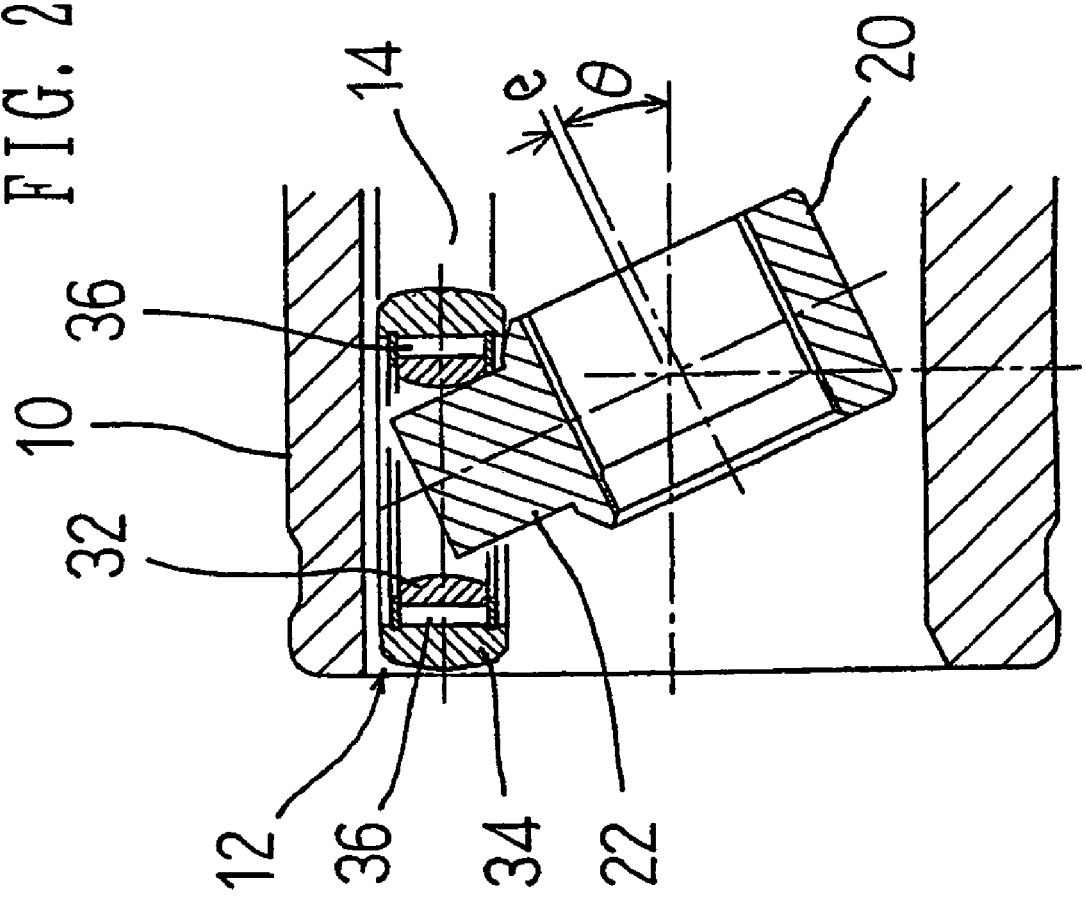
FIG. 2(A) is a longitudinal sectional view showing the constant velocity universal joint of FIGS. 1(A)–1(C) with an operating angle.
FIG. 2(B) is a schematic side view of the tripod member in FIG. 2(A)
Figure 2:
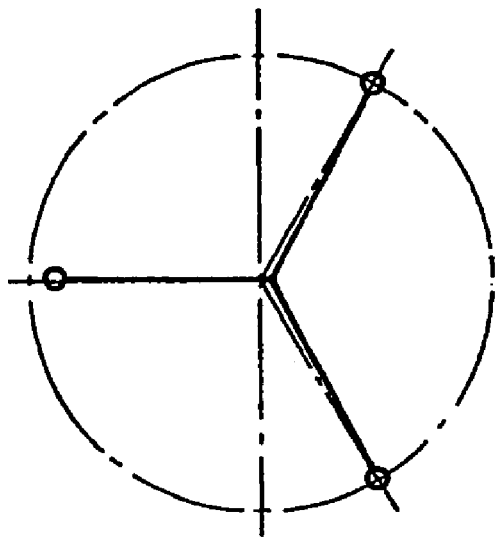
Figure 5:
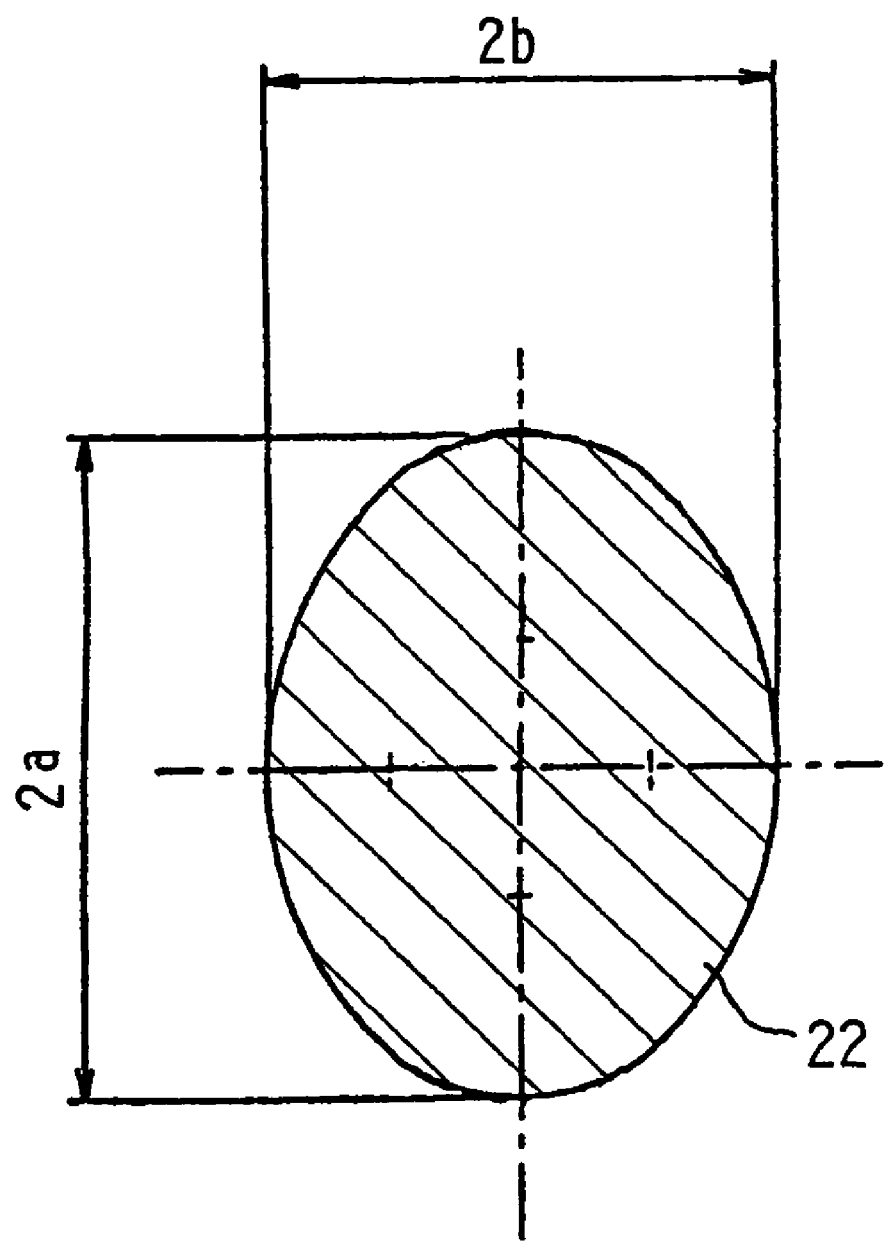
FIG. 5 is a cross-sectional view of a trunnion.

Specifically, assuming that the maximum operating angle θ max is 25°, the setting that allows the joint to take the maximum operating angle without tilting the support rings 32 and minimize the surface pressures between the trunnions 22 and the support rings 32 is as follows:

r=1.369a b/a=0.759, where a and b are the semimajor and semiminor axes of the generally elliptic cross section of a trunnion 22, respectively (see FIG. 5), and r is the radius of curvature of the inner periphery of a support ring (see FIGS. 1(C) and 3). Given that the radius of curvature r of the support ring inner periphery has a recommendable range of 0.5r and 1.5r, i.e., 0.684a and 2.053a, the ellipticity b/a falls within the range of 0.836 and 0.647.

Although feasible in terms of configuration, the above-described setting may cause too high a surface pressure between the trunnions 22 and the support rings 32 to make practical use of the joint for motor vehicles. Therefore, in the cases where lower vibrations are desired under the range of normal operating angles in automotive applications, the non-tilting angles of the roller assemblies (32, 34) can be lowered to reduce the surface pressures and allow the practical use of the joint. For example, Table 2 lists optimum values and recommendable ranges for the radius of curvature r of the support ring's inner periphery and the ellipticity b/a, assuming that the normal operating angle θ is greater than 5° and smaller than 15°.

TABLE 2

| | NO-ROLLER-TILT ANGLE | OPTIMUM VALUE (MINIMUM SURFACE PRESSURE) | RECOMMENDABLE RANGE | |
|---|---|---|---|---|
| | | | 0.5 r | 1.5 r |
| r | 15 | 2.898a | 1.449a | 4.347a |
| | 10 | 4.731a | 2.365a | 7.096a |
| | 5 | 10.392a | 5.196a | 15.588a |
| b/a | 15 | 0.859 | 0.914 | 0.801 |
| | 10 | 0.909 | 0.948 | 0.869 |
| | 5 | 0.956 | 0.976 | 0.935 |

Figure 6:
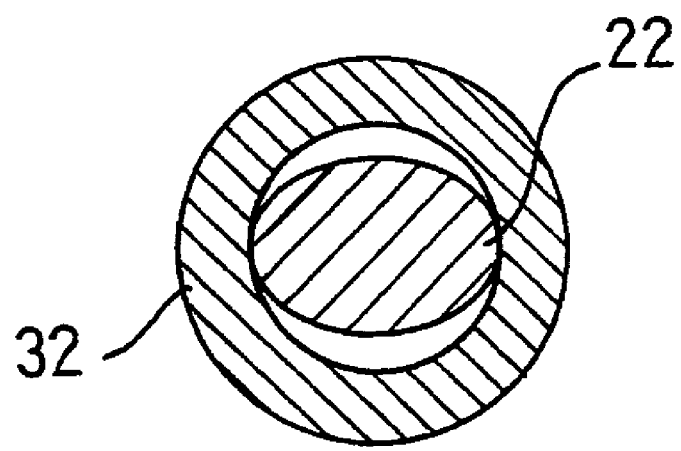
FIG. 6(A) is a sectional view taken along the axial direction of a trunnion, showing the trunnion and a roller assembly.
FIG. 6(B) is a sectional view perpendicular to the trunnion, showing the trunnion and a support ring.
Figure 6:
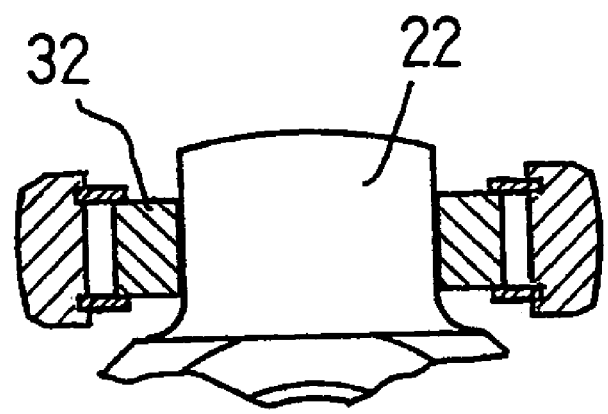
Figure 7:
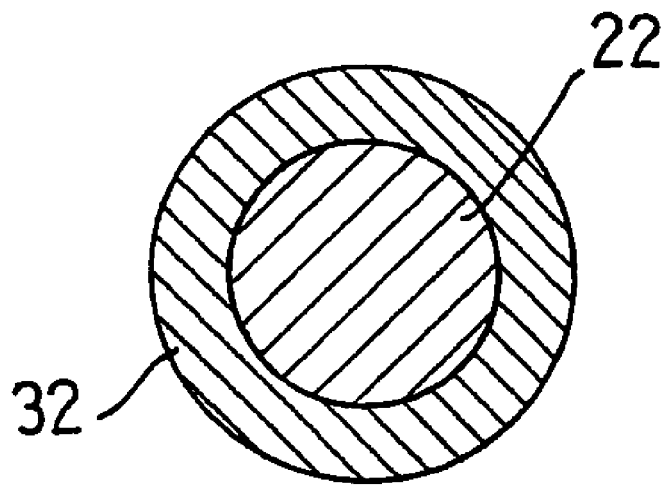
FIG. 7(A) is a sectional view taken along the axial direction of a trunnion, showing the trunnion and a roller assembly.
FIG. 7(B) is a sectional view perpendicular to the trunnion, showing the trunnion and a support ring.
Figure 7:
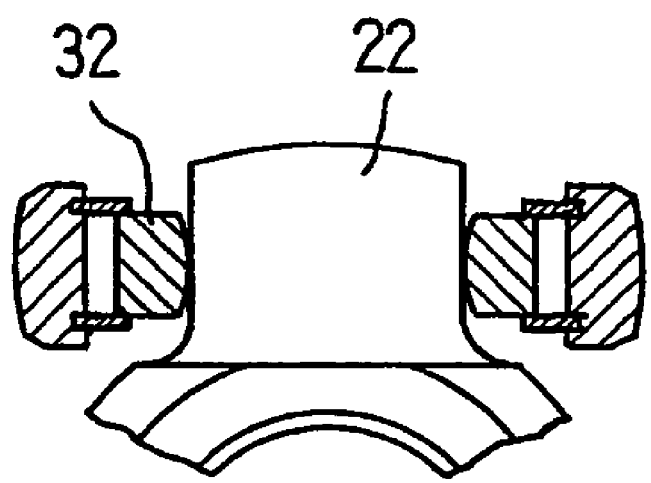

The above-described embodiment is built on the combination of the trunnions 22 having general arc cross sections and the support rings 32 having the convex arc inner peripheries. However, other combinations may be adopted instead. For example, as shown in FIGS. 6(A)–7(B), trunnions 22 and support rings 32 may be put into line contact with each other for lower surface pressures. In the embodiment of FIGS. 6(A) and 6(B), a support ring 32 having a cylindrical inner periphery is fitted onto a trunnion 22 having an elliptic cross section. Here, the two members are in line contact with each other along the axial direction. In the embodiment of FIGS. 7(A) and 7(B), a support ring 32 having a convex arc inner periphery is fitted onto a trunnion 22 having a cylindrical outer periphery. Here, the two members are in line contact with each other along the circumferential direction. Both of these constitutions are made feasible by the capability of the rollers 34 to tilt inside the track grooves 12. More specifically, the tilt angle the trunnions 22 can take with respect to the support rings 32 is limited, and hence the roller assemblies (32, 34) come to tilt when the joint transmits torque at an operating angle. Then, this tilt is allowed by the rollers 34 tilting inside the track grooves 12.

Figure 8:
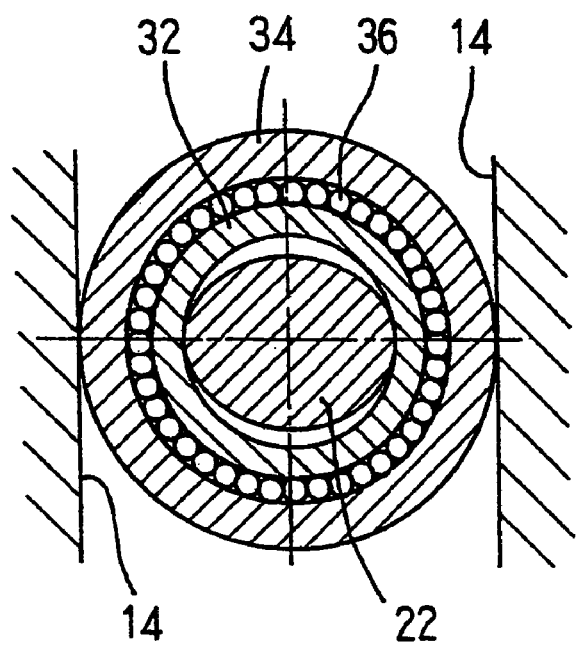
FIGS. 8(A) and 8(B) show a tripod type constant velocity universal joint according to a second embodiment of the present invention, FIG. 8(A) being a partially-sectioned end view of the same and FIG. 8(B) a sectional view perpendicular to a trunnion.
Figure 8:
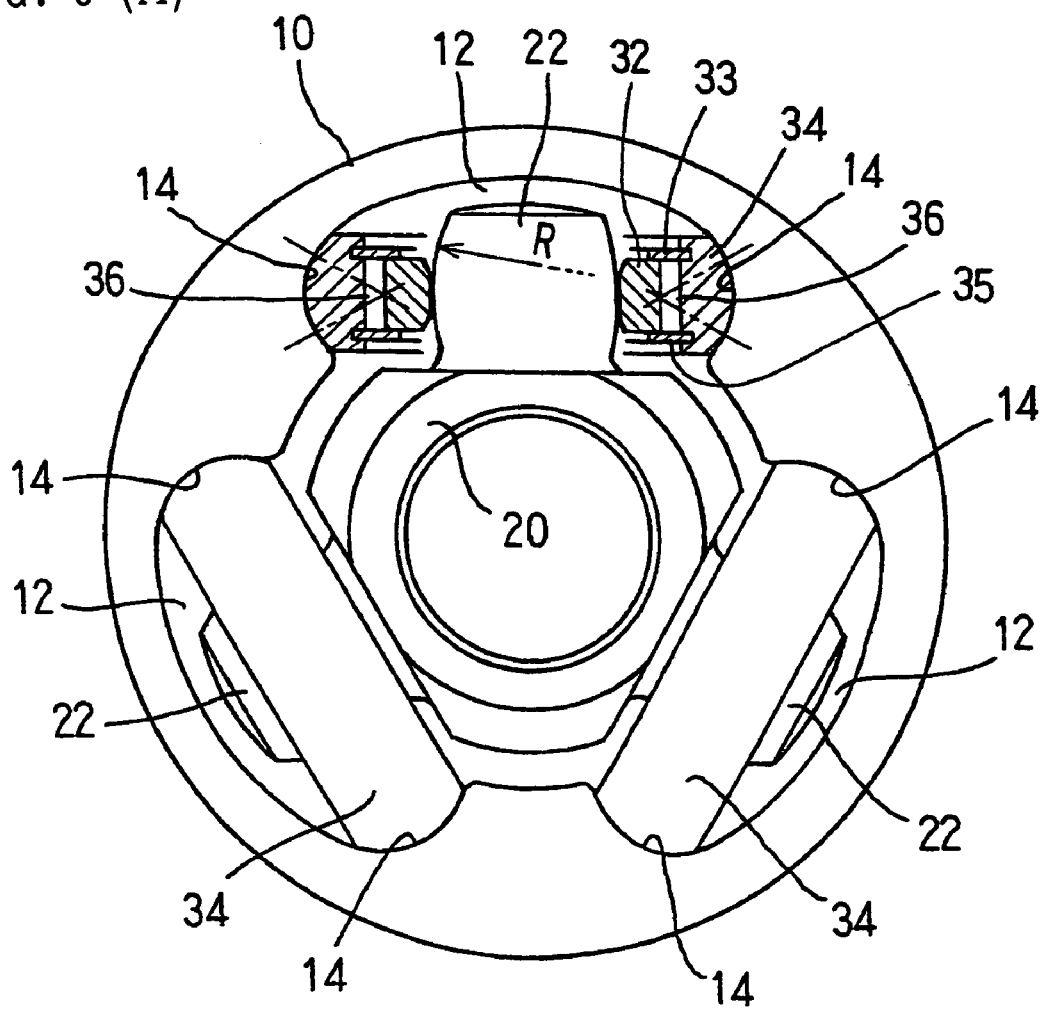

FIGS. 8(A) through 9(B) show a tripod type constant velocity universal joint according to a second embodiment of the present invention. Here, FIG. 8(A) is an end view of the joint (partially sectioned). FIG. 8(B) shows a section perpendicular to a trunnion. FIG. 9(A) shows a longitudinal section of the joint at an operating angle of θ. The constant velocity universal joint is chiefly composed of an outer joint member 10 and a tripod member 20. The outer joint member 10 is connected to one of two shafts to be coupled, and the tripod member 20 is connected to the other.

As shown in FIGS. 8(A) and 8(B), the outer joint member 10 has three track grooves 12 axially extending in its inner periphery. Each of the track grooves 12 has roller guideways 14 formed on its circumferentially-opposed side walls. The tripod member 20 has three trunnions 22 projecting radially. A roller 34 is attached to each of the trunnions 22, and this roller 34 is accommodated in one of the track grooves 12 in the outer joint member 10. The roller 34 has an outer periphery having a sectional configuration conforming to the roller guideways 14.

The outer periphery of each roller 34 forms a convex surface whose generatrix is an arc having the center of curvature radially off the axis of the trunnion 22. The roller guideways 14 have a section of Gothic arc shape. Thus, the roller 34 and the roller guideways 14 make angular contacts with each other. In FIG. 8(A), dot-dash lines show the two contact positions. Although omitted from the drawings, the spherical outer periphery of the roller may be combined with tapered cross sections of the roller guideways 14 to achieve angular contacts therebetween. The adoption of such constitutions as provide angular contacts between the rollers 34 and the roller guideways 14 makes the rollers less prone to vibrate, thereby stabilizing the orientations of the rollers. Incidentally, when angular contacts are not adopted, the roller guideways 14 may comprise, for example, by part of a cylindrical surface whose axis is parallel to that of the outer joint member 10. In this case, the cross-sectional configuration of the guideways 14 may be an arc corresponding to the generatrix to the outer peripheries of the rollers 34.

Figure 11:
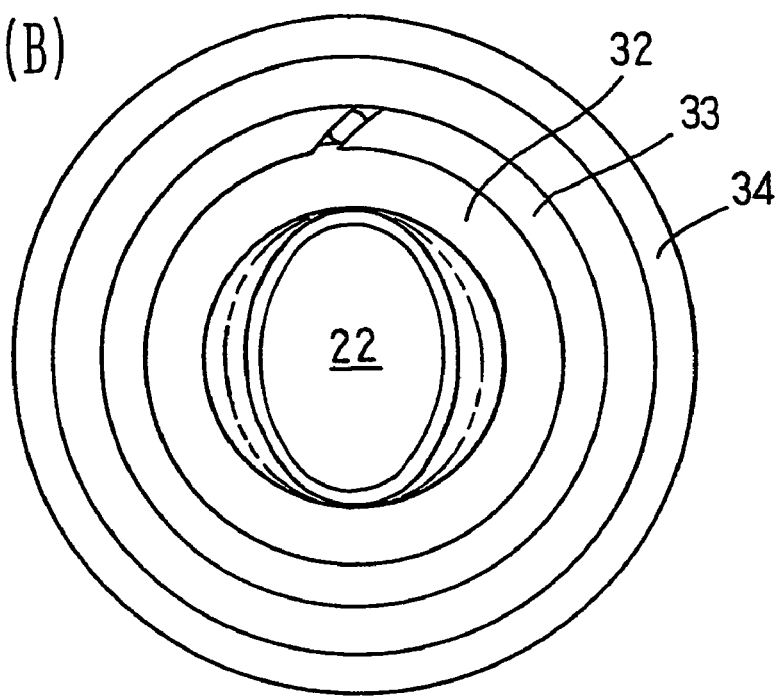
FIG. 11(A) is a sectional view of a tripod member and a roller assembly.
FIG. 11(B) is a plan view of the same.
Figure 11:
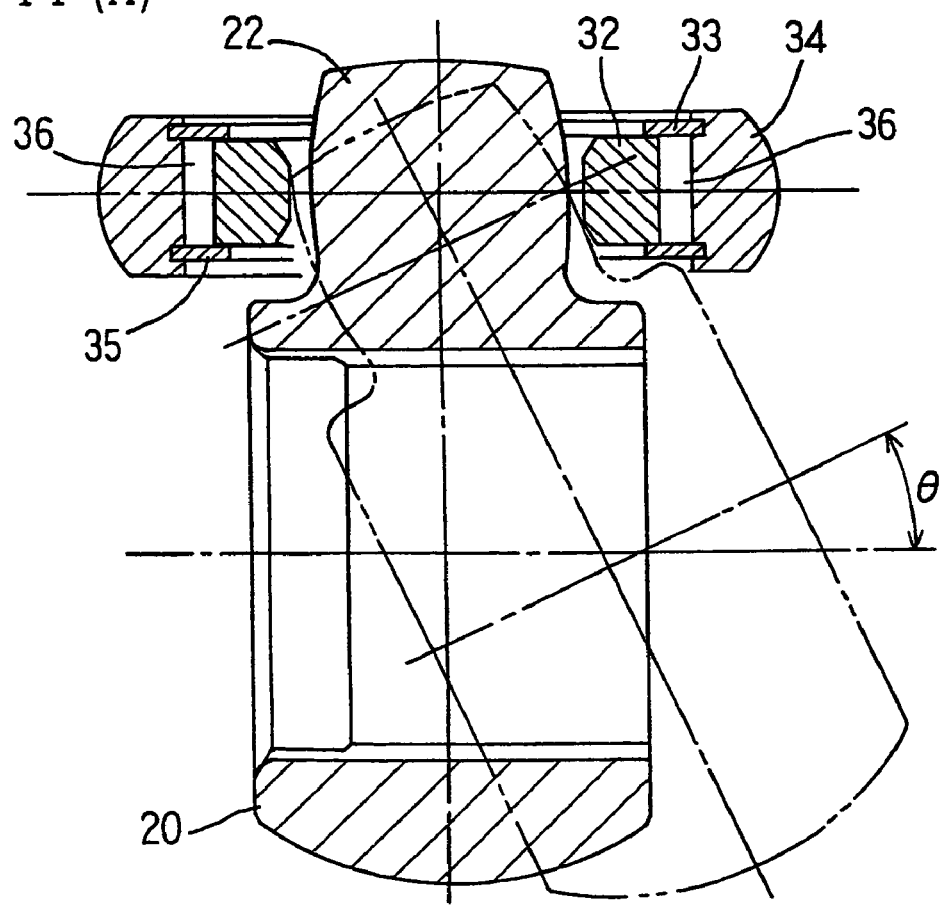
Figure 12B:
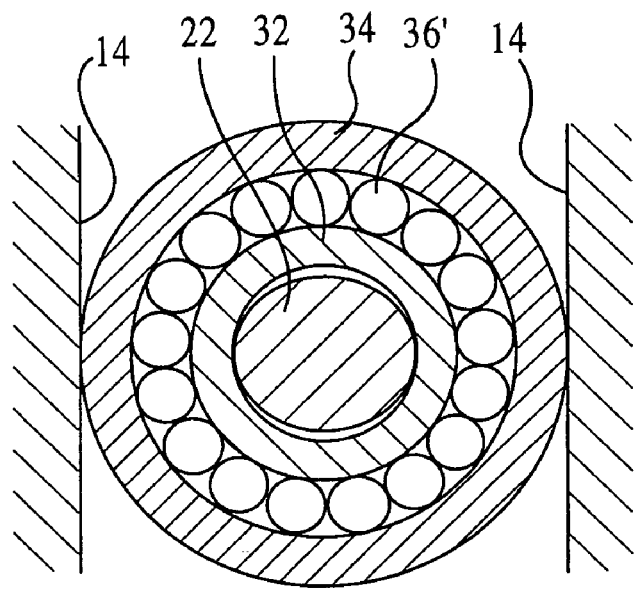
FIGS. 12(A) and 12(B) show a tripod type constant velocity universal joint according to a third embodiment of the present invention, FIG. 12(A) being a partially-sectioned end view of the same, and FIG. 12(B) a sectional view perpendicular to a trunnion.
Figure 12A:
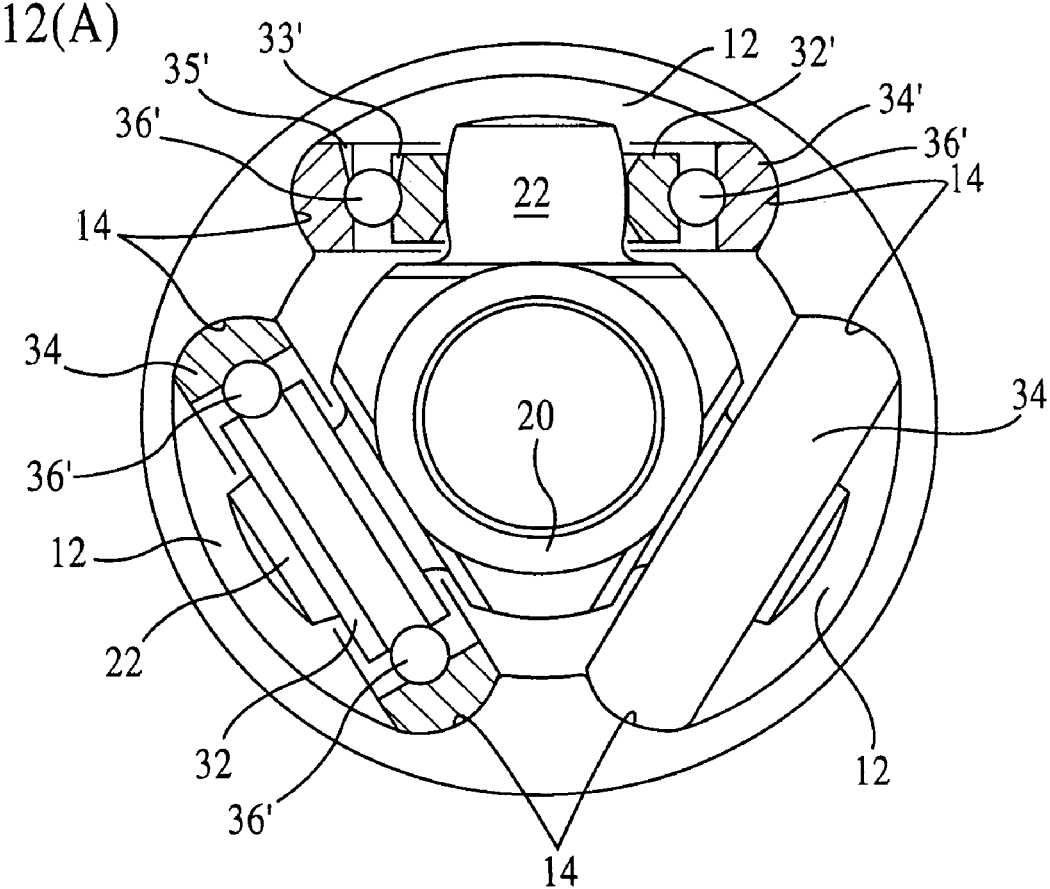
Figure 13:
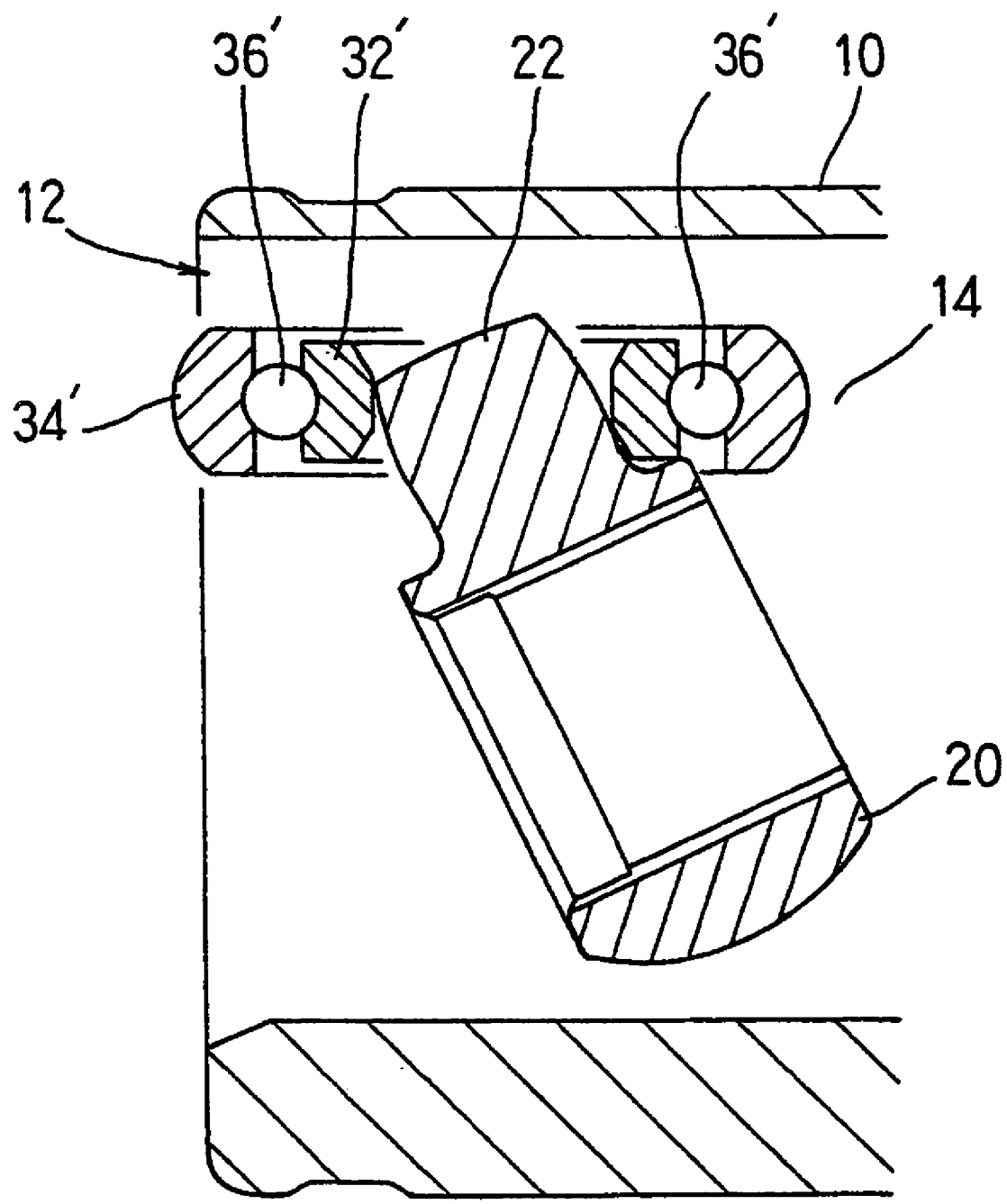
FIG. 13 is a longitudinal sectional view showing the constant velocity universal joint with an operating angle.
Figure 14:
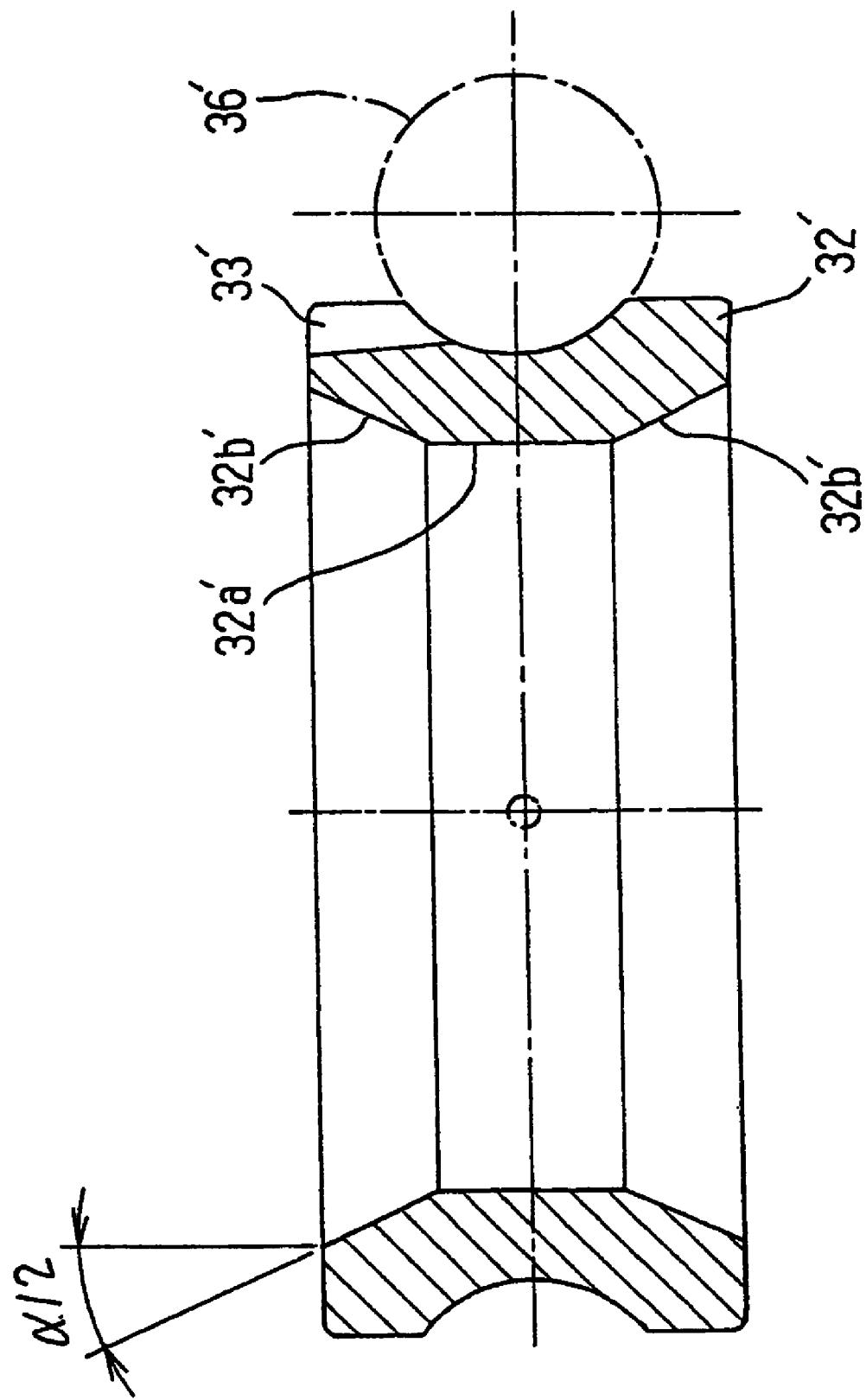
FIG. 14 is an enlarged sectional view of a support ring.

A support ring 32 is fitted onto the outer periphery of each trunnion 22. This support ring 32 and the roller 34 are unitized via a plurality of needle rollers 36 to constitute a roller assembly capable of relative rotations therebetween. More specifically, the needle rollers 36 are rotatably interposed between inner and outer raceway surfaces, with the cylindrical outer periphery of the support ring 32 and the cylindrical inner periphery of the roller 34 as the inner and outer raceway surfaces, respectively. As shown in FIG. 8(B), the needle rollers 36 are arranged in a so-called full complement state, where the rollers are loaded in as many as possible without any retainer. The reference numerals 33 and 35 represent a pair of washers which are fitted to annular grooves formed in the inner periphery of each roller 34, with an aim to stop the needle rollers 36 from coming off. These washers 33, 35 have a cut across their circumferential directions (see FIG. 11(B)), so that they are inserted into the rollers 34 as elastically contracted in diameter and then fitted to the annular grooves with the aid of their elastic expanding forces.

Figure 9A:
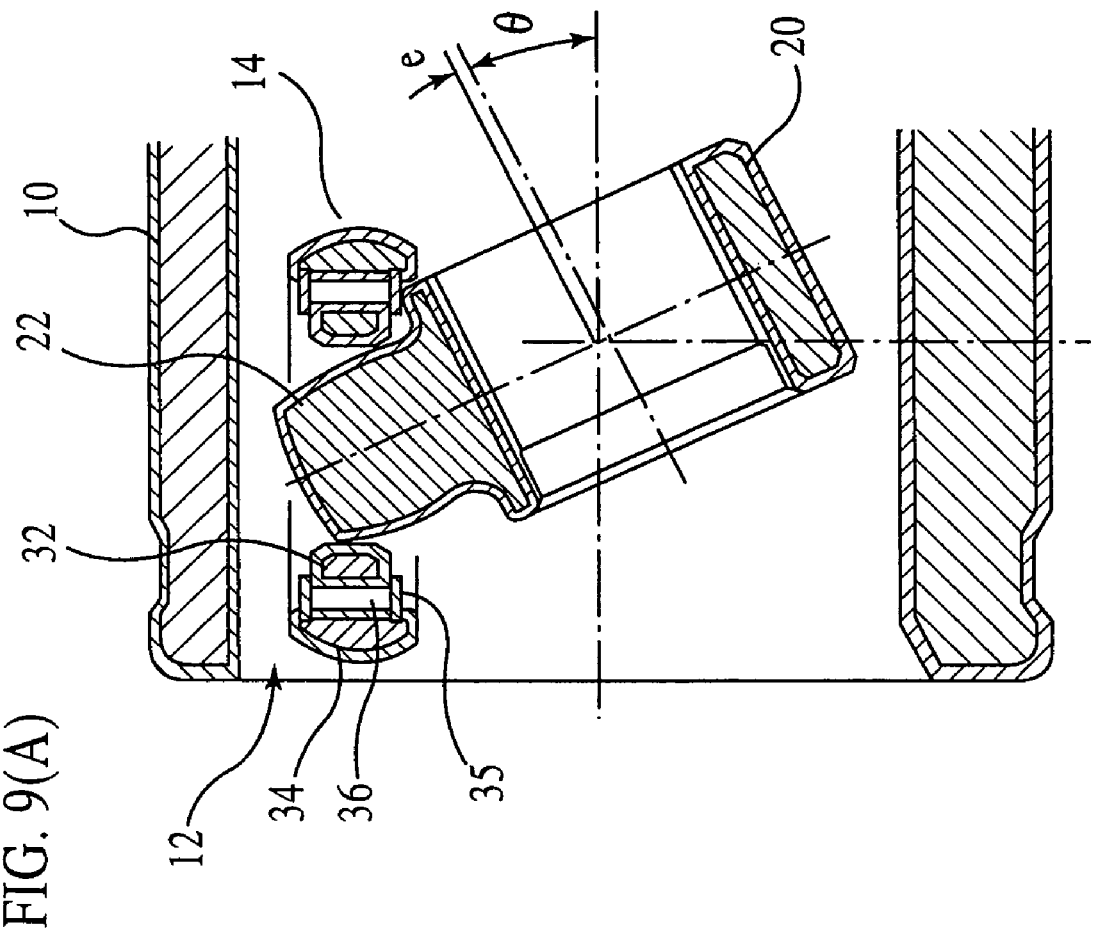
FIG. 9(A) is a longitudinal sectional view showing the constant velocity universal joint of FIGS. 8(A) and 8(B) with an operating angle.

In longitudinal section (FIG. 8(A) or 9(A)), each trunnion 22 has an outer periphery comprising a convex curve that bulges outward at the center, or a convex arc having a radius of curvature of R for example. In cross section (FIG. 8(B)), the trunnion 22 has the form of an ellipse whose major axis is orthogonal to the axis of the joint. In other words, each trunnion has such a cross-sectional configuration that the faces opposed to each other in the axial direction of the tripod member 20 retreat toward each other, i.e., to smaller diameters than the diameter of the imaginary cylindrical surface.

As shown in FIG. 10, each support ring 32 has a cylindrical inner periphery. This combines with the above-described, convex-curved longitudinal sections of the trunnions 22 to make the support rings 32 movable along the axial directions of the trunnions 22 as well as capable of tilting movements with respect to the trunnions 22. In addition, the support rings 32 and the rollers 34 are unitized via the needle rollers 36 so as to be capable of relative rotations as described above. Therefore, the support rings 32 and rollers 34 are capable of unitary tilting movements with respect to the trunnions 22. Here, the term "tilt movements" refers to tilts the axes of the support rings 32 and rollers 34 make with respect to the axes of the trunnions 22, within the planes containing the axes of the trunnions 22 (see FIG. 9(A)).

The support rings 32 may have an inner periphery shaped cylindrical over most of its width, whereas the generatrix to the inner peripheries of the support rings 32 here combines a cylindrical portion 32a at the center and relief portions 32b on both sides. The role of the relief portions 32b is to avoid the interference with the trunnions 22 at an operating angle of θ as shown in FIGS. 9(A) and 11(A). Each relief portion 32b is formed by a straight or curved line that gradually spreads out in diameter from an edge of the arc portion 32a to an end of the support ring 32. The relief portions 32b illustrated here are formed as part of a conical surface having a vertex angle α=50°.

Figure 9B:
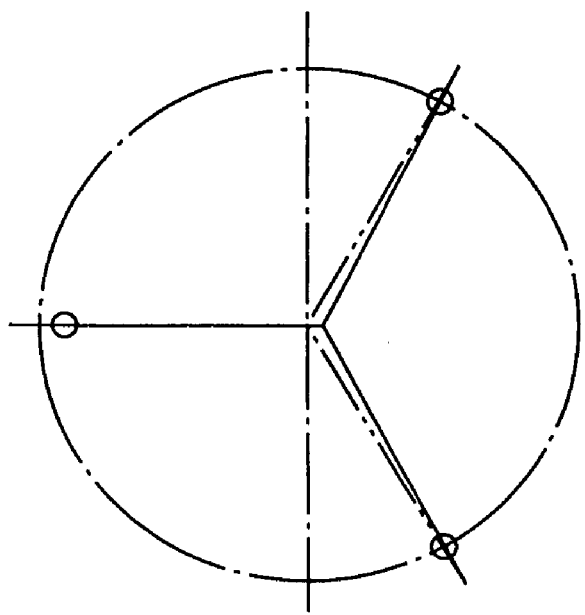
FIG. 9(B) is a schematic side view of the tripod member in FIG. 9(A)

In tripod type constant velocity universal joints, one rotation of the outer joint member 10 constitutionally produces three nutations of the tripod member 20 with respect to the center of the outer joint member 10. Here, the amount of eccentricity represented by the reference symbol e (FIG. 9(A)) increases in proportion to the operating angle θ. While the three trunnions 22 are spaced by 120° from one another, the operating angle θ causes the trunnions 22 to tilt as shown in FIG. 9(B). More specifically, with reference to the vertical trunnion 22 shown to the upper in the diagram, the remaining two trunnions 22 are declined slightly from their zero-operation-angle axes shown by the dot-dash lines. For example, an operating angle θ of approximately 23° causes a decline of the order of 2–3°. This decline can be readily allowed by the curvature of the arc portions 32a on the inner peripheries of the support rings 32 so that the surface pressures at the contact portions between the trunnions 22 and the support rings 32 are prevented from increasing excessively.

In conventional joints, trunnions make contact with the inner peripheries of support rings at the full lengths of their outer peripheries, thereby creating circumferentially extended contacting ellipses. Therefore, when the trunnions tilt with respect to the outer joint member, there occur friction moments which function to tilt the support rings, and finally the rollers, with the movement of the trunnions. On the other hand, in the embodiment shown in FIGS. 8(A) and 8(B), the elliptic cross sections of the trunnions 22 and the cylindrical inner peripheries of the support rings 32 create contacting ellipses closer to points as shown by the broken line in FIG. 10, with a reduction in area at the same time. As a result, the forces to tilt the roller assemblies (32, 34) decrease greatly as compared to the conventional ones, with a further improvement in the orientation stability of the rollers 34.

Moreover, conventional joints have ribs for restraining their rollers from tilting. These ribs are formed on the bottom sides of the track grooves, i.e., on the sides of greater diameter as seen in the cross section of the outer joint member 10, so as to be opposed to the end faces of the rollers. In the individual embodiments above as well as those to be described later, however, roller-tilting factors are reduced. Accordingly, such ribs in the track grooves 12 are not always required, and may be omitted. This eliminates the fear that the rollers might come into contact with the ribs to produce sliding frictions when they are momentarily swung by some reason.

FIG. 12(A) through 14 show an embodiment in which balls 36' are used as the rolling elements instead of the needle rollers 36 in the above-described embodiments. There is no other essential differences from what has been described in conjunction with FIGS. 8(A) through 11(B), except in the following two points. First, the use of the balls 36' involves the formation of raceway surfaces in the outer peripheries of the support rings 32 and the inner peripheries of the rollers 34. Second, the washers 33, 35 are eliminated, and support rings 32' and rollers 34' are then provided with insert holes 33' and 35' for use in the installation of the balls 36'.

In the constant velocity universal joint of the present embodiment, the trunnions 22 having an elliptic cross section and the support rings 32 having a circular cross section make contact with each other for torque transmission, as shown in FIGS. 11(A) and 11(B). It is thus desirable that the surface pressures therebetween be relaxed. Hereinafter, description will be given of the specific means for that purpose. Incidentally, the vertical direction in FIG. 11(B) represents the load direction, and the horizontal the non-load direction.

When the joint transmits torque with an operating angle of θ, each trunnion 22 makes reciprocating movements with respect to the corresponding support ring 32 within the bounds of the operating angle θ, as shown by the double-dashed chain lines in FIGS. 11(A) and 11(B). Here, in the non-load direction, the trunnion 22 and the support ring 32 have a relatively large clearance, which allows the trunnion 22 to swing without interfering with the support ring 32. In the load direction, however, the trunnion 22 increases in apparent curvature as shown by the double-dashed chain line in FIG. 11(B) as the operating angle θ widens to increase the tilt of the trunnion 22. When the apparent curvature exceeds the curvature of the inner diameter of the support ring 32, the trunnion 22 comes into two-point contact with the support ring 32. Then, the trunnion 22 cannot tilt freely by itself any longer, and starts to involve the support ring 32, and finally the roller assembly (32, 34), in its inclination. On this account, the cross-sectional configuration of the trunnions 22, especially the dimensions in the load direction, are determined so that the trunnions 22 can swing within a predetermined angle range by themselves without interfering with the support rings 32.

Figure 15:
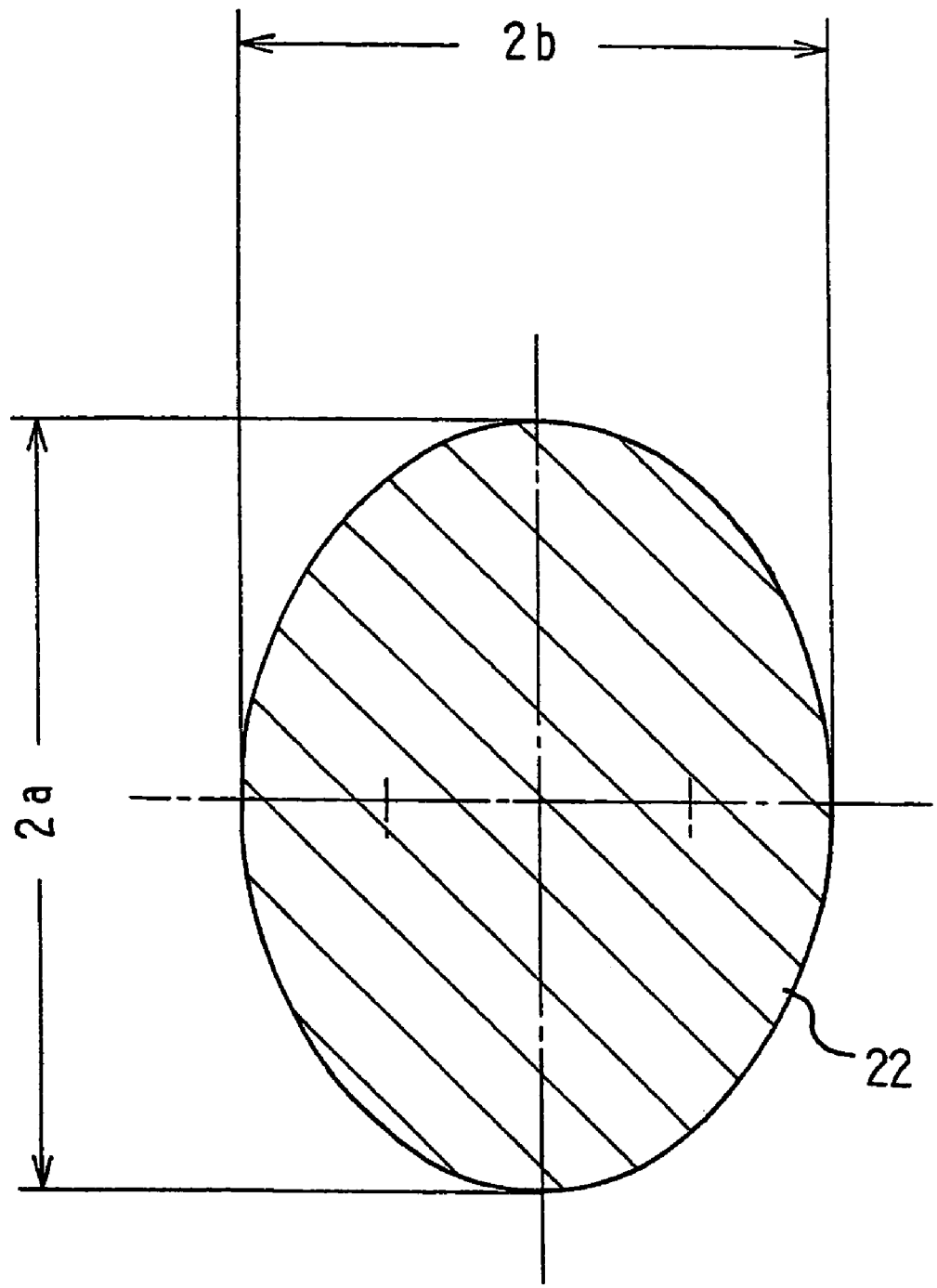
FIG. 15 is a cross-sectional view of a trunnion.

Specifically, assuming that the maximum operating angle θ max is 25°, the following setting allows the joint to take the maximum operating angle without tilting the support rings 32, and render the contacting ellipses between the trunnions 22 and the support rings 32 closer to a circle (minimum ellipse) at an operating angle of 0°:

b/a=0.841
R=2.380a, where a and b are the semimajor and semiminor axes of the generally elliptic cross section of a trunnion 22, respectively, and R is the radius of curvature of the inner periphery of a support ring, as shown in FIG. 15. Given that the radius of curvature R has a recommendable range of 0.5R and 1.5R, i.e., 1.190a and 3.570a, the ellipticity b/a falls within the range of 0.983 and 0.669.

Although feasible in terms of configuration, the above-described setting may cause too high a surface pressure between the trunnions 22 and the support rings 32 to make practical use of the joint for motor vehicles. Therefore, in the cases where vibrations are required under the range of normal operating angles in automotive applications, the operating angle can be lowered to the extent that the roller assemblies (32, 34) will not tilt. This decreases the surface pressures to allow practical use of the joint. For example, Table 3 lists optimum values and recommendable ranges for the radius of curvature R and the ellipticity b/a of the support ring's inner periphery, assuming that the normal operating angle θ is greater than 100 and smaller than 20°.

TABLE 3

|     | OPERATING ANGLE θ (°) | OPTIMUM VALUE (MINIMUM SURFACE PRESSURE) | RECOMMENDABLE RANGE | |
|-----|-----|-----|-----|-----|
|     |     |     | 0.5 r | 1.5 r |
| R   | 20  | 2.939a | 1.469a | 4.408a |
|     | 15  | 3.888a | 1.944a | 5.832a |
|     | 10  | 5.810a | 2.905a | 8.715a |
| b/a | 20  | 0.866  | 0.972  | 0.745  |
|     | 15  | 0.894  | 0.968  | 0.812  |
|     | 10  | 0.925  | 0.973  | 0.875  |

Figure 16:
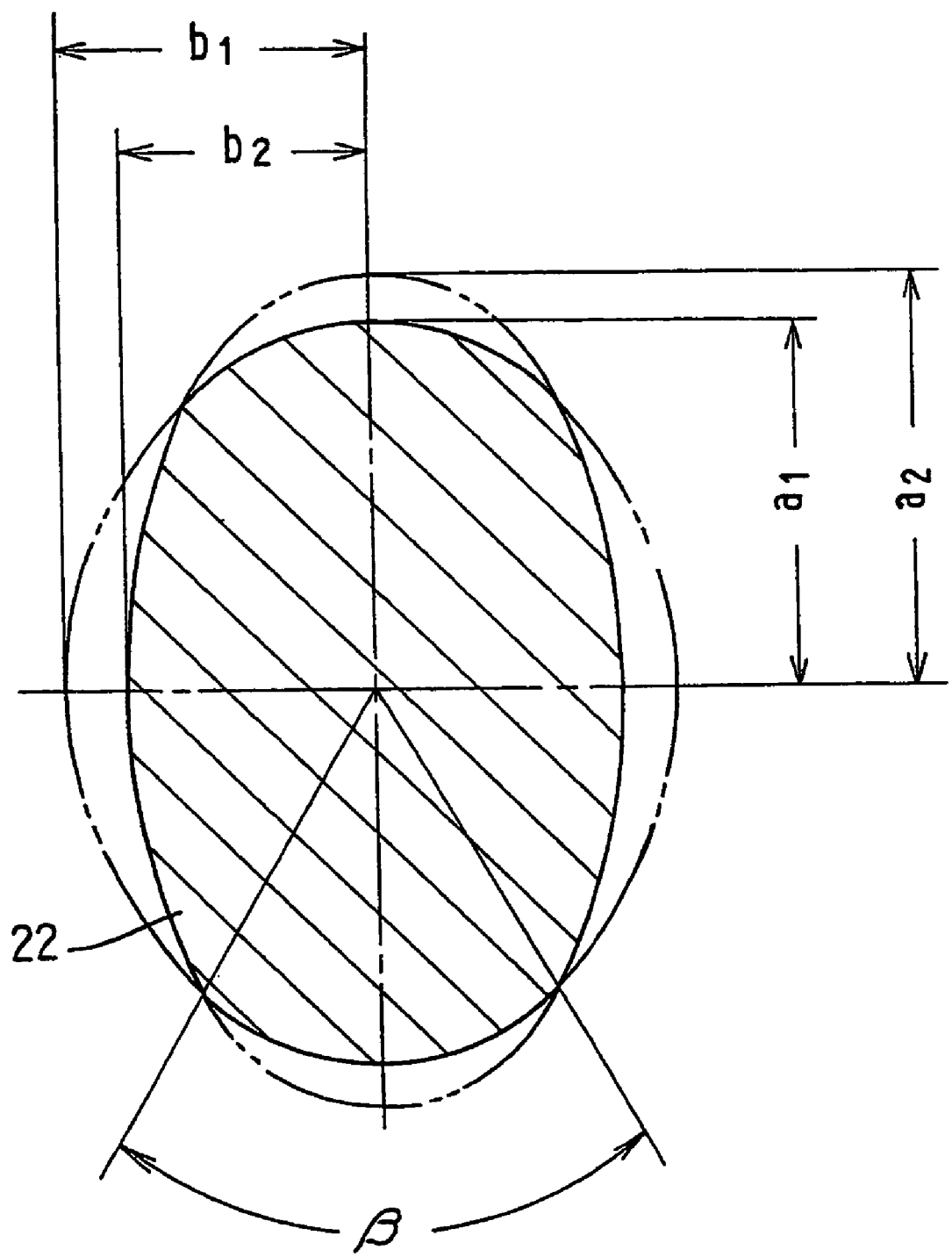
FIG. 16 is a cross-sectional view of a trunnion.

As mentioned previously, the smaller the ellipticity b/a of the elliptic cross sections of the trunnions 22 is, the greater operating angle the trunnions 22 can take without tilting the roller assemblies (32, 34). Smaller ellipticities, however, increases the surface pressures on the contact areas and decreases the strength of the trunnions 22. Accordingly, in the embodiment shown in FIG. 16, a trunnion 22 is provided with a cross section of composite elliptic configuration. That is, a greater ellipticity b1/a1 is applied exclusively to the areas for making contact with a support ring 32, i.e., to the contact areas β, while the remaining non-contact areas are formed with an ellipticity b2/a2 such as simply prevents the interference at the maximum operating angle. For example, given that the normal operating angle θmax is 15° and the radius of curvature R for the inner periphery of the support ring 32 is 3.888a, the ellipticity b1/a1 to the contact areas and the ellipticity b2/a2 to the non-contact areas are set at 0.894 and 0.704, respectively. Incidentally, FIG. 16 shows only one contact area β to the lower. It seems needless to add that another contact area exists to the upper in the diagram since the trunnion 22 has a symmetric cross section.

Figure 17:
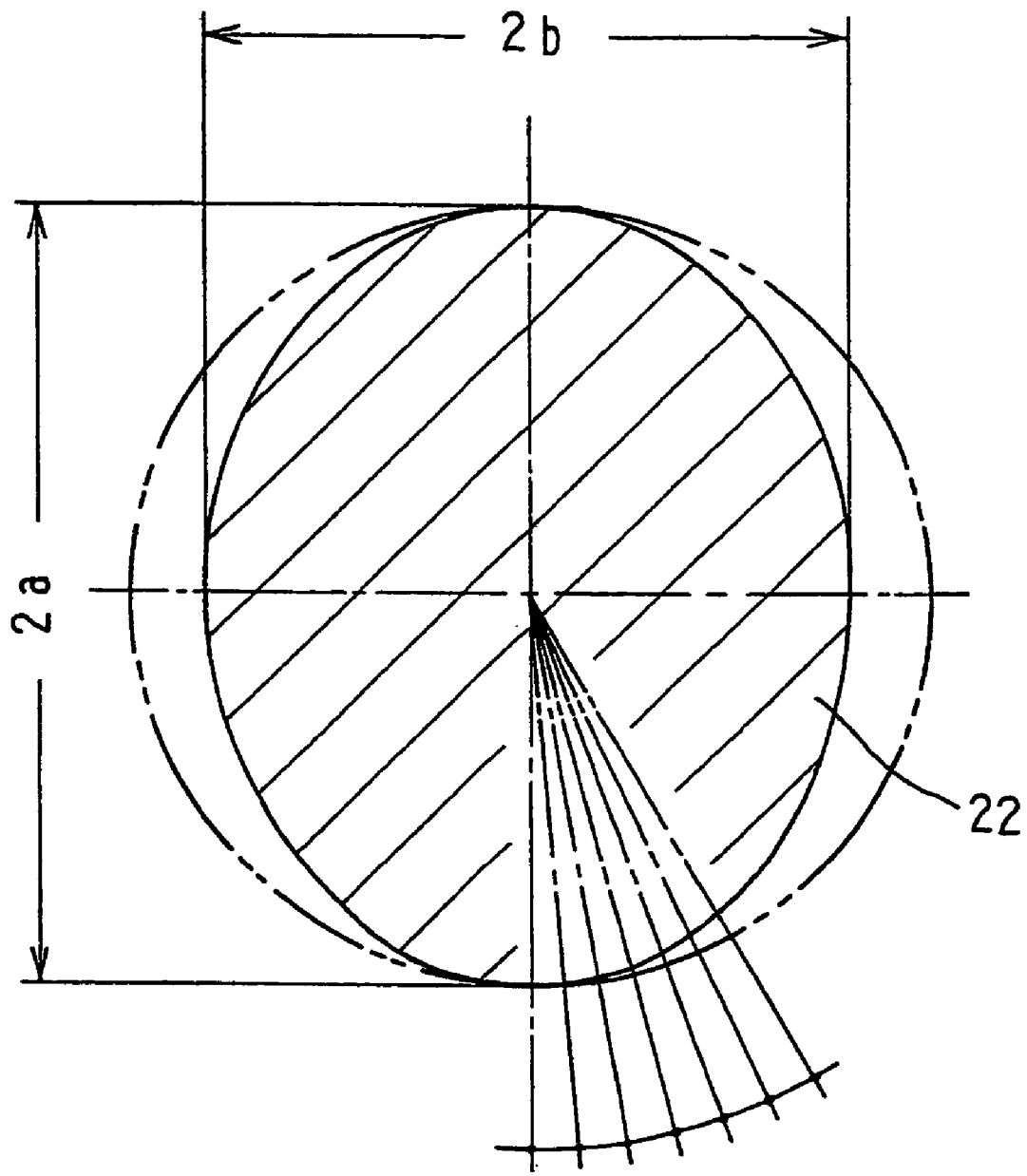
FIG. 17 is a cross-sectional view of a trunnion.

Moreover, FIG. 17 shows an embodiment in which the contact areas β mentioned above are not made of a single ellipse but formed with a continuously varying ellipticity (b/a). For example, on the same assumption as employed above that the normal operating angle θmax is 15° and the radius of curvature R to the inner periphery of the trunnion 22 is 3.888a, the ellipticity varies as follows: That is, in the contact areas, the ellipticity starts with a value of 1.0 at the intersections with the major axis. It gradually decreases with increasing distance from the intersections. Then, the ellipticity ends up with a value of 0.704 in the non-contact areas.

Alternatively, the ellipticity may decrease gradually from 1.0 to 0.704 as approaching from the major-axis sides to the minor-axis sides, irrespective of contact and non-contact areas. Shown in FIG. 17 is an example in which the ellipticity is 1.0 at the intersections of the contact areas with the major axis, and the radius of curvature gradually decreases with increasing distance from the intersections, for example, at predetermined angles as shown in the diagram.

Since the trunnion 22 has an elliptic cross section as described above, grinding has only to be applied to the load-side contact areas (β) where a high degree of precision is needed. The remaining non-contact areas may be machined so as to retreat to smaller diameters than the diameter of the original ellipse (shown by the double-dashed chain line in FIG. 17) for the purpose of grind relief. In this connection, the formation of the grind relief portions does not necessarily require intentional application of cutting or other machining. These portions may be so shaped upon the forging of the trunnions and then left forge-finished. This reduces the machining time and cuts down the cost as well.

Figure 18:
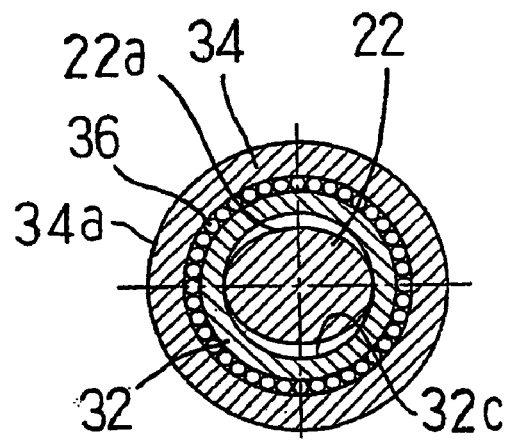
FIGS. 18(A)–18(C) show a tripod type constant velocity universal joint according to a fourth embodiment of the present invention, FIG. 18(A) being a partially-sectioned end view of the same, FIG. 18(B) a sectional view perpendicular to a trunnion in FIG. 18(A), and FIG. 18(C) a sectional view of a support ring for explaining a contacting ellipse.
Figure 18:
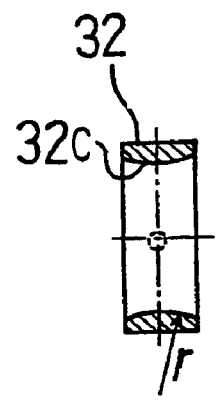
Figure 18:
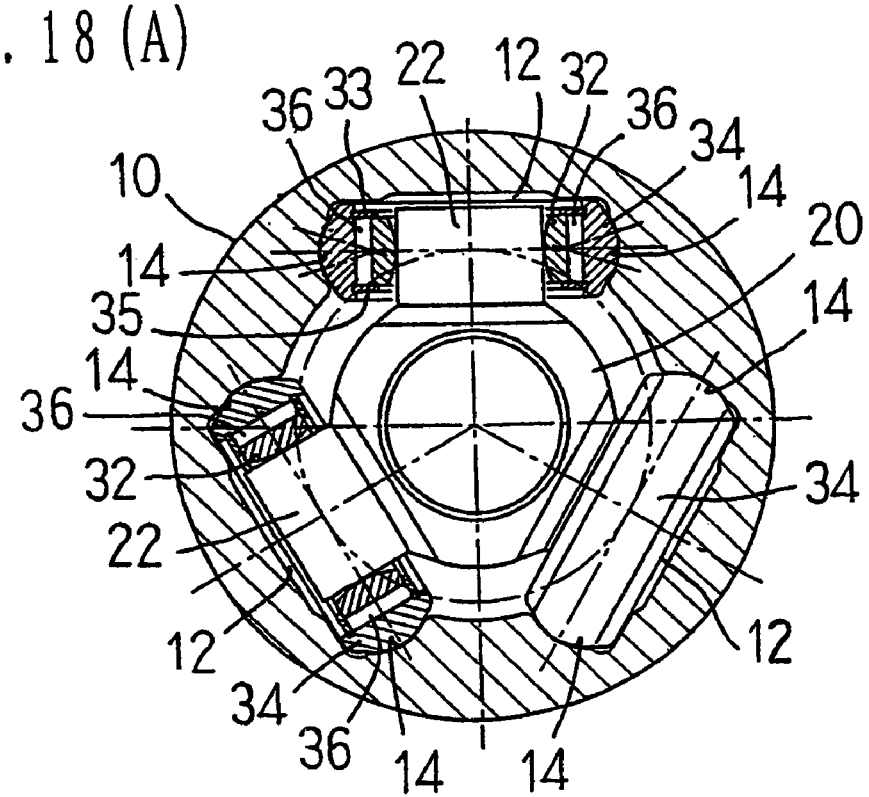

FIGS. 18(A) through 19(B) show a tripod type constant velocity universal joint according to a fourth embodiment of the present invention. FIG. 18(A) shows a cross section of the joint, FIG. 18(B) a section perpendicular to a trunnion, and FIG. 18(C) a section of a support ring. FIG. 19(A) shows a longitudinal section of the joint with an operating angle (θ).

As shown in FIGS. 18(A)–18(C), the constant velocity universal joint is chiefly composed of an outer joint member 10 and a tripod member 20. The outer joint member 10 is connected to one of two shafts to be coupled, and the tripod member 20 is connected to the other.

The outer joint member 10 has three track grooves 12 axially extending in its inner periphery. Each of the track grooves 12 has roller guideways 14 formed on its circumferentially-opposed side walls. The tripod member 20 has three trunnions 22 projecting radially. A roller 34 is attached to each of the trunnions 22, and this roller 34 is accommodated in one of the track grooves 12 in the outer joint member 10. The roller 34 has an outer periphery that forms a convex surface conforming to the roller guideways 14.

Here, the outer periphery 34a of each roller 34 forms a convex surface whose generatrix is an arc having the center of curvature radially off the axis of the trunnion 22. The roller guideways 14 have a section of Gothic arc shape. Thus, the outer peripheries 34a of the rollers 34 and the roller guideways 14 make angular contacts with each other. In FIG. 18(A), dot-dash lines show the two contact positions. The spherical outer peripheries of the rollers may also be combined with tapered cross sections of the roller guideways 14 to achieve angular contacts therebetween. The adoption of such constitutions as provide angular contacts between the rollers 34 and the roller guideways 14 makes the rollers less prone to vibrate, thereby stabilizing the orientations of the rollers. Incidentally, when angular contacts are not adopted, the roller guideways 14 may be formed, for example, by part of a cylindrical surface whose axis is parallel to that of the outer joint member 10. In this case, the cross-sectional configuration of the guideways 14 may be an arc corresponding to the generatrix to the outer peripheries of the rollers 34.

A support ring 32 is fitted onto the outer periphery 22a of each trunnion 22. This support ring 32 and the roller 34 are unitized via a plurality of needle rollers 36 to constitute a roller assembly capable of relative rotations. More specifically, the needle rollers 36 are rotatably interposed between inner and outer raceway surfaces, with the cylindrical outer periphery of the support ring 32 and the cylindrical inner periphery of the roller 34 as the inner and outer raceway surfaces, respectively. As shown in FIG. 18(B), the needle rollers 36 are arranged in a so-called full complement state, where the rollers are loaded in as many as possible without any retainer. The reference numerals 33 and 35 represent a pair of engaging rings which are fitted to annular grooves formed in the inner periphery of each roller 34, with an aim to stop the needle rollers 36 from coming off.

In longitudinal section (FIG. 18(A)), the outer periphery 22a of each trunnion 22 has a straight shape parallel to the axis of the trunnions 22. In cross section (FIG. 18(B)), the trunnion 22 has the form of an ellipse whose major axis is orthogonal to the axis of the joint. The cross section of the trunnion 22 is shaped to be generally elliptic with a reduction in thickness as seen in the axial direction of the tripod member 20. In other words, each trunnion has such a cross-sectional configuration that the faces opposed to each other in the axial direction of the tripod member retreat toward each other, i.e., to smaller diameters than the diameter of the imaginary cylindrical surface.

The inner periphery of each support ring 32 is arcuate and convex in section. That is, the generatrix to the inner periphery 32c is a convex arc having a radius of r (FIG. 18(C)). This combines with the above-described general elliptic cross sections of the trunnions 22 and the provision of predetermined clearances between the trunnions 22 and the support rings 32, to make the support rings 32 movable along the axial directions of the trunnions 22 as well as capable of tilting movements with respect to the trunnions 22. In addition, the support rings 32 and the rollers 34 are assembled (unitized) via the needle rollers 36 to be capable of relative rotations, as described above. Therefore, the support rings 32 and rollers 34 are capable of unitary tilting movements with respect to the trunnions 22. Here, the term "tilt movements" refers to the tilts the axes of the support rings 32 and rollers 34 make with respect to the axes of the trunnions 22, within the planes containing the axes of the trunnions 22 (see FIG. 19(A)).

In conventional joints of this kind, trunnion make contact with the inner peripheries of support rings at the full lengths of their outer peripheries. This produces circumferentially extended contacting ellipses. Therefore, when the trunnions tilt with respect to the outer joint member, there arise friction moments which function to tilt the support rings, and finally the rollers, with the movement of the trunnions. On the other hand, in the embodiment shown in FIGS. 18(A)–18(C), the generally elliptic cross sections of the trunnions 22 and the cylindrical cross sections of the inner peripheries of the support rings 32 make contacting ellipses closer to points as shown by the broken line in FIG. 18(C), with a reduction in area at the same time. As a result, the forces to tilt the roller assemblies (32, 34, 36) decrease greatly as compared to the conventional ones, with a further improvement in the orientation stability of the rollers 34.

In the above-described constitutions, the tripod member 20 is made of steel material having a carbon content of 0.15–0.40% by weight, through the major processes of forging→machining→carburizing and tempering→grinding of the outer peripheries 22a of the trunnions 22. The softening resistance characteristic value R on the outer peripheries 22a of the trunnions 22 and other surfaces of the completed tripod member 20 is limited to the range of 705<R≦820, and preferably 710<R≦810. Accordingly, in the tripod member 20, the outer peripheries 22a of the trunnions 22 have a longer rolling fatigue life. Moreover, the bottom portions of the trunnions 22 and the serration portion (or spline portion) have higher torsional fatigue strength and the like as well as excellent durability and strength.

In this connection, adoption of carbonitriding and tempering instead of the carburizing and tempering in the processes described above is more effective in enhancing the rolling fatigue life, torsional fatigue life, and the like.

Moreover, the surface layers formed by the carburizing and tempering (carburized layers) or the surface portions formed by the carbonitriding and tempering (carbonitrided layers) can be adjusted to 20–40% by volume in residual austenite content to improve the surface crack sensitivity for yet longer rolling fatigue life.

Otherwise, the tripod member 20 may be made of steel material having a carbon content of 0.45–0.60% by weight, through the major processes of forging→machining→induction hardening and tempering→grinding of the outer peripheries 22a of the trunnions 22. Here, the softening resistance characteristic value R on the outer peripheries 22a of the trunnions 22 and other surfaces of the completed tripod member 20 is limited to the range of 630<R>820, and preferably 640<R≦810. Accordingly, in the tripod member 20, the outer peripheries 22a of the trunnions 22 have a longer rolling fatigue life. Besides, the bottom portions of the trunnions 22 and the serration portion (or spline portion) have higher torsional fatigue strength and the like as well as excellent durability and strength. Incidentally, the induction hardening and tempering may be applied to all over the outer peripheries 22a and the bottom portions of the trunnions 22, or be locally applied to only the vicinities of certain points on a plane that includes the axes of the trunnions 22 and intersects the axis of the tripod member 20 at right angles. The carburizing/tempering and the carbonitriding/tempering become also feasible for such local applications when accompanied by anti-carburizing and -nitriding treatments.

Figure 19A:
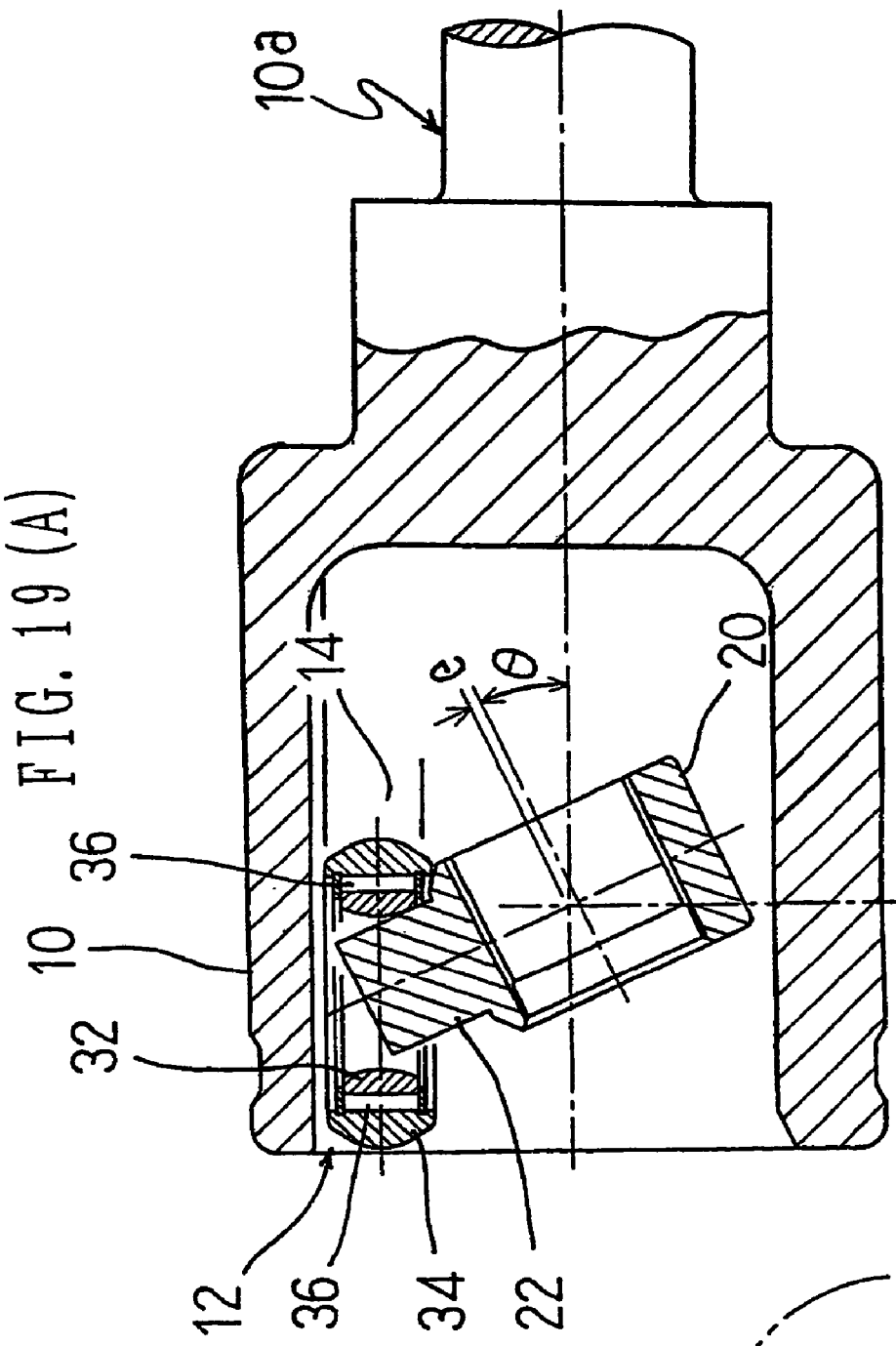
FIG. 19(A) is a longitudinal sectional view showing the constant velocity universal joint of FIGS. 18(A)–18(C) with an operating angle.

The outer joint member 10 is made of steel material having a carbon content of 0.15–0.40% by weight, through the major processes of forging→machining→carburizing and tempering→grinding of a shaft portion 10a (see FIG. 19(A)). The carburizing and tempering may be replaced with carbonitriding and tempering, or induction hardening and tempering. Since the limitation of the softening resistance characteristic value R and the other respects are in conformity to those of the tripod member 20, repetitive description thereof will be omitted.

Additionally, the outer peripheries 22a of the trunnions 22 of the tripod member 20 and the roller guideways 14 in the outer joint member 10 may be provided with the minute dimples and/or solid lubrication coatings having chemical conversion undercoatings. Cold sulfurizing is also applicable.

After the above-described major processes are completed, shot peening may be applied to at least one portion among the outer peripheries 22a of the trunnions 22, the bottom portions of the same, and the serration portion (or spline portion) of the tripod member 20, and to at least either the roller guideways 14 or the shaft portion 10a (the serration portion or spline portion, in particular) of the outer joint member 10. The application of shot peening produces finer surface structures, and causes residual compressive stress on the surfaces. This means improved rolling fatigue life and enhanced strengths against torsional fatigue and the like. Besides, in the cases where carburized layers or carbonitrided layers are formed, high impact energy from the shot particles causes martensite transformation of the residual austenite in the surface portions. This further increases the residual compressive stress as well as provides the surfaces with minute dimples to make oil sumps, yet effectively improving the wear resistance and enhancing the rolling fatigue life and torsional fatigue strength. This tendency is particularly significant in carbonitrided layers which are high in residual austenite content.

In the constant velocity universal joint of the present embodiment, the tripod member 20 and the outer joint member 10 are optimized in material, surface, and subsurface properties, as well as improved in rolling fatigue life and in the strengths against torsional fatigue and the like. As a result, this constant velocity universal joint has superior durability and strengths as compared with existing constant velocity universal joints of equivalent sizes. Besides, more compact configuration is available while securing durability and strengths equivalent to or higher than those of existing products.

Figure 20C:
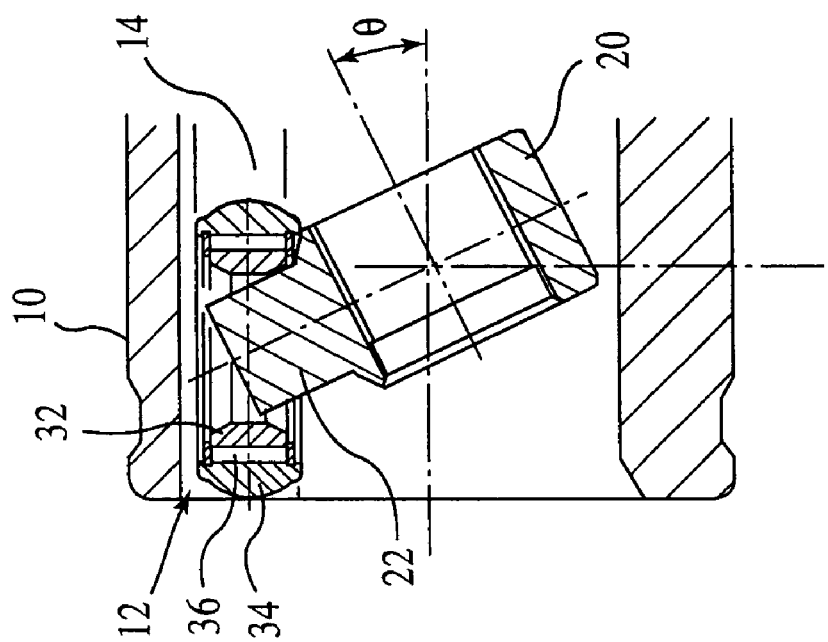
FIGS. 20(A)–20(C) show a tripod type constant velocity universal joint according to a fifth embodiment of the present invention, FIG. 20(A) being a partially-sectioned end view of the same, FIG. 20(B) a sectional view perpendicular to a trunnion in FIG. 20(A), and FIG. 20(C) a longitudinal sectional view showing the joint with an operating angle.
Figure 20B:
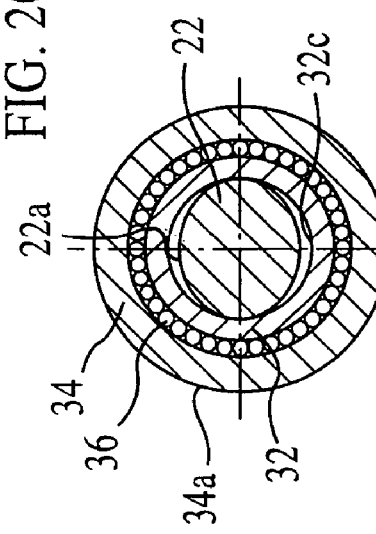
Figure 20A:
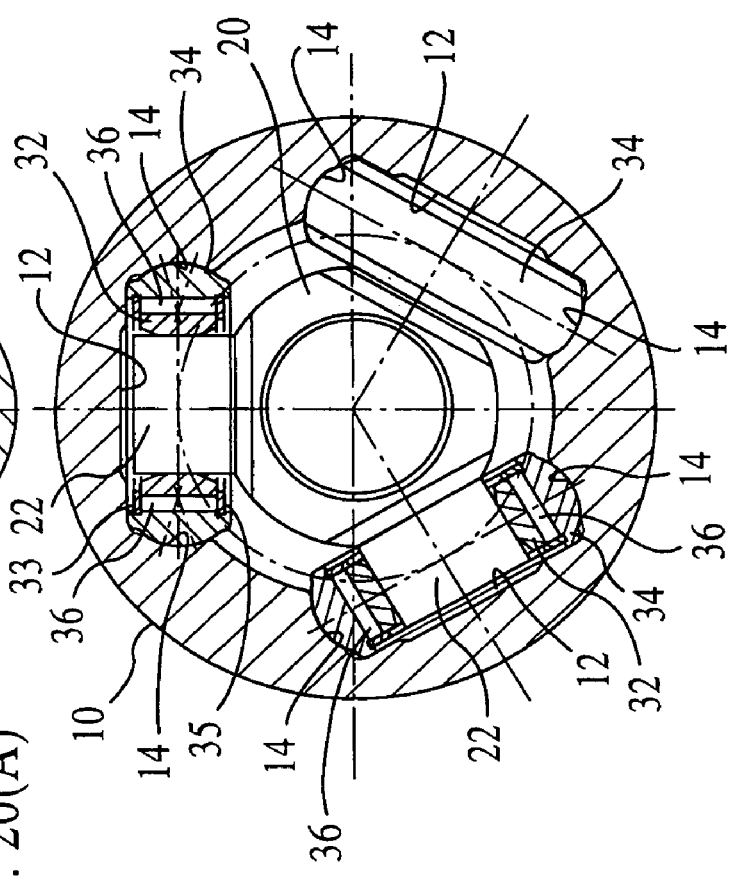

FIGS. 20(A) through 21 show a tripod type constant velocity universal joint according to a fifth embodiment of the present invention. This fifth embodiment differs from the fourth embodiment described above only in that the generatrix to the inner peripheries 32c of the support rings 32, which has been a single arc in the fourth embodiment, consists of a combination of an arc portion 32a at the center and relief portion 32b on both sides. The role of the relief portions 32b is to avoid the interference with trunnions 22 at an operating angle (θ) as shown in FIG. 20(C). Each relief portion 32b is formed by a straight or curved line that gradually spreads out in diameter from an edge of the arc portion 32a to an end of the support ring 32. The relief portions 32b illustrated here are formed by part of a conical surface having a vertex angle α=50. The arc portion 32a has a large radius of curvature (r), for example, of the order of 30 mm so that the trunnion 22 can make a tilt of 2–3° or so with respect to the support ring 32.

Figure 19B:
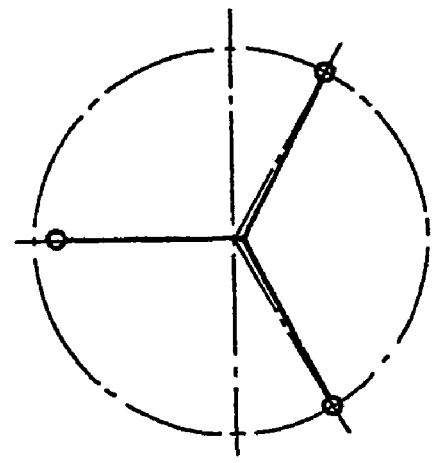
FIG. 19(B) is a schematic side view of the tripod member in FIG. 19(A)

In tripod type constant velocity universal joints, one rotation of the outer joint member 10 constitutionally produces three nutations of the tripod member 20 with respect to the center of the outer joint member 10. Here, the amount of eccentricity represented by the reference symbol e (FIG. 19(A)) increases in proportion to the operating angle (θ). While the three trunnions 22 are spaced by 120° from one another, the operating angle (θ) causes the trunnions 22 to tilt as shown in FIG. 19(B). More specifically, with reference to the vertical trunnion 22 shown to the upper in the diagram, the remaining two trunnions 22 are declined slightly from their zero-operation-angle axes shown by the dot-dash lines. For example, an operating angle (θ) of approximately 23° causes a decline of the order of 2–3°. This decline can be readily allowed by the curvature of the arc portions 32a on the inner peripheries of the support rings 32. Therefore, the surface pressures at the contact portions between the trunnions 22 and the support rings 32 can be prevented from increasing excessively. Here, FIG. 19(B) is a schematic representation of the three trunnions 22 of the tripod member 20 as seen from the left side of FIG. 19(A), the trunnions being represented by the full lines.

In the present embodiment, the tripod member 20 and the outer joint member 10 are also optimized in material, surface, and subsurface properties, as well as improved in rolling fatigue life and in the strengths against torsional fatigue and the like. As a result, the constant velocity universal joint of the present embodiment has superior durability and strengths as compared with existing constant velocity universal joints of equivalent sizes. Besides, more compact configuration is available while securing durability and strengths equivalent to or higher than those of existing products.

Figures 22A, 22B:
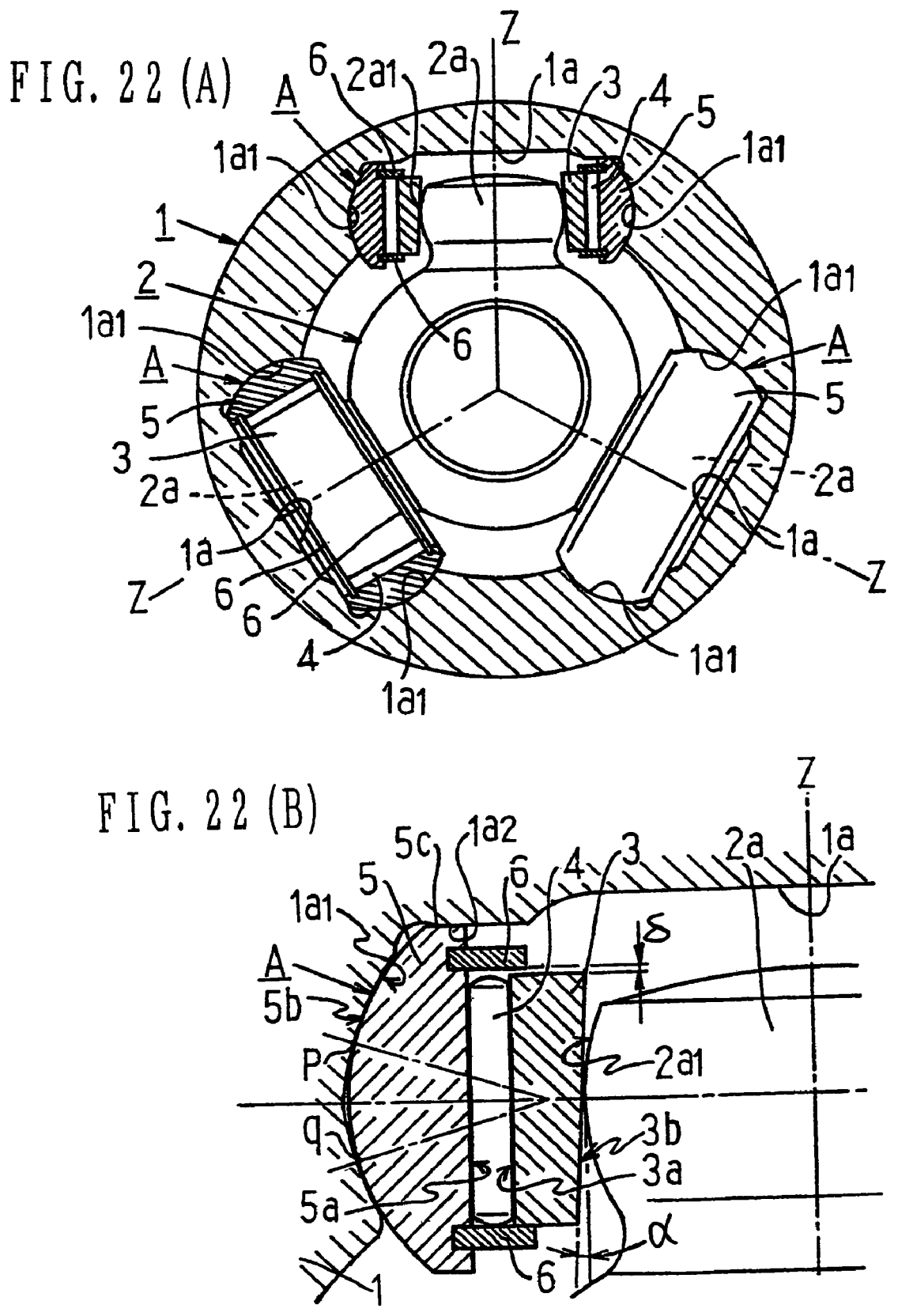
Figure 23:
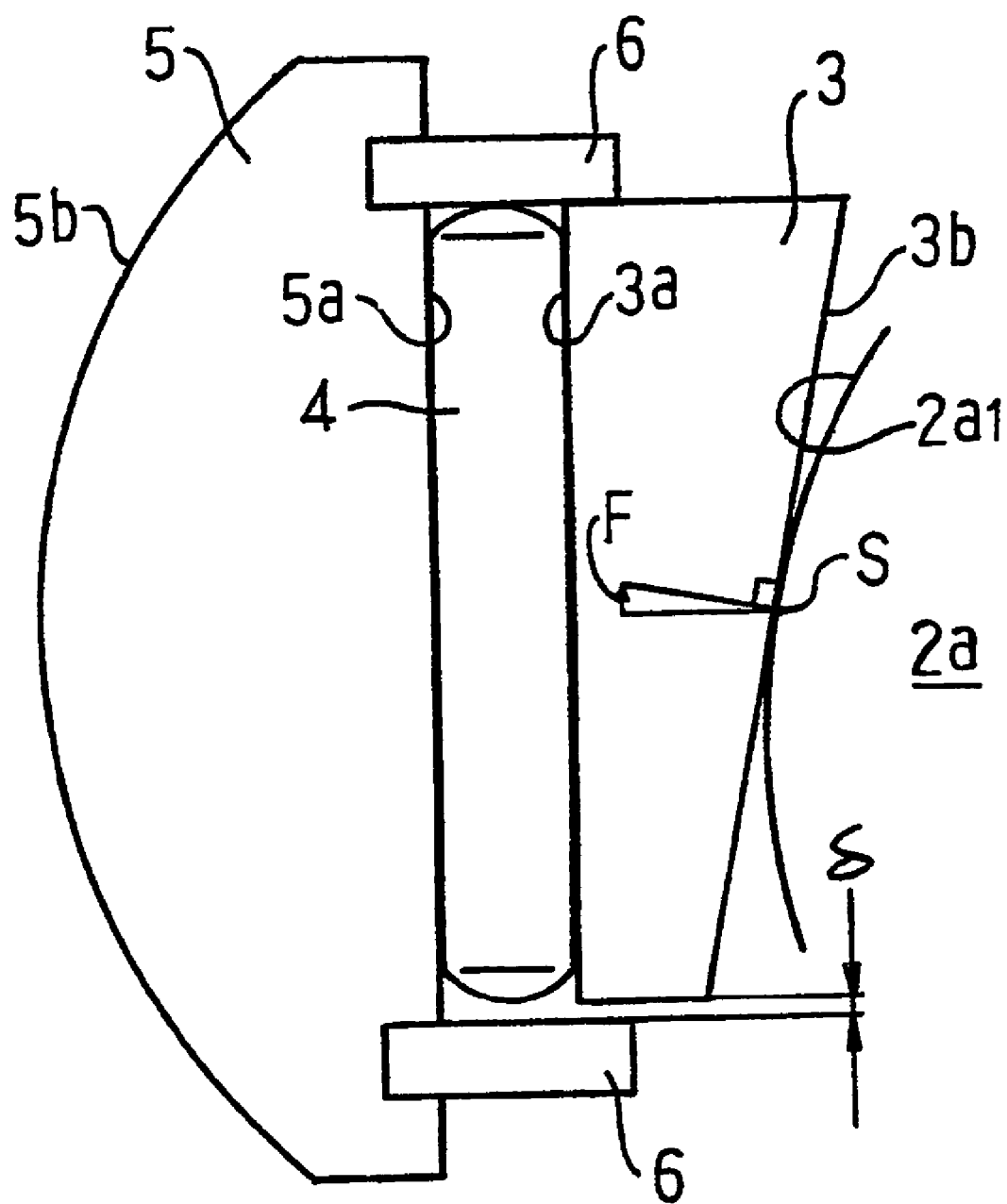
FIG. 23 is a diagram explaining a load component F occurring at the contact position between the support ring and the trunnion in FIGS. 22(A) and 22(B)

FIGS. 22(A) through 23 show a tripod type constant velocity universal joint according to a sixth embodiment of the present invention. Here, FIGS. 22(A) and 22(B) show the joint at an operating angle of 0°, under no rotational torque.

The tripod type constant velocity universal joint of the present embodiment comprises an outer joint member 1 to be connected to one of two shafts to be coupled, and a tripod member 2 to be connected to the other.

The outer joint member 1 is generally cup-like in appearance, and has an inner periphery provided with three axially-extending track grooves 1a at circumferential regular positions. Each of the track grooves 1a has roller guideways 1a1 on both sides.

The tripod member 2 has three radially-projecting trunnions 2a at circumferential regular positions. Each of the trunnions 2a has a convex-arcuate outer periphery 2a1. Onto the outer periphery 2a1 is mounted a roller assembly A consisting of a support ring 3, a plurality of needle rollers 4, and a roller 5.

As magnified in FIG. 22(B), each roller assembly A includes the plurality of needle rollers 4 rotatably interposed between a cylindrical outer periphery 3a of the support ring 3 and a cylindrical inner periphery 5a of the roller 5. A pair of snap rings 6 fitted to the inner periphery 5a of the roller 5 engaging the support ring 3 and the needle rollers 4 at both ends so as to restrain axial movements of the support ring 3 and the needle rollers 4 with respect to the roller 5 (movements along the axis Z of the trunnion 2a). The end faces of the support ring 3 and the end faces of the needle rollers 4 have axial clearances δ from the pair of snap rings 6. In the diagram, the axial clearances δ are rather exaggerated in dimension. The axial clearance δ between the end faces of the support ring 3 and the snap rings 6 and the axial clearance δ between the end faces of the needle rollers 4 and the snap rings 6 can be designed in an identical value or in different values. In the diagrams, both the clearances are shown as an axial clearance δ without distinction. Furthermore, the outer periphery 3a of the support ring 3 and the inner periphery 5a of the roller 5 have slight radial clearances from the rolling contact surfaces of the needle rollers 4.

The inner peripheries 3b of the support rings 3 are fitted to the spherical outer peripheries 2a1 of the trunnions 2a. In this embodiment, the inner periphery 3b of each support ring 3 has the form of a cone gradually contracting in diameter toward the extremity of the trunnion 2a, and makes line contact with the outer periphery 2a1 of the trunnion 2a. This permits tilting movements of the roller assemblies A with respect to the trunnions 2a. The inner peripheries 3b of the support rings 3 have an inclination a as small as 0.1–3° for example, and preferably 0.1–1°. The present embodiment employs the setting of α=0.5°. In the diagrams, the inclinations of the inner peripheries 3b are rather exaggerated.

The generatrix to the outer periphery 3b of each roller 5 is an arc whose center is outwardly off the center of the trunnion 2a.

In the present embodiment, the roller guideways 1a1 in the outer joint member 1 have a section of double-arc shape (Gothic arch shape). Therefore, the roller guideways 1a1 and the outer periphery 5b of each roller 5 make angular contact at two points p and q. The angular contact points p and q are opposed to each other in the direction of the axis Z of the trunnion 2a, at equal distance from a center line that passes through the center of the outer periphery 5b of the roller 5 and intersects the axis Z at right angles. Incidentally, the roller guideways 1a1 may have a section of V shape, parabola shape, or the like. Additionally, in the present embodiment, shoulder surfaces 1a2 are arranged next to the roller guideways 1a1 so that an end face 5c of the roller 5 is guided by these shoulder surfaces 1a2.

Since the inner periphery 3b of each support ring 3 is shaped like a cone that gradually contracts in diameter toward the trunnion extremity, the application of rotational torque to this joint produces a load component F as shown in FIG. 23 (where the inclination of the inner periphery 3b is exaggerated more than in FIGS. 22(A) and 22(B)). More specifically, a load component F directed to the trunnion extremity occurs at the contact position S between the inner periphery 3b of the support ring 3 and the outer periphery 2a1 of the trunnion 2a. This load component F acts to push up the support ring 3 and the needle rollers 4 toward the trunnion extremity so that the support ring 3 and the needle rollers 4 are pressed against the snap ring 6 on the trunnion-extremity side. This stabilizes the contact position S between the inner periphery 3b of the support ring 3 and the outer periphery 2a1 of the trunnion 2a. Besides, the load component F also acts to push up the roller 5 toward the trunnion extremity through the medium of the support ring 3 and the needle rollers 4, thereby stabilizing the orientation of the roller 5. Such stabilization of the contact position S and the orientation stabilization of the roller 5 combine with each other to reduce and stabilize the induced thrust effectively. Incidentally, the inner periphery 3b of the support ring 3 may have a cylindrical configuration.

As in the embodiments described previously, the tripod member 2 and the outer joint member 1 are optimized in material, surface, and subsurface properties, as well as improved in rolling fatigue life and in the strengths against torsional fatigue and the like. As a result, the constant velocity universal joint of the present embodiment has superior durability and strengths as compared with existing constant velocity universal joints of equivalent sizes. Besides, more compact configuration is available while securing durability and strengths equivalent to or higher than those of existing products.

Figure 24A:
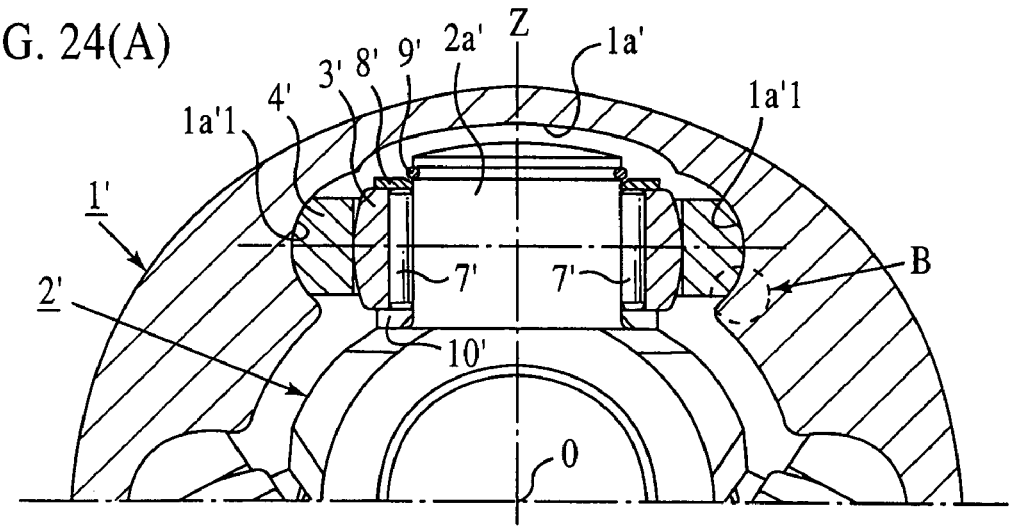
FIGS. 24(A)–24(C) are a tripod type constant velocity universal joint according to a seventh embodiment of the present invention, FIG. 24(A) being a cross-sectional view of the same, FIG. 24(B) an enlarged cross-sectional view of the essential parts in FIG. 24(A), and FIG. 24(C) a diagram explaining a load component F occurring at the contact position between an outer roller and an inner roller.
Figure 24B:
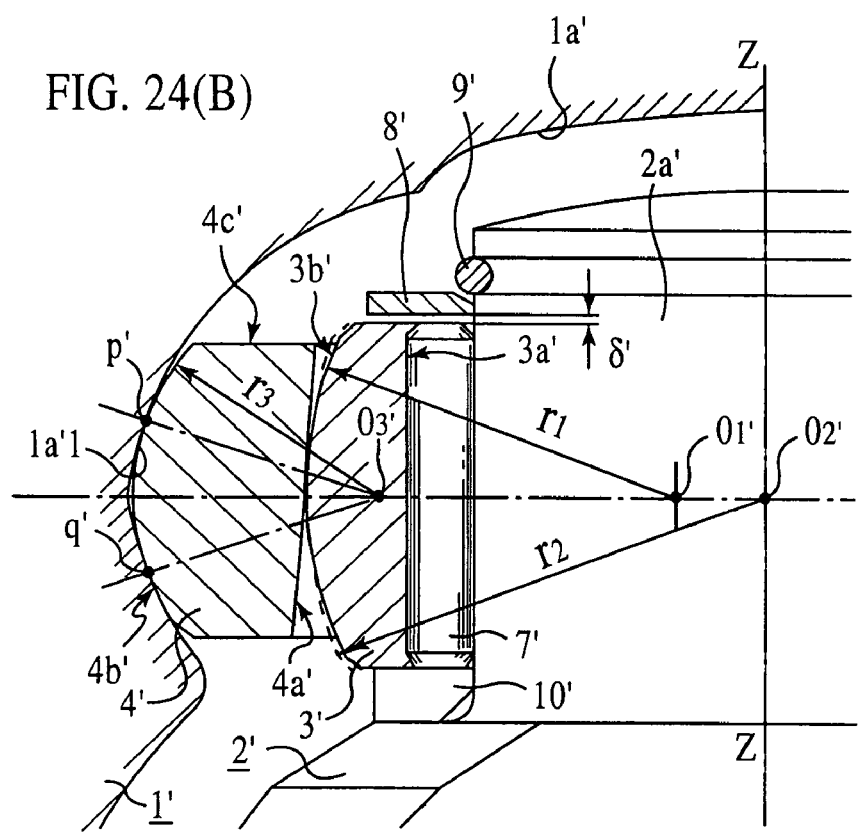
Figure 24C:
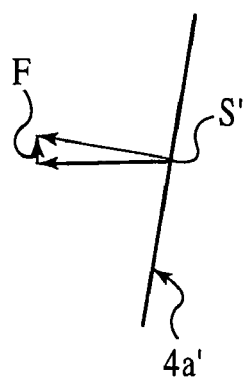

FIGS. 24(A) through 24(C) show a seventh embodiment of the present invention. Here, FIGS. 24(A)–24(C) show the joint at an operating angle of 0°.

As shown in FIGS. 24(A)–24(C), the tripod type constant velocity universal joint of the present embodiment comprises an outer joint member 1' to be connected to one of two shafts to be coupled, and a tripod member 2' to be connected to the other. The outer joint member 1' is generally cup-like in appearance, and has an inner periphery provided with three axially-extending track grooves 1a' at circumferential regular positions. Each of the track grooves 1a' has roller guideways 1a'1 on both sides. The tripod member 2' has three radially-projecting trunnions 2a' at circumferential regular positions. Each of the trunnions 2a' has a cylindrical outer periphery, on which an inner roller 3' is rotatably mounted via a plurality of needle rollers 7'. In addition, an outer roller 4' is rotatably fitted to outside of the inner roller 3'.

As magnified in FIG. 24(B), the needle rollers 7' and the inner roller 3' are engaginged at one ends by a stopper support ring 8' and a snap ring 9' both attached to the extremity of a trunnion 2a', and retained at the other ends by a washer 10' attached to the bottom of the trunnion 2a'. Thereby, the needle rollers 7' and the inner roller 3' are restrained from movements along the axis Z of the trunnion 2a'. In fact, the needle rollers 7' and the inner roller 3' have slight axial clearances 6' from the stopper support ring 8' and the washer 10'. In the diagrams, the axial clearances δ' are rather exaggerated in size. The outer periphery of the trunnion 2a' and the inner periphery 3' of the inner roller 3a' also have slight radial clearances from the needle rollers 7'. The inner roller 3' is cylindrical at the inner periphery 3a' and convex arcuate at the outer periphery 3b'. In the present embodiment, the generatrix to the outer periphery 3b' is an arc having a radius of r1, around a point O1' which is outwardly off the radius center O2' of the inner roller 3' by a predetermined distance. The radius r1 is smaller than the maximum radius r2 of the outer periphery 3b'.

The outer roller 4' is fitted to the outer periphery 3b' of the inner roller 3'. In the present embodiment, the inner periphery 4a' of the outer roller 4' has the form of a cone gradually contacting in diameter toward the extremity of the trunnion 2a', and makes line contact with the outer periphery 3b' of the inner roller 3'. This permits tilting movements of the outer roller 4' with respect to the trunnion 2a'. The inner periphery 4a' has an inclination as small as 0.1–3°, for example. The present embodiment employs the setting of 0.3–0.7°. In the diagrams, the inclination of the inner periphery 4a' is rather exaggerated. The generatrix to the outer periphery 4b' of the outer roller 4' is an arc having a radius of r3 around a point O3' still outward from the point O1'.

In the present embodiment, the roller guideways 1a'1 of the outer joint member 1' have a section of double-arc shape (Gothic arch shape). Therefore, the roller guideways 1a'1 and the outer periphery 4b' of each outer roller 4' make angular contact at two points p' and q'. The angular contact points p' and q' are opposed to each other in the direction of the axis Z of the trunnion 2a', at equal distances from a center line that passes through the center O3' of the outer periphery 4b' of the outer roller 4' and intersects the axis Z at right angles. Incidentally, the roller guideways 1a'1 may have a section of V shape, parabola shape, or the like.

Since it is shaped like a cone that gradually contracts in diameter toward the trunnion extremity, the inner periphery 4a' of the outer roller 4' produces a load component F directed to the trunnion extremity at its contact position S' with the inner periphery 3b' of the inner roller 3' as shown in FIG. 24(C). This load component F acts to push the outer roller 4' toward the trunnion extremity, thereby lowering the contact surface pressure at B portion of the roller guideway 1a'1 on the non-load side. As the reaction force to the load component F, a force directed to the trunnion bottom (downside in the diagram) also arises at the contact portion S'. This reaction force acts to push down the inner roller 3' toward the trunnion bottom, thereby restraining axial movements of the inner roller 3' and the needle rollers 7' with respect to the trunnion 2a'. Consequently, as shown in FIG. 24(B), the inner roller 3' and the needle rollers 7' are pressed against the washer 10' on the bottom side, whereby fluctuations of the contact position S' due to the axial clearances δ' are suppressed. Such reduction of contact surface pressure at B portion of the roller guideway 1a'1 on the non-load side and the stabilization of the contact position S' combine with each other to reduce and stabilize the induced thrust effectively. Incidentally, the inner periphery 4a' of the outer roller 4' may have a cylindrical configuration.

As in the embodiments described previously, the tripod member 2' and the outer joint member 1' are optimized in material, surface, and subsurface properties, as well as improved in rolling fatigue life and in the strengths against torsional fatigue and the like. As a result, the constant velocity universal joint of the present embodiment has superior durability and strengths as compared with existing constant velocity universal joints of equivalent sizes. Besides, more compact configuration is available while securing durability and strengths equivalent to or higher than those of existing products.

Note that the above-mentioned improvements through the optimizations in the material, surface, and subsurface properties of the component parts are not limited to constant velocity universal joints having the constitutions of FIGS. 18(A)–24(C), and may also be applied to constant velocity universal joints having the constitutions of FIGS. 1(A)–17. In addition, the improvements are also applicable to the constant velocity universal joints comprising: roller guideways consisting of flat surfaces; outer rollers having cylindrical outer peripheries and concave-spherical inner peripheries; and inner rollers having convex-spherical outer peripheries, wherein slides between the concave-spherical inner peripheries of the outer rollers and the convex-spherical outer peripheries of the inner rollers permit the tilting movements of the outer rollers. Likewise the constant velocity universal joints in which the roller guideways and the axes of the trunnions are configured not to be parallel to each other at an operating angle of 0°.

Tables 4 and 5 show the results of a test made on the tripod member in the constant velocity universal joint shown in FIGS. 18(A)–18(C).

TABLE 4

| SAMPLE No. | CONTENTS OF MAJOR COMPONENTS IN STEEL MATERIAL (Wt %) | | | | | | SOFTENING RESISTANCE CHARACTERISTIC VALUE R (MEASUREMENT) (Hv) |
|---|---|---|---|---|---|---|---|
| | C | Si | Mn | Ni | Cr | Mo | |
| 1 | 0.16 | 0.26 | 0.73 | 0 | 1.1 | 0 | 712 |
| 2 | 0.2 | 0.05 | 0.2 | 0 | 1 | 0 | 705 |
| 3 | 0.2 | 0.05 | 0.5 | 0 | 0.8 | 0 | 709 |
| 4 | 0.2 | 0.75 | 0.5 | 0 | 1.5 | 0 | 715 |
| 5 | 0.2 | 0.75 | 0.8 | 0.7 | 1.5 | 0 | 721 |
| 6 | 0.2 | 0.9 | 1 | 0.8 | 1 | 0 | 735 |
| 7 | 0.2 | 0.9 | 1.2 | 1 | 1.5 | 0 | 729 |
| 8 | 0.2 | 0.5 | 1.2 | 1.8 | 2 | 0.5 | 799 |
| 9 | 0.2 | 0.5 | 1 | 2 | 1 | 0.5 | 817 |
| 10 | 0.2 | 0.75 | 1.5 | 2 | 1 | 0.5 | 823 |
| 11 | 0.2 | 0.25 | 0.84 | 0 | 0.94 | 0.03 | 735 |
| 12 | 0.21 | 0.93 | 0.82 | 0 | 0.7 | 0 | 730 |
| 13 | 0.21 | 0.09 | 0.84 | 0 | 1 | 0 | 688 |
| 14 | 0.23 | 0.02 | 0.65 | 0 | 1.13 | 0.49 | 770 |
| 15 | 0.23 | 0.03 | 0.95 | 0 | 1.14 | 0.3 | 774 |
| 16 | 0.23 | 0.04 | 0.81 | 0 | 1.14 | 0.41 | 774 |
| 17 | 0.4 | 0.24 | 0.8 | 0 | 1 | 0.24 | 750 |

TABLE 5

| | SAMPLE No. | | | | | | |
|---|---|---|---|---|---|---|---|
| | 2 | 3 | 6 | 15 | 8 | 9 | 10 |
| SOFTENING RESISTANCE CHARACTERISTIC VALUE R (Hv) | | | | | | | |
| MEASUREMENT | 705 | 709 | 735 | 774 | 799 | 817 | 823 |
| ESTIMATION | 702 | 709 | 735 | 756 | 800 | 814 | 825 |
| DURABILITY | Δ | ○ | ○ | ○ | ⊚ | ⊚ | ⊚ |
| FORGEABILITY | ⊚ | ⊚ | ⊚ | ○ | ○ | ○ | Δ |

Initially, tripod members were fabricated by using steel materials having different contents of major components (samples Nos. 1–17), and carburized at 950° C.×8 h, followed by tempering Of 200° C.×2 h. Then, the outer peripheries of their trunnions were measured for softening resistance value R (the maximum Vickers hardness Hv within a depth of 0.5 mm from the outer periphery). The results are shown in Table 4. Incidentally, the outer peripheries of the trunnions were subjected to grinding after the carburizing and tempering; therefore, the above-mentioned "depth of 0.5 mm" was based on the ground surfaces. Then, the samples were individually evaluated for durability and forgeability. Table 5 shows the relations of those evaluations to the measurements and estimations (the estimations will be discussed later) of softening resistance characteristic value R (Hv) on six types of the samples. In the evaluation fields, ⊚ represents full satisfaction of the intended property, ○ satisfaction, and Δ dissatisfaction.

It is confirmed from the results shown in Table 5 that the carburized and tempered articles offer satisfactory durability and forgeability when their softening resistance characteristic values R are limited to the range of 705<R≦820, and preferably 710≦R≦815. Softening resistance characteristic values R smaller than or equal to 705 provide unfavorable results in terms of durability, and those exceeding 820 provide unfavorable results in terms of forgeability.

On the other hand, for the sake of fatigue strengths, the carbon content of the base metal, which determines the hardness of core portions, preferably ranges from 0.15% to 0.40% by weight. When the carbon content of the base metal is below 0.15% by weight, the carburizing requires longer time. At the same time, the core portions fall short of hardness, failing to offer satisfactory fatigue strengths. In contrast, at carbon contents higher than 0.4% by weight, the core portions become excessively high in hardness, with a considerable decrease in toughness as well as an increase in distortion.

For the reasons stated above, when component parts such as the tripod member and the outer joint member are composed of carburized and tempered articles, it is desirable that these parts be made of steel having a carbon content of 0.15–0.40% by weight and be limited to the range of 705<R≦820, and preferably 710≦R≦815, in softening characteristic value R. By so doing, the rolling fatigue life, the fatigue strengths, and the like can be enhanced to improve the durability and secure the forgeability at the same time. Moreover, the limitation of the softening resistance characteristic value R to the ranges mentioned above improves the material in hardenability, thereby allowing deeper hardening than heretofore. This is yet effective in improving the fatigue strengths and the like.

The above-described softening resistance characteristic values R may be determined from measurements, whereas they can be estimated with relatively high accuracy by the following regression equation (a):

$$R(\text{estimation}) = 713.4 + \{20.7 \times Si(\%)\} + \{12.3 \times Mn(\%)\} + \{6.4 \times Ni(\%)\} - \{14.8 \times Cr(\%)\} + \{159.0 \times Mo(\%)\} \quad \text{(a)}$$

The above regression equation (a) was obtained through multiple regression analyses on the softening resistance characteristic values R (measurements) of the 17 types of samples shown in Table 4 (samples Nos. 1–17) and the contents of major components (wt %) in the respective samples. In this example, Si, Mn, Ni, Cr, and Mo are selected as the major components. Carbon C is omitted from the variables since the carburization uniformizes the samples in carbon content.

As shown in Table 5, the estimations of the softening resistance characteristic value R are closely analogous to the measurements. Therefore, limitation of this estimated value R to the range of 705<R≦820, and preferably 710≦R≦815, allows easy and relatively accurate evaluations of durability and forgeability.

Note that carbonitriding and tempering may be applied to the component parts including the tripod member and the outer joint member. In that case, the same effects as those described above can be obtained by limiting the carbon content and the softening resistance characteristic value R (measurement or estimation) of the base metal as in the carburized and tempered articles. Moreover, in the carbonitrided and tempered articles, the surface layers (carbonitrided layers) are appropriately increased in residual austenite content and improved in crack sensitivity. Therefore, carbonitrided and tempered articles are more effective in enhancing the rolling fatigue life. Besides, the trunnion bottoms and the serration portion increase in surface hardness with improvements in torsional fatigue strength and the like.

In the cases of the carburizing/tempering and of the carbonitriding/tempering, a variety of steel materials shown in Table 8 may be used aside from the steel materials shown in Table 4.

TABLE 8

| STEEL CODE | CONTENTS OF MAJOR COMPONENTS (Wt %) | | | | | | SOFTENING RESISTANCE CHARACTERISTIC VALUE (MEASUREMENT) (Hv) |
| --- | --- | --- | --- | --- | --- | --- | --- |
| | C | Si | Mn | Ni | Cr | Mo | |
| SCr415 | 0.15 | 0.25 | 0.725 | 0.00 | 1.050 | 0.000 | 712 |
| SCr420 | 0.20 | 0.25 | 0.725 | 0.00 | 1.050 | 0.000 | 712 |
| SCr430 | 0.30 | 0.25 | 0.725 | 0.00 | 1.050 | 0.000 | 712 |
| SCr435 | 0.35 | 0.25 | 0.725 | 0.00 | 1.050 | 0.000 | 712 |
| SCr440 | 0.40 | 0.25 | 0.725 | 0.00 | 1.050 | 0.000 | 712 |
| SCM415 | 0.15 | 0.25 | 0.725 | 0.00 | 1.050 | 0.225 | 748 |
| SCM420 | 0.20 | 0.25 | 0.725 | 0.00 | 1.050 | 0.225 | 748 |
| SCM430 | 0.30 | 0.25 | 0.725 | 0.00 | 1.050 | 0.225 | 748 |
| SCM435 | 0.35 | 0.25 | 0.725 | 0.00 | 1.050 | 0.225 | 748 |
| SCM440 | 0.40 | 0.25 | 0.725 | 0.00 | 1.050 | 0.225 | 748 |
| SNCM220 | 0.20 | 0.25 | 0.750 | 1.25 | 0.525 | 0.225 | 764 |
| SNCM415 | 0.15 | 0.25 | 0.550 | 1.80 | 0.525 | 0.225 | 765 |

TABLE 8-continued

| STEEL CODE | CONTENTS OF MAJOR COMPONENTS (Wt %) | | | | | | SOFTENING RESISTANCE CHARACTERISTIC VALUE (MEASUREMENT) (Hv) |
|---|---|---|---|---|---|---|---|
| | C | Si | Mn | Ni | Cr | Mo | |
| SNCM420 | 0.20 | 0.25 | 0.550 | 1.80 | 0.525 | 0.225 | 765 |
| SNCM815 | 0.15 | 0.25 | 0.450 | 4.25 | 0.850 | 0.225 | 774 |

Tables 6 and 7 show the results of another test made on the tripod member in the constant velocity universal joint shown in FIGS. 18 (A)–18 (C).

TABLE 6

| SAMPLE No. | CONTENTS OF MAJOR COMPONENTS IN STEEL MATERIAL | | | | | | SOFTENING RESISTANCE CHARACTERISTIC VALUE R (MEASUREMENT) (Hv) |
|---|---|---|---|---|---|---|---|
| | C | Si | Mn | Ni | Cr | Mo | |
| 1 | 0.54 | 0.19 | 0.86 | 0 | 0.15 | 0 | 682 |
| 2 | 0.47 | 0.21 | 0.76 | 0 | 0.16 | 0 | 640 |
| 3 | 0.47 | 0.1 | 0.75 | 0 | 0.15 | 0 | 630 |
| 4 | 0.48 | 0.21 | 0.88 | 0.29 | 0.16 | 0.31 | 715 |
| 5 | 0.53 | 0.22 | 0.86 | 0 | 0.16 | 0.3 | 724 |
| 6 | 0.48 | 0.2 | 0.88 | 0 | 0.15 | 0.3 | 701 |
| 7 | 0.48 | 0.2 | 0.75 | 0 | 0.15 | 0.3 | 695 |
| 8 | 0.48 | 0.2 | 0.88 | 0 | 0.15 | 0.25 | 689 |
| 9 | 0.48 | 0.15 | 0.83 | 0 | 0.1 | 0.3 | 712 |
| 10 | 0.48 | 0.05 | 0.88 | 0 | 0.15 | 0.3 | 689 |
| 11 | 0.48 | 0.1 | 0.88 | 0 | 0.02 | 0.3 | 705 |
| 12 | 0.48 | 0.15 | 0.88 | 0 | 0.02 | 0.3 | 715 |
| 13 | 0.48 | 0.2 | 0.88 | 0 | 0.02 | 0.3 | 718 |
| 14 | 0.45 | 0.8 | 1.1 | 0 | 0.15 | 0 | 692 |
| 15 | 0.54 | 0.24 | 1 | 1.1 | 0.1 | 0.5 | 810 |
| 16 | 0.53 | 0.49 | 1 | 1.2 | 0.12 | 0.5 | 827 |
| 17 | 0.52 | 0.25 | 0.87 | 0 | 0.15 | 0.4 | 740 |
| 18 | 0.59 | 0.23 | 0.77 | 0 | 0.1 | 0 | 714 |

TABLE 7

| | SAMPLE No. | | | | | | |
|---|---|---|---|---|---|---|---|
| | 3 | 2 | 1 | 12 | 17 | 15 | 16 |
| SOFTENING RESISTANCE CHARACTERISTIC VALUE R (Hv) | | | | | | | |
| MEASUREMENT | 630 | 640 | 682 | 715 | 740 | 810 | 827 |
| ESTIMATION | 633 | 641 | 679 | 714 | 742 | 811 | 827 |
| DURABILITY | Δ | ○ | ○ | ○ | ○ | ⊚ | ⊚ |
| FORGEABILITY | ⊚ | ⊚ | ○ | ○ | ○ | ○ | Δ |

Initially, tripod members were fabricated by using steel materials having different contents of major components (samples Nos. 1–18), and subjected to induction hardening at 10 kHz×170 kW×3 sec., followed by tempering of 200° C.×2 h. Then, the outer peripheries of their trunnions were measured for softening resistance value R (the maximum Vickers hardness Hv within a depth of 0.5 mm from the outer periphery). Table 6 shows the results. Incidentally, the outer peripheries of the trunnions were subjected to grinding after the induction hardening and tempering; therefore, the above-mentioned "depth of 0.5 mm" was based on the ground surfaces. Then, the samples were individually evaluated for durability and forgeability. Table 7 shows the relations of those evaluations to the measurements and estimations (the estimations will be discussed later) of softening resistance characteristic value R (Hv) on seven types of the samples. In the evaluation fields, ⊚ represents full satisfaction of the intended property, ○ satisfaction, and Δ dissatisfaction.

It is confirmed from the results shown in Table 7 that the induction hardened and tempered articles offer satisfactory durability and forgeability when their softening resistance characteristic values R are limited to the range of 630<R≦820, and preferably 640≦R≦810. Softening resistance characteristic values R smaller than or equal to 630 provide unfavorable results in terms of durability, and those exceeding 820 provide unfavorable results in terms of forgeability.

Meanwhile, in order to obtain sufficient hardness by the induction hardening, the base metal needs to have a carbon content within the range of 0.45–0.60% by weight.

For the reasons stated above, when component parts such as the tripod member and the outer joint member are composed of induction hardened and tempered articles, it is desirable that these parts be made of steel having a carbon content of 0.45–0.60% by weight and be limited to the range of 630<R≦820, and preferably 640≦R≦810, in softening characteristic value R. By so doing, the rolling fatigue life, the fatigue strengths, and the like can be enhanced to improve the durability and secure the forgeability at the same time. The induction hardening and tempering also produce residual compressive stresses on the surfaces.

Therefore, the induction hardening and tempering are more effective in enhancing the rolling fatigue life and the fatigue strengths.

The above-described softening resistance characteristic values R may be determined from measurements, whereas they can be estimated with relatively high accuracy by the following regression equation (b):

$$R(\text{estimation})=378.0+\{516.2\times C(\%)\}+\{83.2\times Si(\%)\}+\{31.8\times Mn(\%)\}+\{29.1\times Ni(\%)\}-\{132.6\times Cr(\%)\}+\{167.9\times Mo(\%)\} \quad \text{(b)}$$

The above regression equation (b) was obtained through multiple regression analyses on the softening resistance characteristic values R (measurements) of the 18 types of samples shown in Table 6 (samples Nos. 1–18) and the contents of major components (wt %) in the respective samples. In this example, C, Si, Mn, Ni, Cr, and Mo are selected as the major components.

As shown in Table 7, the estimations of the softening resistance characteristic value R are closely analogous to the measurements. Therefore, limitation of the estimations R to the range of $630<R\leq820$, and preferably $640\leq R\leq810$, allows easy and relatively accurate evaluations of durability and forgeability.

In the cases of induction hardening and tempering, a variety of steel materials shown in Table 9 can be used aside from the steel materials shown in Table 6.

TABLE 9

| STEEL CODE | CONTENTS OF MAJOR COMPONENTS (Wt %) | | | | | | SOFTENING RESISTANCE CHARACTERISTIC VALUE (MEASUREMENT) |
|---|---|---|---|---|---|---|---|
| | C | Si | Mn | Ni | Cr | Mo | (Hv) |
| S45C | 0.45 | 0.25 | 0.75 | 0 | 0.1 | 0 | 642 |
| S48C | 0.48 | 0.25 | 0.75 | 0 | 0.1 | 0 | 657 |
| S50C | 0.50 | 0.25 | 0.75 | 0 | 0.1 | 0 | 667 |
| S53C | 0.53 | 0.25 | 0.75 | 0 | 0.1 | 0 | 683 |
| S55C | 0.55 | 0.25 | 0.75 | 0 | 0.1 | 0 | 693 |
| S58C | 0.58 | 0.25 | 0.75 | 0 | 0.1 | 0 | 709 |
| S61C | 0.61 | 0.25 | 0.75 | 0 | 0.1 | 0 | 724 |

While the test results described above are of the tripod member, similar results were obtained from other component parts such as the outer joint member, the rollers, and the support rings. Furthermore, similar results were also obtained from the constant velocity universal joints of the other embodiments.

Otherwise, in the constant velocity universal joint having the constitution shown in FIGS. 8(A)–11(A) and 18(A)–11(C), the tripod member 20 is made of steel material having a carbon content of 0.15–0.40% by weight, through the major processes of forging→machining→carbonitriding and tempering→grinding of the outer peripheries 22a of the trunnions 22. Here, the carbonitriding and tempering form surface portions (carbonitrided layers) directly beneath the surfaces of the tripod member 20. See FIG. 9(A) for an example. The surface layers are limited to the range of $20\leq\gamma R\leq40$ in residual austenite content γR (vol %). Incidentally, the surface layers (carbonitrided layers) have only to be formed at least beneath the outer peripheries 22a of the trunnions 22. In the present embodiment, the outer peripheries 22a of the trunnions 22 and other surfaces of the completed tripod member 20 is limited to the range of $705<R\leq820$, and preferably $710<R\leq810$, in softening resistance characteristic value R.

In this connection, the carbonitriding and tempering in the processes described above may be replaced with carburizing and tempering while, as shown in the exemplary embodiment of FIG. 9(A), the surface layers (carburized layers) formed by the carburizing and tempering are limited to the range of $20\leq\gamma R\leq40$ in residual austenite content γR (vol %).

The outer joint member 10 is made of steel material having a carbon content of 0.15–0.40% by weight, through the major processes of forging→machining→carbonitriding and tempering→grinding of the shaft portion 10a. The carbonitriding and tempering may be replaced with carburizing and tempering. Since the other respects are in conformity to those of the tripod member 20, repetitive description thereof will be omitted here.

The support rings 32, the rollers 34, and the needle rollers 36 which constitute the roller assemblies are made of steel material having a carbon content of 0.95–1.10% by weight, such as SUJ2 and other bearing steels, through the major processes of forging→machining→nitriding and tempering→grinding. Here, as shown in the exemplary embodiment of FIG. 9(A), the nitriding and tempering create nitride layers (layers having nitride solid solution) as surface portions directly beneath the surfaces of these component parts. The surface portions are limited to the range of $20\leq\gamma R\leq40$ in residual austenite content γR (vol %). In other respects including the materials and fabrication processes, these component parts may conform to the tripod member 20 and the outer joint member 10 described above.

Additionally, the contact surfaces of the tripod member 20, the outer joint member 10, the support rings 32, the rollers 34, and the needle rollers 36 may be provided with the above-described minute dimples and/or solid lubrication coatings having chemical conversion undercoatings. Cold sulfurizing is also applicable.

After the above-described major processes are completed, shot peening may also be applied to at least one portion among the outer peripheries 22a of the trunnions 22, the bottom portions thereof, and the serration portion (or spline portion) of the tripod member 20, and to at least either the roller guideways 14 or the shaft portion 10a (the serration portion or spline portion, in particular) of the outer joint member 10. The application of shot peening produces finer surface structures, and causes residual compressive stress on the surfaces. This means improved rolling fatigue life and enhanced strengths against torsional fatigue and the like. Besides, high impact energy from the shot particles causes martensite transformation of the residual austenite in the surface portions. This further increases the residual compressive stress as well as makes minute dimples to form oil sumps, yet effectively improving the wear resistance and enhancing the rolling fatigue life and torsional fatigue strength. This tendency is particularly significant in carbonitrided layers which are high in residual austenite content.

In the constant velocity universal joint of the present embodiment, the component parts are optimized in material and surface properties, as well as improved in rolling fatigue life and in the strengths against cracks and the like. As a result, this constant velocity universal joint has superior durability and strengths as compared with existing constant velocity universal joints of equivalent sizes. Besides, more compact configuration is available while securing durability and strengths equivalent to or higher than those of existing products.

The above-mentioned improvements through the optimizations in the material and surface properties of the component parts are not limited to constant velocity universal joints having the constitutions of FIGS. 18(A)–24(C), and may also be applied to constant velocity universal joints having the constitutions of FIGS. 1(A)–17. In addition, the improvements are also applicable to the constant velocity universal joints comprising: roller guideways consisting of flat surfaces; outer rollers having cylindrical outer peripheries and concave-spherical inner peripheries; and inner rollers having convex-spherical outer peripheries, wherein slides between the concave-spherical inner peripheries of the outer rollers and the convex-spherical outer peripheries of the inner rollers permit the tilting movements of the outer rollers. Likewise the constant velocity universal joints in which the roller guideways and the axes of the trunnions are configured not to be parallel to each other at an operating angle of 0°.

Rolling fatigue life tests were made on constant velocity universal joints having the constitution shown in FIGS. 18(A)–18(C), with carbonitrided-and-tempered surface layers (carbonitrided layers) formed on their tripod members. Initially, a plurality of tripod members were fabricated for each of the types with surface layers of the following residual austenite contents (vol %): below 20, 20, 22, 25, 28, 30, 35, 40, and above 40 (samples Nos. 18–26). These tripod members were built into constant velocity universal joints, and run under identical conditions for power recirculation type endurance tests. Then, Weibull evaluations were made on each of the types, with the assumption that the running time reaches the life when damages (exfoliations, abrasions, and the like) to the outer peripheries of the trunnions exceed a certain degree. The results are collectively shown in Table 10. In the evaluation fields, ⊚ represents full satisfaction of the intended time, ○ satisfaction, and Δ dissatisfaction.

TABLE 10

| | SAMPLE No. | | | | | | | |
|---|---|---|---|---|---|---|---|---|
| | 18 | 19 | 20 | 21 | 22 | 23 | 24 | 25 | 26 |
| RESIDUAL AUSTENITE CONTENT γR (vol %) | UNDER 20 | 20 | 22 | 25 | 28 | 30 | 35 | 40 | OVER 40 |
| ROLLING FATIGUE LIFE | Δ | ○ | ○ | ⊚ | ⊚ | ⊚ | ⊚ | ○ | Δ |

It is confirmed from the results shown in Table 10 that limiting the residual austenite content of the surface layers to the range of 20% to 40% by volume provides favorable rolling fatigue life. In particular, the range of 25% to 35% by volume offers preferable results.

While the test results described above are of the tripod member, similar results were obtained from other parts such as those constituting the roller assemblies (the rollers, the needle rollers). Furthermore, similar results were also obtained from the constant velocity universal joints of the other embodiments. Description of these test results will be omitted here.

Tests were also made on the softening resistance characteristic value R, with the same results as shown in Tables 4 and 5. Since the particulars about the softening resistance characteristic value R are identical to those described previously in conjunction with Tables 4, 5, and 8, repetitive description thereof will be omitted.

Incidentally, when the parts constituting the roller assemblies are to be nitrided and tempered, they can use high carbon chrome steel. More specifically, a variety of bearing steels shown in Table 11 can be used.

Figure 25:
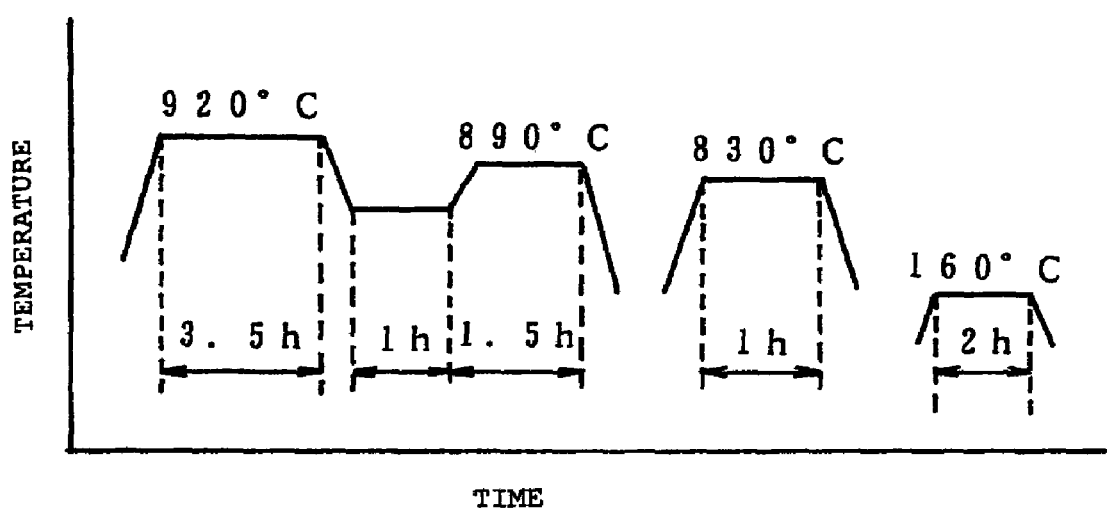
FIG. 25 is a chart showing conditions for plasma carburizing.

Otherwise, in the constant velocity universal joint having the constitution shown in FIGS. 18(A)–18(C), the tripod member 20 is made of steel for carburization, having a carbon content of 0.15–0.40% by weight, through the major processes of forging→machining→heavy carburizing and tempering→grinding of the outer peripheries 22a of the trunnions 22. FIG. 25 shows an example of process conditions for plasma carburizing (in FIG. 25, the carburizing is performed, for example, in the steps of 920° C.×3.5 h and 890° C.×1.5 h). The heavy carburizing and tempering form surface layers (carburized layers) directly beneath the surfaces of the tripod member 20. The surface portions contain a structure in which carbide is distributed into a martensite matrix. Alternatively, the tripod member 20 may be made of bearing steel, such as SUJ2, and subjected to dip quenching and tempering. In this case, the process conditions may be as follows: 840° C.×30 minutes (heating)→110° C. (oil quenching)→180° C.×100 minutes (tempering). Since the outer peripheries 22a of the trunnions 22 are sometimes ground to considerable depths, the latter constitution with deeper hardening is effective.

Here, the above-mentioned carbide consists mainly of $Fe_3C$, to be more specific. The structure having such a carbide distributed into its martensite matrix can be formed by providing at least the surface layers with carbon C as much as or more than its eutectic point (0.8% by weight or higher), and subjecting the same to hardening and tempering. In particular, spheroidizing can be performed in the forming process of the parts, or appropriate adjustments can be made to the component contents of the steel material and to the heat treatment conditions so that the above-mentioned carbide can be spheroidized for yet preferable results.

The outer joint member 10 is made of steel material having a carbon content of 0.15–0.40% by weight, through the major processes of forging→machining→carburizing and tempering→grinding of the shaft portion 10a. The carburizing and tempering may be replaced with carbonitriding and tempering.

The support rings 32, the rollers 34, and the needle rollers 36 which constitute the roller assemblies are made of steel for carburization, having a carbon content of 0.15–0.40% by weight, through the major processes of forging→machining→heavy carburizing and tempering→grinding. Here, the heavy carburizing and tempering create surface layers (carburized layers) directly beneath the surfaces of these component parts. The surface layers contain the structure that carbide is distributed into a martensite matrix. Alternatively, these component parts may be formed of bearing steel, such as SUJ2, and subjected to dip quenching and tempering. In other respects, these component parts are in conformity to the tripod member 20; therefore, description thereof will be omitted.

Additionally, the contact surfaces of the tripod member 20, the outer joint member 10, the support rings 32, the rollers 34, and the needle rollers 36 may be provided with the above-described minute dimples and/or solid lubrication coatings having chemical conversion undercoatings. Cold sulfurizing is also applicable.

Furthermore, after the above-mentioned major processes are completed, shot peening may also be applied to at least one portion among the outer peripheries 22a of the trunnions 22, the bottom portions thereof, and the serration portion (or spline portion) of the tripod member 20, and to at least either the roller guideways 14 or the shaft portion 10a (the serration portion or spline portion, in particular) of the outer joint member 10. The application of shot peening produces finer surface structures, and causes residual compressive stress on the surfaces. This means improved rolling fatigue life and enhanced strengths against torsional fatigue and the like.

In the constant velocity universal joint of the present embodiment, the component parts are optimized in material and surface properties, as well as improved in rolling fatigue life and in the strengths against cracks and the like. As a result, this constant velocity universal joint has superior durability and strengths as compared with existing constant velocity universal joints of equivalent sizes. Besides, more compact configuration is available while securing durability and strengths equivalent to or higher than those of existing products.

The above-described improvements through the optimizations in the material and surface properties of the component parts are not limited to constant velocity universal joints having the constitution of FIGS. 18(A)–18(C), and may also be applied to constant velocity universal joints having the constitutions of FIGS. 20(A)–24(B) and to constant velocity universal joints having the constitutions of FIGS. 1(A)–17. In addition, the improvements are also applicable to the constant velocity universal joints comprising: roller guideways consisting of flat surfaces; outer rollers having cylindrical outer peripheries and concave-spherical inner peripheries; and inner rollers having convex-spherical outer peripheries, wherein slides between the concave-spherical inner peripheries of the outer rollers and the convex-spherical outer peripheries of the inner rollers permit the tilting movements of the outer rollers. Likewise the constant velocity universal joints in which the roller guideways and the axes of the trunnions are configured not to be parallel to each other at an operating angle of 0°.

The following tests were conducted to confirm the effect of providing the component parts' surface layers with the structure that carbide is distributed into a martensite matrix. The tests were made on embodiments and a comparative example, each of which was a constant velocity universal joint having the constitution shown in FIGS. 18(A)–18(C). The materials of the tripod members and the methods of heat treatment were as listed below.

Embodiment 1: with a tripod member of SCM420 steel, heavy carburized and tempered Embodiment 2: with a tripod member of SUJ2 steel, complete dip quenching and tempering Comparative example: with a tripod member of SCM420 steel, ordinarily carburized and tempered (Test Conditions)

torque: 686 Nm, revolutions: 250 rpm, operating angle θ: 10 degrees test time: 300 h After the tests under these conditions, the tripod members were evaluated for rolling fatigue life on the outer peripheries of their trunnions. Table 12 shows the results. In the evaluation fields, ⊚ represents full satisfaction of the intended time, ○ satisfaction, and Δ dissatisfaction.

TABLE 12

| | MATERIAL | HEAT TREATMENT | ROLLING FATIGUE LIFE |
|---|---|---|---|
| EMBODIMENT 1 | SCM420 | HEAVY CARBURIZING AND TEMPERING | ⊚ |
| EMBODIMENT 2 | SUJ2 | DIP QUENCHING AND TEMPERING | ○ |
| EMBODIMENT 3 | SCM420 | CARBURIZING AND TEMPERING | Δ |

It is confirmed from the results shown in Table 12 that the constitutions of the embodiments 1 and 2, or the constitutions with carbide distributed into a martensite matrix, provide satisfactory rolling fatigue life.

While the test results described above are of the tripod member, similar results were obtained from other component parts such as the outer joint member. Furthermore, similar results were also obtained from the constant velocity universal joints of the other embodiments. Description of these test results will be omitted here.

In FIGS. 18(A) and 18(B), the support rings 32 are fitted to the outer peripheries 22a of the trunnions 22. These support rings 32 and rollers 34 are assembled (unitized) via the plurality of needle rollers 36 to constitute the roller assemblies A capable of relative rotations therebetween. More specifically, as magnified in FIG. 26, a plurality of needle rollers 36 are interposed between inner and outer raceway surfaces, with the cylindrical outer periphery of a support ring 32 and the cylindrical inner periphery of a roller 34 as the inner and outer raceway surfaces, respectively. Then, engaging means are arranged on both axial sides of each roller assembly A so as to restrain axial relative movements of the support ring 32, the roller 34, and the needle rollers 36. In the present embodiment, the engaging means on both sides consist of the engaging rings 33 and 35, which are fitted to circumferential grooves 34c and 34d formed in the bore ends of the roller 34, respectively. The engaging rings 33 and 35 are set to the range of 0.5 mm ≤ W ≤ 1.2 mm in width W, and limited to the range of HRC 47–57 in surface hardness. This makes it possible to enhance the fatigue strength against axial loads from the support ring 32 and the needle rollers 36, and improve the fatigue life of the contact surfaces with the support ring 32 and the needle rollers 36. To fit the engaging rings 33 and 35 to the circumferential grooves 34c and 34d, the engaging rings 33 and 35 are inserted into the inner periphery ends of the roller 34 as elastically contracted in diameter, and then pushed to the positions where the circumferential grooves 34c and 34d are formed. Then, as they reach the positions where the circumferential grooves 34c and 34d are formed, the engaging rings 33 and 35 elastically expand back to fit into the circumferential grooves 34c and 34d. The engaging rings 33 and 35 thus attached to the roller 34 make contact with the end faces of the support ring 32 and the end faces of the needle rollers 36, thereby restraining these members from axial relative movements with respect to the roller 34. Here, an example of the engaging rings 33 and 35 is a split ring partially split by a slit.

In the constitution described above, the aforementioned various material improvements and surface modifications can be applied to the engaging rings 33 and 35 for yet enhanced fatigue strength against the axial loads from the support ring 34 and the needle rollers 36 and for further improved fatigue life of the contact surfaces with the support ring 32 and the needle rollers 36. Moreover, these effects can be enhanced further by mounting the engaging rings 33 and 35 to the circumferential grooves 34c and 34d in the roller 34 without play. In the present embodiment, the engaging rings 33, 35 are fitted to the bottoms of the circumferential grooves 34c, 34d with some interference so as to eliminate radial play between the engaging rings 33, 35 and the roller 34.

FIGS. 27–33 show other constitution examples of the roller assembly A.

Figure 26:
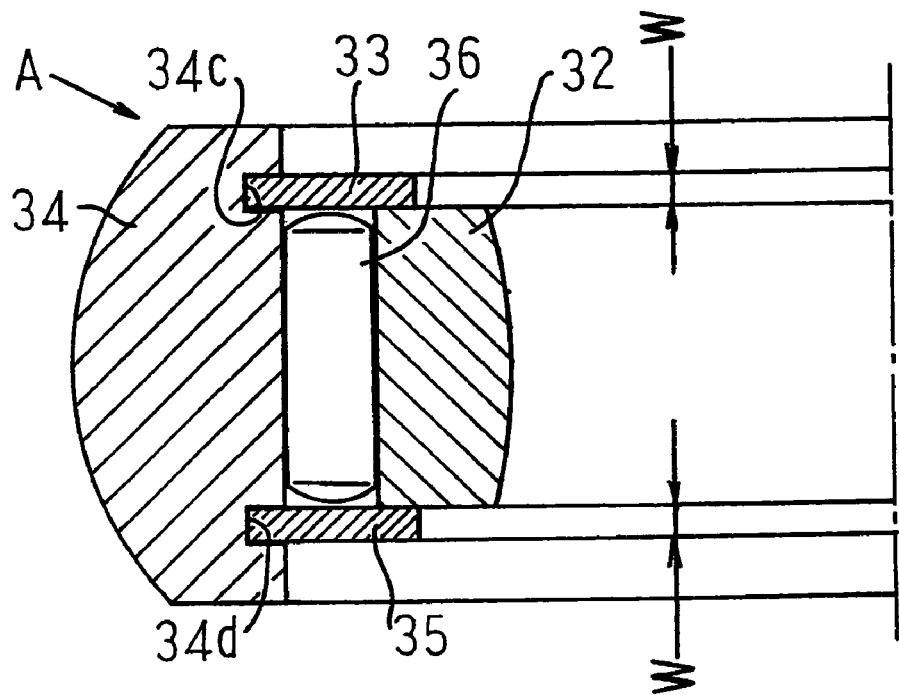
FIG. 26 is an enlarged partial sectional view of a roller assembly.
Figure 27:
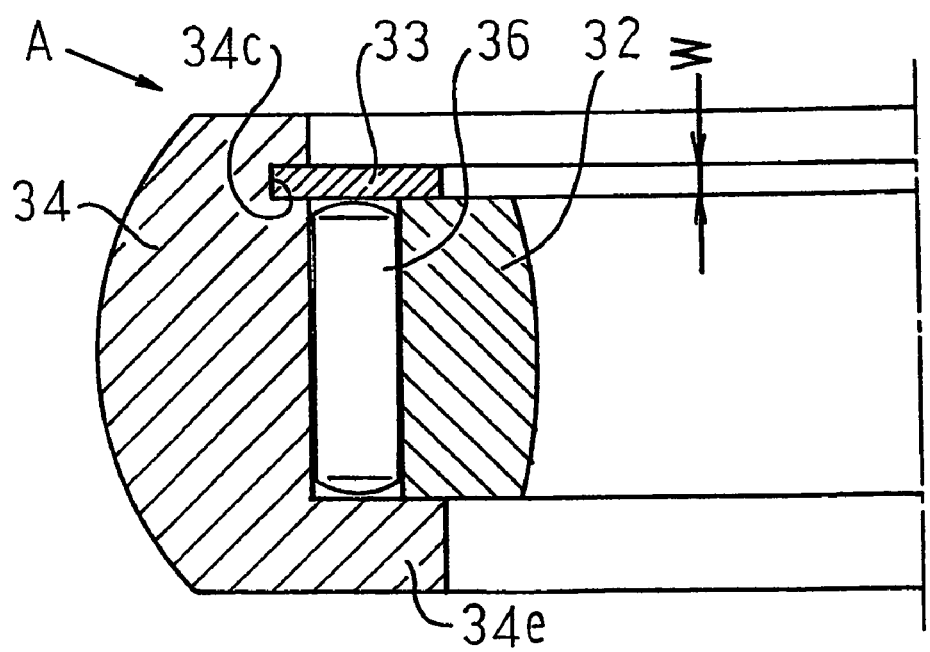
FIG. 27 is an enlarged partial sectional view of a roller assembly according to a modified example.
Figure 28:
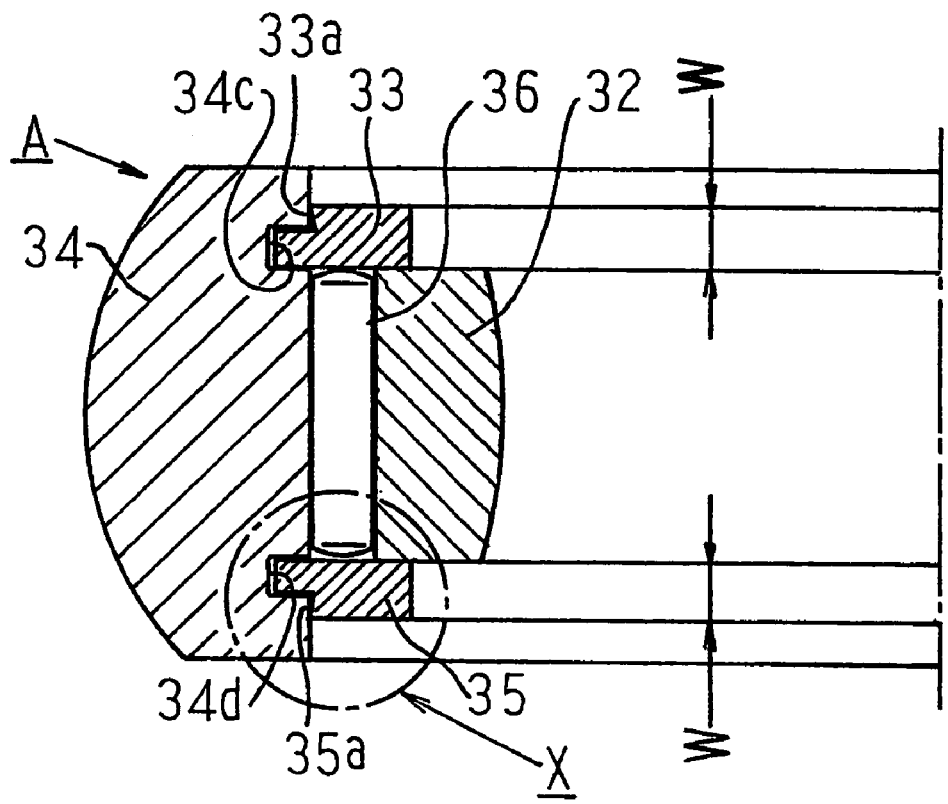
FIG. 28(A) is an enlarged partial sectional view of a roller assembly according to another modified example.
FIG. 28(B) is an enlarged view of X region in FIG. 28(A)
Figure 28:
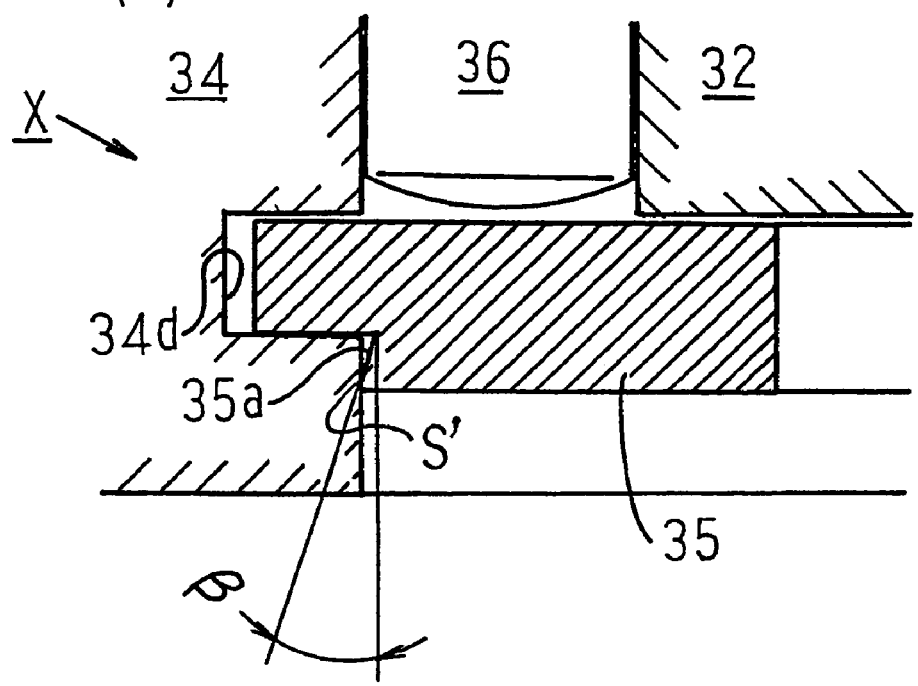
Figure 29:
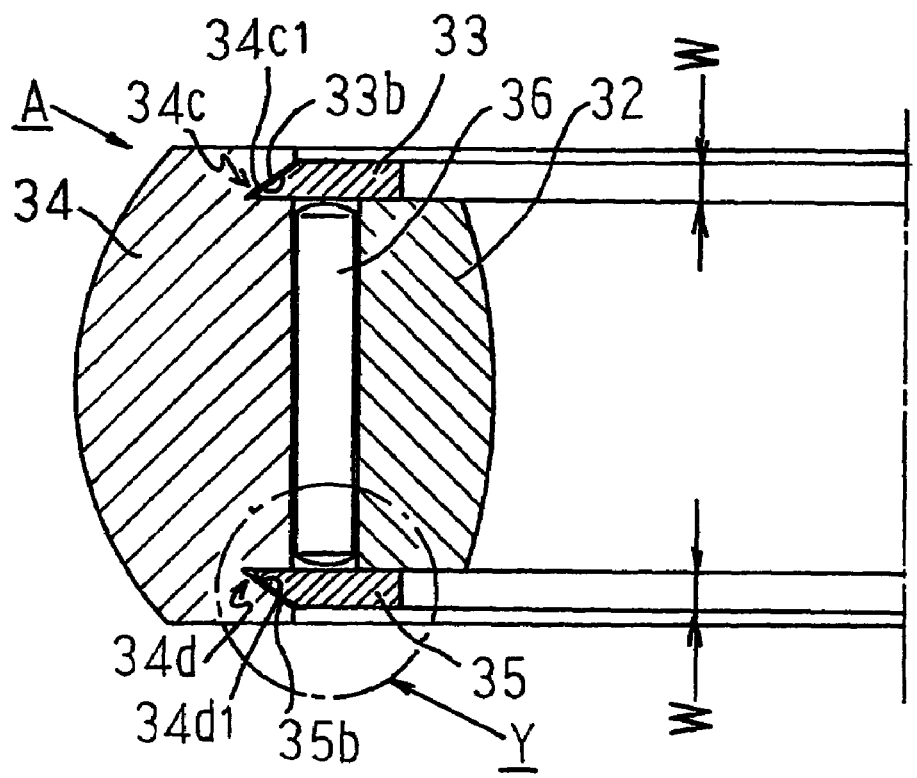
FIG. 29(A) is an enlarged partial sectional view of a roller assembly according to another modified example.
FIG. 29(B) is an enlarged view of Y region in FIG. 29(A)
Figure 29:
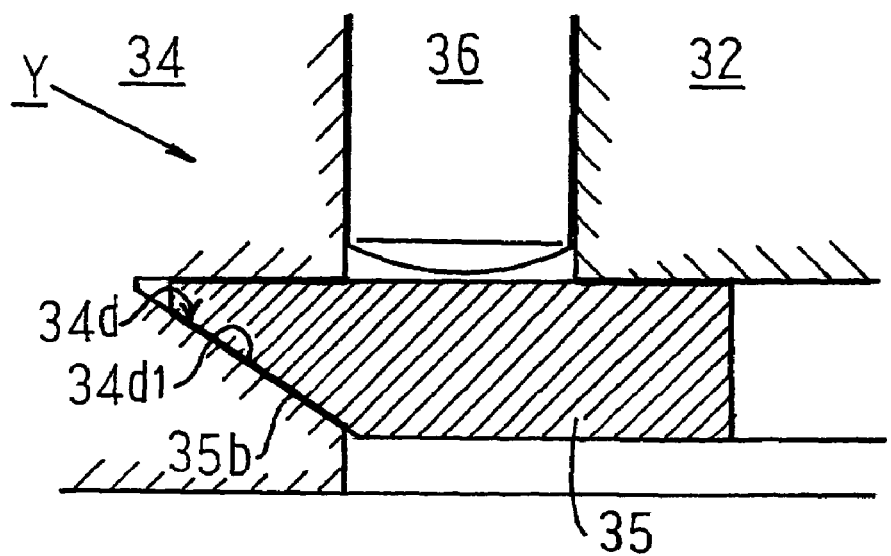

In an embodiment shown in FIG. 27, one of the engaging means in the roller assembly A is the engaging ring 33, and the other consists of a engaging collar 34e. The engaging ring 33 is attached by fitting to a circumferential groove 34c formed in one of the bore ends of the roller 34. The engaging collar 34e is arranged integrally on the other end of the roller 34. The engaging ring 33 can be fitted to the bottom of the circumferential groove 34c with some interference so as to eliminate radial play with the roller 34. The engaging collar 34e is free from any axial play and radial play with the roller 34 since it is integrally formed on the roller 34. As compared with the embodiment shown in FIG. 26, there is an advantage that assembling tolerance due to the engaging-ring constitution of the other engaging means can be eliminated to reduce the axial clearances from the support ring 32 and the needle rollers 36 by half. Incidentally, the engaging collar 34e may be formed on either end of the roller 34, facing to the trunnion bottom or the trunnion extremity, while the engaging collar 34e in this embodiment is arranged on the trunnion-bottom-side end of the roller 34. In other respects including the width W and the surface hardness, the present embodiment is in conformity to the embodiment shown in FIG. 26.

In an embodiment shown in FIGS. 28(A) and 28(B), the engaging means on both axial sides of the roller assembly A consist of engaging rings 33 and 35 as in the embodiment shown in FIG. 26. Nevertheless, the engaging rings 33 and 35 in the present embodiment are provided with steps 33a and 35a that are tapered to expand in diameter outwardly (with a taper angle β) so that the steps 33a and 35a are fitted to the bore ends of the roller 34 with interference. This can eliminate radial play between the engaging rings 33, 35 and the roller 43. In addition, the contact portions S' between the steps 33a, 35a and the bore ends of the roller 43 can receive the axial loads from the support ring 32 and the needle rollers 36, thereby avoiding the torsional fatigue of the engaging rings 33 and 35 effectively. Incidentally, the rims of the engaging rings 33, 35 and the bottoms of the circumferential grooves 34c, 34d have a slight radial clearances therebetween. An example of the engaging rings 33 and 35 is a split rings partially split by a slit. In other respects including the width W and the surface hardness, the present embodiment is in conformity to the embodiment shown in FIG. 26.

Figure 30:
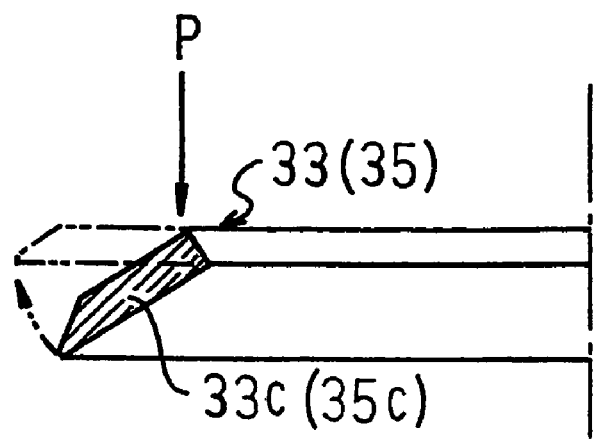
FIG. 30 is a partial sectional view showing a engaging ring.

In an embodiment shown in FIGS. 29(A) and 29(B), the outer peripheries of the engaging rings 33, 35 and side walls of the circumferential grooves 34c, 34d are provided with tapered surfaces 33b, 35b, 34c1, and 34d1 are arranged on respectively. The tapered surfaces 33b, 35b of the engaging rings 33, 35 are taper-fitted to the tapered surfaces 34c1, 34d1 in the circumferential grooves 34c, 34d. This can eliminate radial play and axial play between the engaging rings 33, 35 and the roller 34. While the engaging rings 33, 35 may consist of split rings, solid support rings as shown in FIG. 30 are also applicable. More specifically, an annular portion 33c (35c) of the engaging ring 33 (35) is formed so as to slant in a natural state. The engaging ring 33 (35) is inserted to the position where the circumferential groove 34c (34d) is formed, and then an axial force P is applied to elastically deform and erect the annular portion 33c (35c). The annular portion 33c (35c) thus expands in outside diameter to fit into the circumferential groove 34c (34d), whereby the engaging ring 33 (35) is fitted and fixed to the circumferential groove 34c (34d) in the roller 34. In other respects including the width W and the surface hardness, the present embodiment is in conformity to the embodiment shown in FIG. 26.

Figure 31:
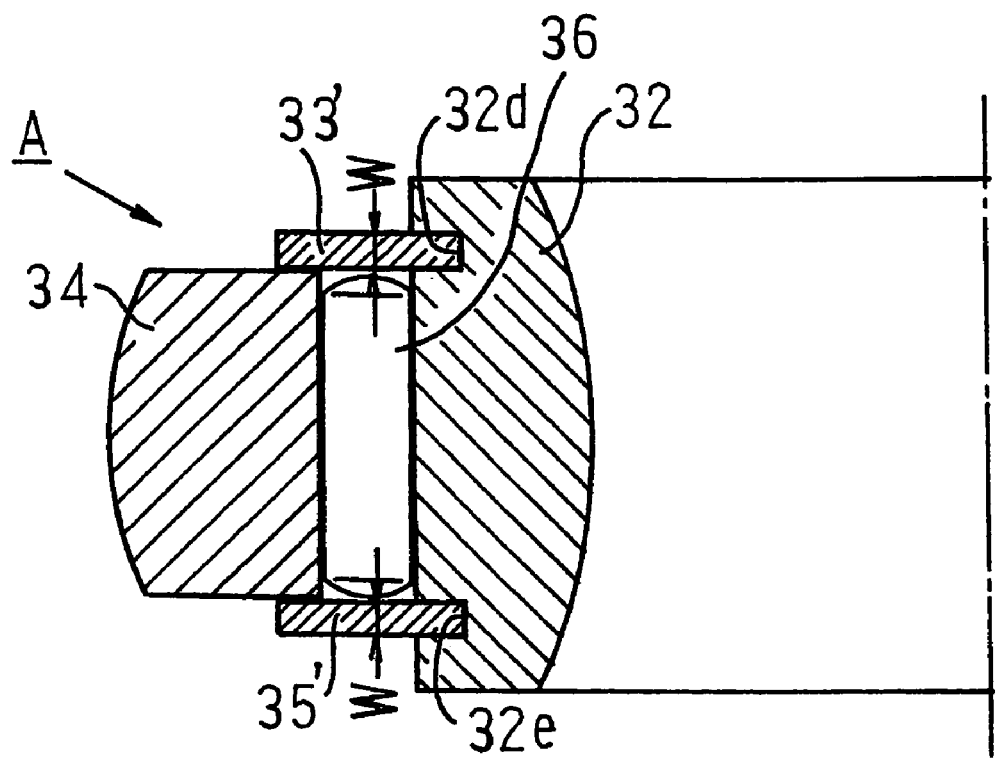
FIG. 31 is an enlarged partial sectional view of a roller assembly according to another modified example.

In an embodiment shown in FIG. 31, the engaging means on both sides of the roller assembly A consist of engaging rings 33' and 35', and these engaging rings 33' and 35' are fitted to circumferential grooves 32d and 32e formed in the outer peripheral ends of the support ring 32, respectively. To fit the engaging rings 33' and 35' to the circumferential grooves 32d and 32e, the engaging rings 33' and 35' are mounted to the outer periphery ends of the support ring 32 as elastically expanded in diameter, and then pushed to the positions where the circumferential grooves 32d and 32e are formed. Then, as they reach the positions where the circumferential grooves 32d and 32e are formed, the engaging rings 33' and 35' elastically contract back to fit into the circumferential grooves 32d and 32e. The engaging rings 33' and 35' thus attached to the support ring 32 make contact with the end faces of the roller 34 and the end faces of the needle rollers 36, thereby restraining these members from axial relative movements with respect to the support ring 32. In the present embodiment, the inner edges of the engaging rings 33' and 35' are fitted to the bottoms of the circumferential grooves 32d and 32e with some interference so as to eliminate radial play between the engaging rings 33', 35' and the support ring 32. Here, an example of the engaging rings 33' and 35' is a split ring partially split by a slit. In other respects including the width W and the surface hardness, the present embodiment is in conformity to the embodiment shown in FIG. 26.

Figure 32:
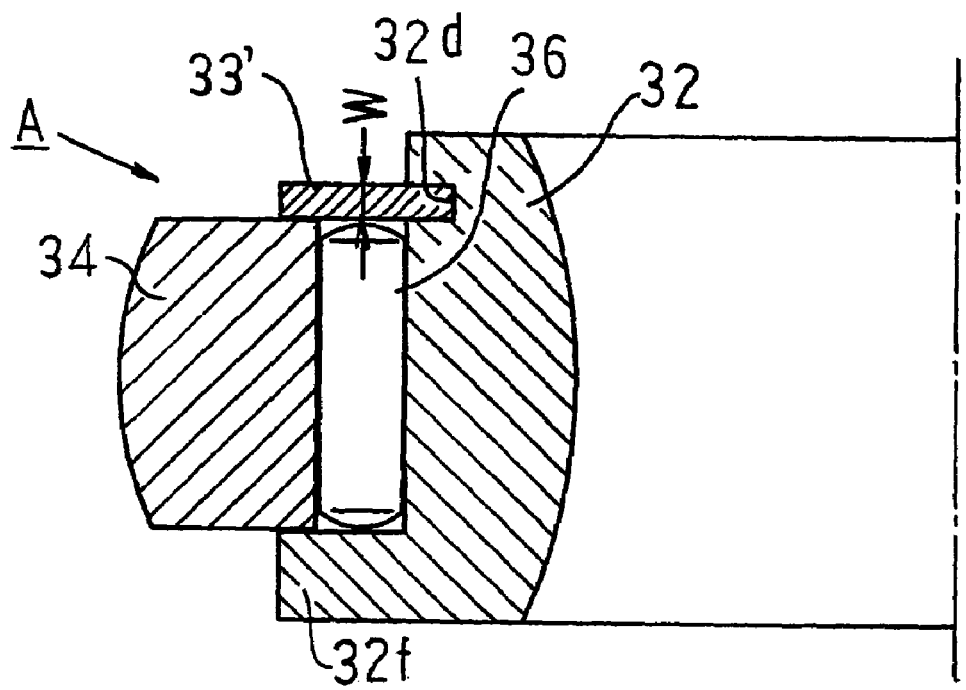
FIG. 32 is an enlarged partial sectional view of a roller assembly according to another modified example.

In an embodiment shown in FIG. 32, one of the engaging means in the roller assembly A is the engaging ring 33', and the other consists of a engaging collar 32f. The engaging ring 33' is fitted to the circumferential groove 32d formed in one of the outer peripheral ends of the support ring 32. The engaging collar 32f is arranged integrally on the other end of the support ring 32. The engaging ring 33' can be fitted, for example, to the bottom of the circumferential groove 32d with some interference so as to eliminate radial play with the support ring 32. The engaging collar 32f is free from any axial play and radial play with the support ring 32 since it is integrally formed on the support ring 32. As compared with the embodiment shown in FIG. 31, there is an advantage that assembling tolerance due to the engaging-ring constitution of the other engaging means can be eliminated to reduce the axial clearances from the roller 34 and the needle rollers 36 by half. Incidentally, the engaging collar 32f may be formed on either end of the support ring 32, facing to the trunnion bottom or the trunnion extremity, while the engaging collar 32f in this embodiment is arranged on the trunnion-bottom-side end of the roller 34. In other respects including the width W and the surface hardness, the present embodiment is in conformity to the embodiment shown in FIG. 26.

Figure 33:
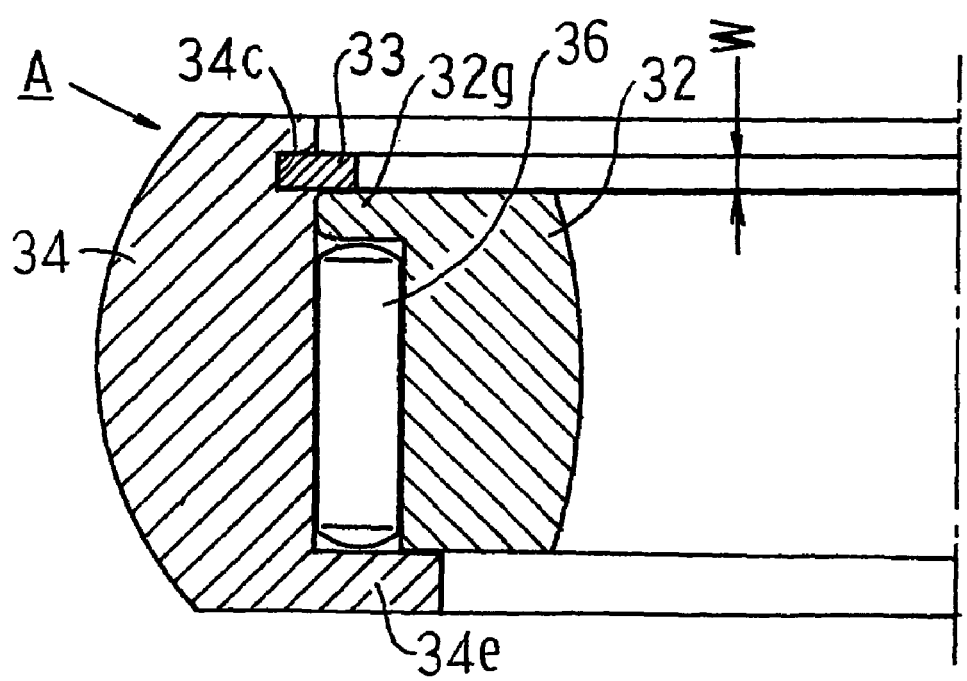
FIG. 33 is an enlarged partial sectional view of a roller assembly according to another modified example.

In an embodiment shown in FIG. 33, one of the engaging means in the roller assembly A is composed of the engaging ring 33 and a engaging collar 32g, and the other consists of the engaging collar 34e. The engaging ring 33 is fitted to the circumferential groove 34c formed in one of the bore ends of the roller 34. The engaging collar 32g is formed integrally on one end of the support ring 32. The engaging collar 34e is arranged integrally on the other end of the roller 34. The engaging ring 33 can be fitted to, for example, the bottom of the circumferential groove 34c with some interference so as to eliminate radial play with the roller 34. The engaging collar 32g is free from any axial play and radial play with the support ring 32 since it is integrally formed on the support ring 32. Besides, the engaging collar 34e is free from any axial play and radial play with the roller 34 since it is integrally formed on the roller 34. In other respects including the width W and the surface hardness, the present embodiment is in conformity to the embodiment shown in FIG. 26.

Figure 34:
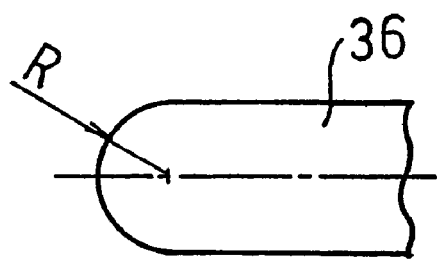
FIGS. 34(A)–34(D) are partial sectional views showing end faces of needle rollers.
Figure 34:
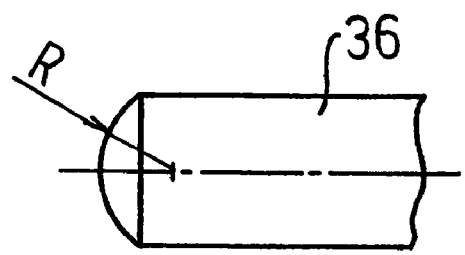
Figure 34:
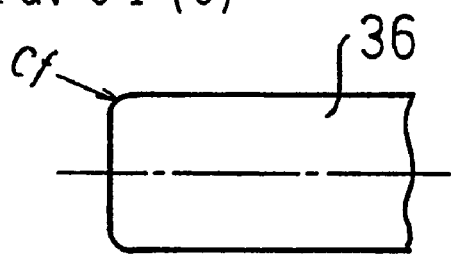
Figure 34:
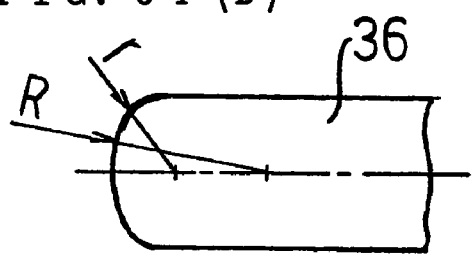

In the embodiments described above, the needle rollers 36 can adopt a variety of end-face configurations shown in FIGS. 34(A) through 34(D). FIG. 34(A) shows a needle roller 36 with semi-spherical end faces having a radius of curvature of R'1. FIG. 34(B) shows a needle roller 36 with partial spherical end faces having a radius of curvature of R'2. FIG. 34(C) shows a needle roller 36 with flat end faces having chamfers of along the corners. FIG. 34(D) shows a needle roller 36 with end faces of composite spherical configuration, having radii of curvature of R'3 and r' (R'3>r').

The above-described various constitutions concerning the roller assemblies are also applicable to the constant velocity universal joints of the embodiments shown in FIGS. 20(A)–23, and the constant velocity universal joints of the embodiments shown in FIGS. 1(A)–17.

The following tests were conducted to confirm the effect of setting the width W of the engaging rings to the predetermined range and the effect of limiting the surface hardness to the predetermined range.

[Tests on the Setting of Width W]

Tests were made on the constitutions shown in FIGS. 18(A) through 26 with engaging rings set to below 0.5 mm, 0.8 mm, 1.0 mm, and above 1.2 mm in width W, under the test conditions listed below. Then, evaluations were made for the fatigue strength against axial loads, to-roller mountability, and workability. The results are shown in Table 13. In the evaluation fields, ○ represents satisfaction of the intended property, and Δ dissatisfaction thereof.

(Test Condition)

torque: 686 Nm, revolutions: 250 rpm, operating angle θ: 10 degrees test time: 300 h surface hardness of engaging rings: HRC 50

TABLE 13

| | WIDTH W (mm) | | | |
| --- | --- | --- | --- | --- |
| | UNDER 0.5 | 0.8 | 1.0 | OVER 1.2 |
| FATIGUE STRENGTH AGAINST AXIAL LOAD | Δ | ○ | ○ | ○ |
| MOUNTABILITY | ○ | ○ | ○ | Δ |
| WORKABILITY | ○ | ○ | ○ | Δ |

It is confirmed from the test results shown in Table 13 that the setting of the engaging ring width W to the range of 0.5 mm≦W≦1.2 mm can provide satisfactory results in all respects, i.e., in the fatigue strength against axial loads, to-roller mountability, and workability.

[Tests on the Limitation of the Surface Hardness]

Tests were made on the constitutions shown in FIGS. 18(A) through 26 with engaging rings limited to below HRC 43, HRC 47, HRC 50, and above HRC 53 in surface hardness, under the test conditions listed below. Then, evaluations were made for the fatigue strength against axial loads and the fatigue life on contact surfaces. The results are shown in Table 14. In the evaluation fields, ○ represents satisfaction of the intended property, and Δ dissatisfaction thereof.

(Test Condition)

torque: 686 Nm, revolutions: 250 rpm, operating angle θ: 10 degrees test time: 300 h width W of engaging rings: 0.8 mm

TABLE 14

| | SURFACE HARDNESS (HRC) | | | |
| --- | --- | --- | --- | --- |
| | UNDER 43 | 47 | 50 | OVER 53 |
| FATIGUE STRENGTH AGAINST AXIAL LOAD | ○ | ○ | ○ | Δ |
| FATIGUE LIFE OF CONTACT SURFACE | Δ | ○ | ○ | ○ |

It is confirmed from the test results shown in Table 14 that the limitation of the engaging rings to the range of HRC 43–53 can provide satisfactory results in both respects, i.e., in the fatigue strength against axial loads and the fatigue life on contact surfaces.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A constant velocity universal joint comprising:

an outer joint member having an inner periphery provided with three axial track grooves, axial roller guideways being arranged on both sides of each of the track grooves;

a tripod member having three radially-projecting trunnions; and a roller assembly mounted on each of the trunnions of the tripod member, the roller assembly being capable of tilting movement with respect to the trunnion and having a roller to be guided along the roller guideways in directions parallel to the axis of the outer joint member, wherein at least one component part of the joint is limited to a predetermined range in softening resistance characteristic value (R), wherein the roller assembly includes the roller to be guided by the roller guideway, and a support ring mounted on an outer periphery of the trunnion so as to support the roller rotatably;

the support ring has a cylindrical or conical inner periphery, and the outer periphery of the trunnion is shaped convex arc in longitudinal section and formed, in cross section including a center of the convex arc, to make contact only with the inner periphery of the support ring in a direction perpendicular to the axis of the joint, wherein a clearance is formed between the outer periphery of the trunnion and the inner periphery of the support ring in an axial direction of the joint.

2. The constant velocity universal joint according to claim 1, wherein the component part is made of steel having a carbon content of 0.15–0.40% by weight, has a surface layer formed by carburizing and tempering beneath a predetermined surface, and has the softening resistance characteristic value R falling within the range of $705 < R \leqq 820$ in Vickers hardness (Hv).

3. The constant velocity universal joint according to claim 1, wherein the component part is made of steel having a carbon content of 0.15–0.40% by weight, has a surface layer formed by carbonitriding and tempering beneath a predetermined surface, and has the softening resistance characteristic value R falling within the range of $705 < R \leqq 820$ in Vickers hardness (Hv).

4. The constant velocity universal joint according to claim 1, wherein the component part is made of steel having a carbon content of 0.45–0.60% by weight, has a surface layer formed by induction hardening and tempering beneath a predetermined surface, and has the softening resistance characteristic value R falling within the range of $630 < R \leqq 820$ in Vickers hardness (Hv).

5. The constant velocity universal joint according to claim 1, wherein the trunnion is formed to have a cross section of elliptic shape having a major axis perpendicular to the axis of the joint.

6. A constant velocity universal joint comprising:
   an outer joint member having an inner periphery provided with three axial track grooves, axial roller guideways being arranged on both sides of each of the track grooves;
   a tripod member having three radially-projecting trunnions; and
   a roller assembly mounted on each of the trunnions of the tripod member, the roller assembly being capable of tilting movement with respect to the trunnion and having a roller to be guided along the roller guideways in directions parallel to the axis of the outer joint member, wherein
   at least one component part of the joint has a surface layer containing a structure in which carbide is distributed into a martensite matrix, wherein
   the roller assembly includes the roller to be guided by the roller guideway, and a support ring mounted on an outer periphery of the trunnion so as to support the roller rotatably;
   the support ring has a cylindrical or conical inner periphery, and
   the outer periphery of the trunnion is shaped convex arc in longitudinal section and formed, in cross section including a center of the convex arc, to make contact only with the inner periphery of the support ring in a direction perpendicular to the axis of the joint, wherein a clearance is formed between the outer periphery of the trunnion and the inner periphery of the support ring in an axial direction of the joint.

7. The constant velocity universal joint according to claim 6, wherein the carbide is spheroidized carbide.

8. The constant velocity universal joint according to claim 6, wherein the component part is made of steel material having a carbon content of 0.80% by weight or higher.

9. The constant velocity universal joint according to claim 6, wherein:
   the component part is made of steel material having a carbon content of 0.15–0.40% by weight; and
   the surface layer is a carburized layer.

10. The constant velocity universal joint according to claim 6, wherein the component part falls within the range of HRC 60–68 in surface hardness at least on its contact surface.

11. The constant velocity universal joint according to claim 6, wherein the trunnion is formed to have a cross section of elliptic shape having a major axis perpendicular to the axis of the joint.

* * * * *